United States Patent
Hayashita

(10) Patent No.: US 10,683,823 B2
(45) Date of Patent: Jun. 16, 2020

(54) CONTROL DEVICE FOR AN EXHAUST PURIFICATION SYSTEM OF AN INTERNAL COMBUSTION ENGINE

(71) Applicant: TOYOTA JIDOSHA KABUSHIKI KAISHA, Toyota-shi, Aichi-ken (JP)

(72) Inventor: Go Hayashita, Chigasaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 280 days.

(21) Appl. No.: 15/559,086

(22) PCT Filed: Feb. 22, 2016

(86) PCT No.: PCT/JP2016/000933
§ 371 (c)(1),
(2) Date: Sep. 18, 2017

(87) PCT Pub. No.: WO2016/166926
PCT Pub. Date: Oct. 20, 2016

(65) Prior Publication Data
US 2018/0073458 A1    Mar. 15, 2018

(30) Foreign Application Priority Data
Apr. 13, 2015 (JP) ................................. 2015-081896

(51) Int. Cl.
*F02D 41/24* (2006.01)
*F02D 41/14* (2006.01)
(Continued)

(52) U.S. Cl.
CPC ....... *F02D 41/2454* (2013.01); *F01N 3/0864* (2013.01); *F01N 3/101* (2013.01);
(Continued)

(58) Field of Classification Search
CPC .. F01N 11/007; F01N 13/008; F01N 13/0093; F01N 2560/025; F01N 3/0864;
(Continued)

(56) References Cited

U.S. PATENT DOCUMENTS 9,593,635 B2 * 3/2017 Nakagawa .......... F02D 41/0295
2005/0268599 A1 * 12/2005 Kawakami .......... F02D 41/1441
60/285

(Continued)

FOREIGN PATENT DOCUMENTS

EP   1 600 619 A2   11/2005
JP   2006-125252    5/2006
(Continued)

*Primary Examiner* — Phutthiwat Wongwian
*Assistant Examiner* — Diem T Tran
(74) *Attorney, Agent, or Firm* — Finnegan, Henderson, Farabow, Garrett & Dunner, LLP

(57) ABSTRACT

A control device for an internal combustion engine performs feedback control so that the air-fuel ratio of the exhaust gas flowing into an exhaust purification catalyst becomes a target air-fuel ratio and switches the target air-fuel ratio to lean when an output air-fuel ratio of a downstream side air-fuel ratio sensor is judged rich and switches the target air-fuel ratio to rich when an output air-fuel ratio of the downstream side air-fuel ratio sensor is judged lean. The control device judges that the downstream side air-fuel ratio sensor has not become abnormal when the value of the excess/deficiency parameter from when switching the target air-fuel ratio to lean or rich to when the output air-fuel ratio of the downstream side air-fuel ratio sensor is judged rich or lean is larger than a predetermined limit value.

7 Claims, 18 Drawing Sheets

(51) Int. Cl.
*F01N 3/10* (2006.01)
*F01N 13/00* (2010.01)
*F01N 3/08* (2006.01)
*F01N 11/00* (2006.01)
*F02D 41/02* (2006.01)
*F02D 41/18* (2006.01)

(52) U.S. Cl.
CPC .......... *F01N 11/007* (2013.01); *F01N 13/008* (2013.01); *F02D 41/0295* (2013.01); *F02D 41/1441* (2013.01); *F02D 41/1454* (2013.01); *F02D 41/1456* (2013.01); *F02D 41/1495* (2013.01); *F01N 13/0093* (2014.06); *F01N 2560/025* (2013.01); *F02D 41/18* (2013.01); *F02D 2200/0814* (2013.01); *Y02T 10/22* (2013.01)

(58) Field of Classification Search
CPC ............. F01N 3/101; F02D 2200/0814; F02D 41/0295; F02D 41/1441; F02D 41/1454; F02D 41/1456; F02D 41/1495; F02D 41/18; F02D 41/2454; Y02T 10/22
See application file for complete search history.

(56) References Cited

U.S. PATENT DOCUMENTS

| | | | |
|---|---|---|---|
| 2009/0182490 A1 | 7/2009 | Saunders | |
| 2011/0192146 A1* | 8/2011 | Sugimoto | F02D 41/0085 60/276 |
| 2012/0060805 A1* | 3/2012 | Nakano | F02D 41/0235 123/703 |
| 2013/0338904 A1* | 12/2013 | Onoe | F02D 41/0295 701/103 |
| 2015/0089927 A1* | 4/2015 | Kubo | F02D 41/1454 60/277 |
| 2015/0322878 A1* | 11/2015 | Okazaki | F02D 41/0295 60/285 |
| 2016/0017831 A1 | 1/2016 | Nakagawa et al. | |

FOREIGN PATENT DOCUMENTS

| | | |
|---|---|---|
| JP | 2010-7534 | 1/2010 |
| JP | 2012-2070 | 1/2012 |
| WO | WO 2014/118889 A1 | 8/2014 |
| WO | WO 2015/050268 A1 | 4/2015 |

* cited by examiner

FIG. 2
(A)
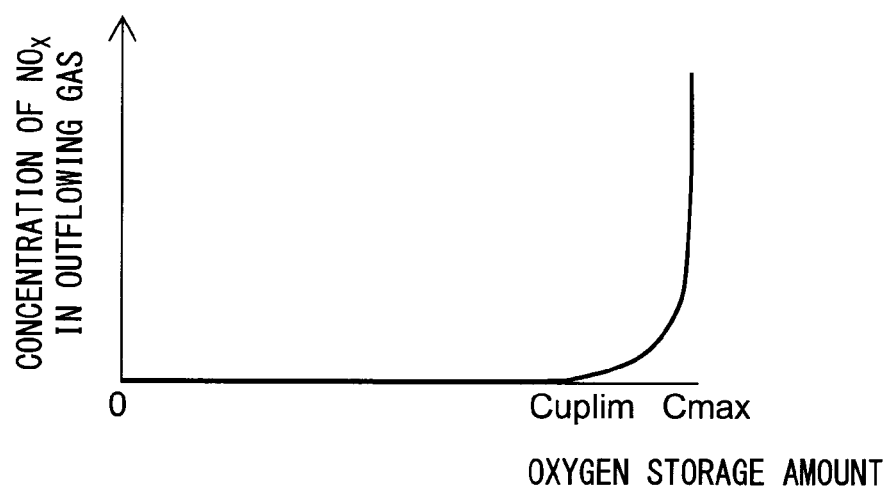
(B)
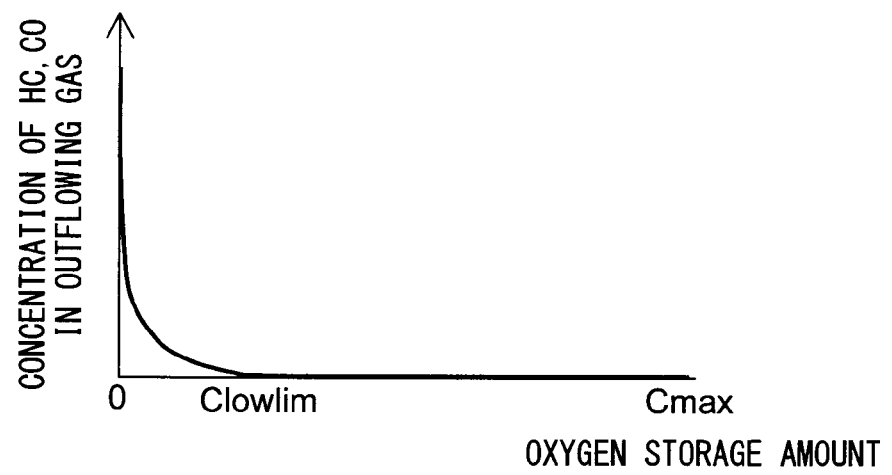

[Fig. 4]

CONTROL DEVICE FOR AN EXHAUST PURIFICATION SYSTEM OF AN INTERNAL COMBUSTION ENGINE

CROSS-REFERENCE TO RELATED APPLICATIONS

This application is a national phase application of International Application No. PCT/JP2016/000933, filed Feb. 22, 2016, and claims the priority of Japanese Application No. 2015-081896, filed Apr. 13, 2015, the content of both of which is incorporated herein by reference.

TECHNICAL FIELD

The present invention relates to an exhaust purification system of an internal combustion engine.

BACKGROUND ART

Known in the art is an exhaust purification system of an internal combustion engine provided with an exhaust purification catalyst arranged in an exhaust passage of the internal combustion engine and able to store oxygen and an air-fuel ratio sensor or oxygen sensor arranged at an upstream side and downstream side in this exhaust purification system in a direction of flow of exhaust (for example, PTLs 1 to 4). In such an exhaust purification system of an internal combustion engine, an air-fuel ratio detected by the upstream side air-fuel ratio sensor (below, referred to as an "output air-fuel ratio") is controlled to a target air-fuel ratio by feedback control of the amount of feed of fuel from a fuel injector.

Among these, in the exhaust purification system described in PTL 1, the output air-fuel ratio of the downstream side air-fuel ratio sensor is used as the basis for control of the target air-fuel ratio. Specifically, if the output air-fuel ratio of the downstream side air-fuel ratio sensor becomes a rich judged air-fuel ratio richer than the stoichiometric air-fuel ratio or becomes less, the target air-fuel ratio is switched to a lean air-fuel ratio leaner than the stoichiometric air-fuel ratio. In addition, if the output air-fuel ratio of the downstream side air-fuel ratio sensor becomes a lean judged air-fuel ratio leaner than the stoichiometric air-fuel ratio or becomes more, the target air-fuel ratio is switched to a rich air-fuel ratio richer than the stoichiometric air-fuel ratio. According to PTL 1, due to this, it is considered possible to suppress the outflow of unburned fuel or $NO_x$ etc. from the exhaust purification catalyst. In addition, by making the oxygen storage amount of the exhaust purification catalyst vary between a maximum storable oxygen amount (maximum amount of oxygen which the exhaust purification catalyst can store) and zero, the oxygen storage ability of the exhaust purification catalyst can be maintained high.

CITATION LIST

Patent Literature

PTL 1: International Publication No. 2014/118889
PTL 2: Japanese Patent Publication No. 2006-125252A
PTL 3: Japanese Patent Publication No. 2012-002070A
PTL 4: Japanese Patent Publication No. 2010-007534A

SUMMARY OF INVENTION

Technical Problem

In this regard, the output current of an air-fuel ratio sensor becomes larger proportionally to the air-fuel ratio of the exhaust gas flowing around the air-fuel ratio sensor so long as the air-fuel ratio sensor is operating normally. When the air-fuel ratio of the exhaust gas is the stoichiometric air-fuel ratio, that output current becomes zero. However, if the drive circuit of the air-fuel ratio sensor etc. becomes abnormal, sometimes the output current of the air-fuel ratio sensor as a whole shifts to the large side or small side. In this case, even if the actual air-fuel ratio of the exhaust gas flowing around the air-fuel ratio sensor is the stoichiometric air-fuel ratio, the output current of the air-fuel ratio sensor becomes a value other than zero. In other words, if the drive circuit of the air-fuel ratio sensor etc. becomes abnormal, the output air-fuel ratio of the air-fuel ratio sensor shifts to the rich side or to the lean side from the actual air-fuel ratio of the exhaust gas. In this case, even if the actual air-fuel ratio is the stoichiometric air-fuel ratio, the output air-fuel ratio of the air-fuel ratio sensor will become an air-fuel ratio different from the stoichiometric air-fuel ratio. Below, deviation in such an output current of the air-fuel ratio sensor (that is, output air-fuel ratio) will be called "center value deviation" of the air-fuel ratio sensor.

If center value deviation of the air-fuel ratio sensor occurs in this way, if the above-mentioned air-fuel ratio control based on the output air-fuel ratio of the downstream side air-fuel ratio sensor is performed, it ends up longer possible to suitably control the air-fuel ratio of the exhaust gas flowing into the exhaust purification catalyst. For example, if the output air-fuel ratio of the downstream side air-fuel ratio sensor has greatly deviated to the lean side, sometimes, despite the actual exhaust air-fuel ratio being the rich air-fuel ratio, the output air-fuel ratio of the downstream side air-fuel ratio sensor will end up becoming the lean judged air-fuel ratio. In this case, even if the actual exhaust air-fuel ratio is the rich air-fuel ratio, the target air-fuel ratio will end up being switched from the lean air-fuel ratio to the rich air-fuel ratio. As a result of this, it no longer becomes possible to make the exhaust gas flowing into the exhaust purification catalyst alternately change between a rich air-fuel ratio and lean air-fuel ratio and it ends up no longer possible to suitably purify the exhaust gas at the exhaust purification catalyst. For this reason, it is necessary to suitably diagnose if the downstream side air-fuel ratio sensor is normal.

Therefore, in consideration of the above problem, an object of the present invention is to provide an exhaust purification system of an internal combustion engine performing the above-mentioned such air-fuel ratio control in which it is possible to suitably diagnose if a downstream side air-fuel ratio sensor is normal.

Solution to Problem

According to an embodiment of the present invention, an exhaust purification system of an internal combustion engine comprising: an exhaust purification catalyst arranged in an engine exhaust passage and able to store oxygen; a downstream side air-fuel ratio sensor arranged at a downstream side of the exhaust purification catalyst in a direction of flow of exhaust; and a control device configured to control an air-fuel ratio of exhaust gas flowing into the exhaust purification catalyst and diagnose the downstream side air-fuel ratio sensor for abnormality. The control device is configured to: perform feedback control so that the air-fuel ratio of the exhaust gas flowing into the exhaust purification catalyst becomes a target air-fuel ratio; and perform target air-fuel ratio setting control to set the target air-fuel ratio so as to switch the target air-fuel ratio to a lean air-fuel ratio leaner than the stoichiometric air-fuel ratio when an output air-fuel ratio of the downstream side air-fuel ratio sensor becomes a rich judged air-fuel ratio richer than the stoichiometric air-fuel ratio or becomes less and so as to switch the target air-fuel ratio to a rich air-fuel ratio richer than the stoichiometric air-fuel ratio when an output air-fuel ratio of the downstream side air-fuel ratio sensor becomes a lean judged air-fuel ratio leaner than the stoichiometric air-fuel ratio or becomes more. If defining a parameter relating to a cumulative value of an amount of oxygen becoming in excess or oxygen becoming deficient, constituting an oxygen excess/deficiency, when trying to make an air-fuel ratio of exhaust gas flowing into the exhaust purification catalyst the stoichiometric air-fuel ratio, as the "excess/deficiency parameter", the control device is further configured to: perform learning control to correct a parameter relating to the feedback control so as to make the air-fuel ratio of exhaust gas flowing into the exhaust purification catalyst change so that a difference between a value of the excess/deficiency parameter from when switching the target air-fuel ratio to a lean air-fuel ratio to when the output air-fuel ratio of the downstream side air-fuel ratio sensor becomes the lean judged air-fuel ratio or more and a value of the excess/deficiency parameter from when switching the target air-fuel ratio to a rich air-fuel ratio to when the output air-fuel ratio of the downstream side air-fuel ratio sensor becomes the rich judged air-fuel ratio or less becomes smaller; and perform normal judgment control where it judges that the downstream side air-fuel ratio sensor has not become abnormal when the value of the excess/deficiency parameter from when switching the target air-fuel ratio to a lean air-fuel ratio to when the output air-fuel ratio of the downstream side air-fuel ratio sensor becomes the lean judged air-fuel ratio or more or the value of the excess/deficiency parameter from when switching the target air-fuel ratio to a rich air-fuel ratio to when the output air-fuel ratio of the downstream side air-fuel ratio sensor becomes the rich judged air-fuel ratio or less is larger than a predetermined limit value smaller than the value of the excess/deficiency parameter required for the oxygen stored in the exhaust purification catalyst to change from zero to the maximum storable oxygen amount or from the maximum storable oxygen amount to zero.

Advantageous Effects of Invention

According to an embodiment of the present invention, it is possible to suitably diagnose if a downstream side air-fuel ratio sensor is normal.

BRIEF DESCRIPTION OF DRAWINGS

FIG. 2 is a view showing the relationship between an oxygen storage amount of an exhaust purification catalyst and an $NO_x$ concentration or HC, CO concentration in exhaust gas flowing out from the exhaust purification catalyst.

DESCRIPTION OF EMBODIMENTS

Figure 1:
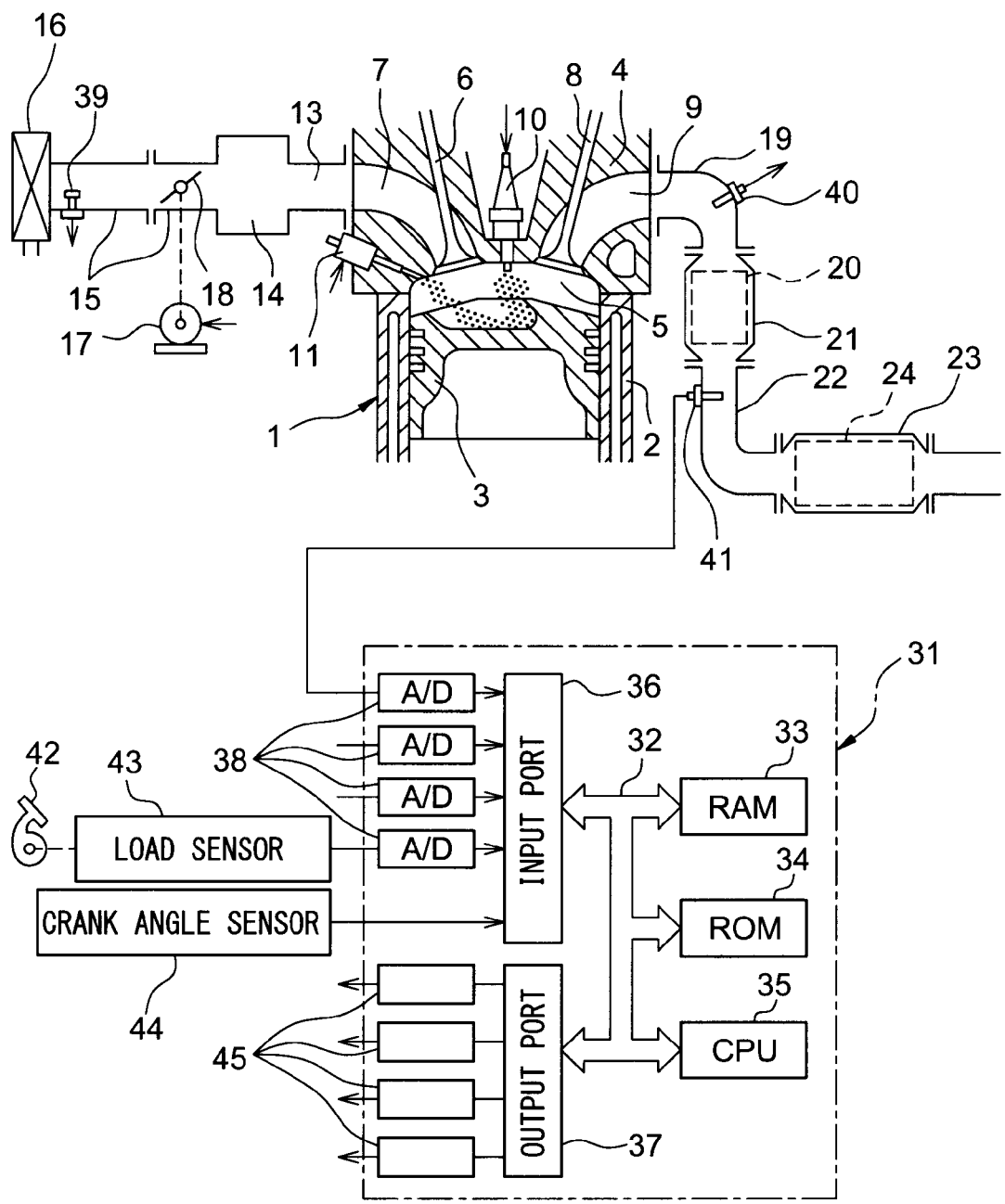
FIG. 1 is a view schematically showing an internal combustion engine in which a control device of the present invention is used.

Referring to the drawings, an embodiment of the present invention will be explained in detail below. Note that, in the following explanation, similar component elements are assigned the same reference numerals.

<Explanation of Internal Combustion Engine as a Whole>

FIG. 1 is a view which schematically shows an internal combustion engine in the first embodiment of the present invention. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. Note that, the fuel injector 11 may be arranged so as to inject fuel inside the intake port 7. Further, in the present embodiment, as the fuel, gasoline with a stoichiometric air-fuel ratio of 14.6 is used. However, in the internal combustion engine of the present invention, another fuel may also be used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side exhaust purification catalyst 20 built into it. The upstream side casing 21 is connected through an exhaust pipe 22 to a downstream side casing 23 which has a downstream side exhaust purification catalyst 24 built into it. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, i.e., at the upstream side of the upstream side exhaust purification catalyst 20 in a direction of exhaust flow, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, i.e., at the downstream side of the upstream side exhaust purification catalyst 20 in a direction of exhaust flow, a downstream side air-fuel ratio sensor 41 is arranged which detects the air-fuel ratio of the exhaust gas flowing through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as a control system for controlling the internal combustion engine.

Note that, although the internal combustion engine according to the present embodiment is a non-supercharged internal combustion engine using gasoline as a fuel, the construction of the internal combustion engine according to the present invention is not limited to the above construction. For example, an arrangement of cylinders, a method of injecting a fuel, constructions of intake and exhaust system, constructions of valve gears, presence or absence of a supercharger, a construction of a supercharge, etc. in the internal combustion engine according to the present invention may be different form the above internal combustion engine.

<Explanation of Exhaust Purification Catalyst>

The upstream side exhaust purification catalyst 20 and the downstream side exhaust purification catalyst 24 which are arranged at the exhaust passage have a similar construction. The upstream side exhaust purification catalyst 20 and the downstream side exhaust purification catalyst 24 are three-way catalysts which have oxygen storage abilities. Specifically, the exhaust purification catalysts 20 and 24 are comprised of carriers comprised of ceramic on which a precious metal having a catalytic action (for example, platinum (Pt)) and a substance having an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_x$) when reaching a predetermined activation temperature and, in addition, an oxygen storage ability.

According to the oxygen storage ability of the exhaust purification catalysts 20 and 24, the exhaust purification catalysts 20 and 24 store the oxygen in the exhaust gas when the air-fuel ratio of the exhaust gas flowing into the exhaust purification catalysts 20 and 24 is an air-fuel ratio leaner than the stoichiometric air-fuel ratio (lean air-fuel ratio). On the other hand, the exhaust purification catalysts 20 and 24 release the oxygen stored in the exhaust purification catalysts 20 and 24 when the inflowing exhaust gas has an air-fuel ratio richer than the stoichiometric air-fuel ratio (rich air-fuel ratio).

The exhaust purification catalysts 20 and 24 have a catalytic action and oxygen storage ability and thereby have the action of removing $NO_x$ and unburned gas according to the stored amount of oxygen. That is, if the air-fuel ratio of the exhaust gas which flows into the exhaust purification catalysts 20 and 24 is a lean air-fuel ratio, as shown in FIG. 2A, when the stored amount of oxygen is small, the exhaust purification catalysts 20 and 24 store the oxygen in the exhaust gas. Further, along with this, the $NO_x$ in the exhaust gas is removed by reduction. Further, if the stored amount of oxygen becomes larger, the exhaust gas which flows out from the exhaust purification catalysts 20 and 24 rapidly rises in concentration of oxygen and $NO_x$ at a certain stored amount near the maximum storable oxygen amount Cmax (in the figure, Cuplim).

On the other hand, if the air-fuel ratio of the exhaust gas which flows into the exhaust purification catalysts 20 and 24 is the rich air-fuel ratio, as shown in FIG. 2B, when the stored amount of oxygen is large, the oxygen which is stored in the exhaust purification catalysts 20 and 24 is released, and the unburned gas in the exhaust gas is removed by oxidation.

As explained above, according to the exhaust purification catalysts 20, 24 used in the embodiments, the characteristic of removal of $NO_x$ and unburned gas in the exhaust gas changes in accordance with the air-fuel ratio of the exhaust gas flowing into the exhaust purification catalysts 20, 24 and the oxygen storage amount. Note that, so long as having a catalytic action and oxygen storage ability, the exhaust purification catalysts 20, 24 may also be catalysts different from three-way catalysts.

<Output Characteristics of Air-Fuel Ratio Sensors>

Figure 3:
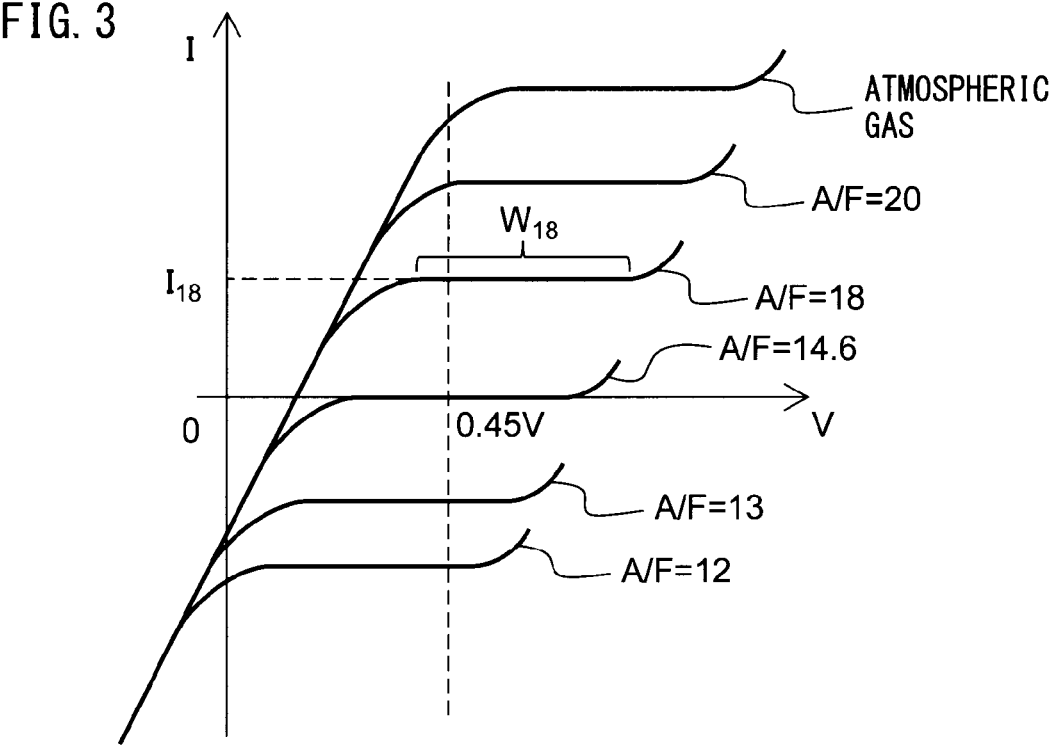
FIG. 3 is a view showing a relationship between a sensor applied voltage and output current at different exhaust air-fuel ratios.
Figure 4:
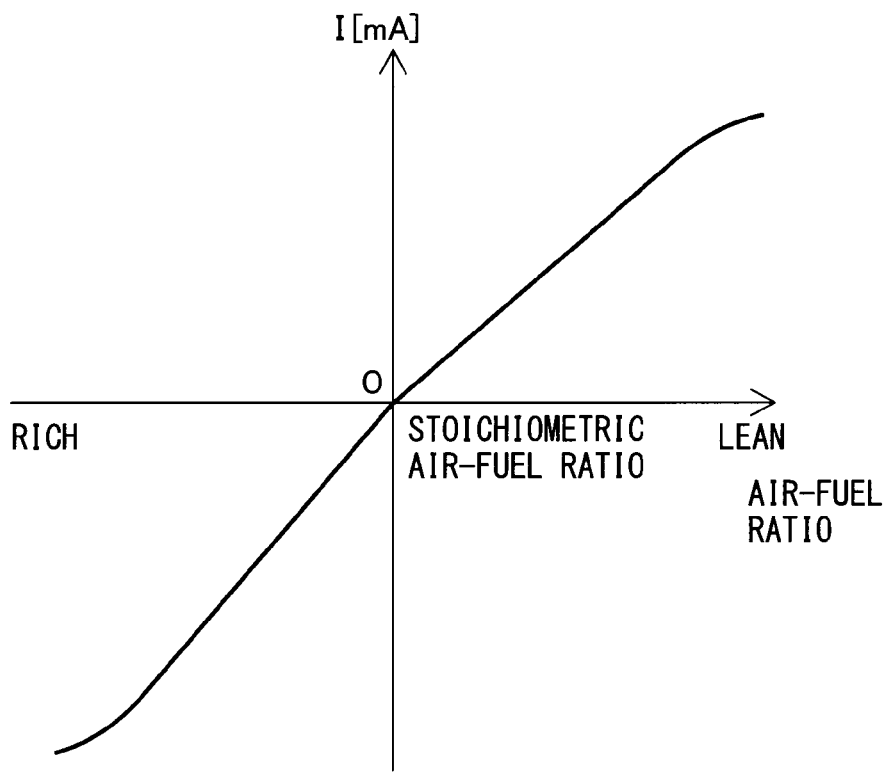
FIG. 4 is a view showing the relationship between an exhaust air-fuel ratio and output current when making the sensor applied voltage constant.

Next, referring to FIG. 3 and FIG. 4, the output characteristics of the air-fuel ratio sensors 40, 41 in the present embodiment will be explained. FIG. 3 is a view showing the voltage-current (V-I) characteristics of the air-fuel ratio sensors 40, 41 in the present embodiment, while FIG. 4 is a view showing the relationship between the air-fuel ratio of the exhaust gas circulating around the air-fuel ratio sensors 40, 41 (below, referred to as the "exhaust air-fuel ratio") and the output current I when maintaining the applied voltage constant. Note that, in the present embodiment, as the air-fuel ratio sensors 40, 41, the same configurations of air-fuel ratio sensors are used.

As will be understood from FIG. 3, in the air-fuel ratio sensors 40, 41 of the present embodiment, the output current I becomes larger the higher the exhaust air-fuel ratio (the leaner). Further, in the V-I line of each exhaust air-fuel ratio, there is a region substantially parallel to the V-axis, that is, a region where the output current does not change much at all even if the applied voltage changes. This voltage region is called the "limit current region". The current at this time is called the "limit current". In FIG. 3, the limit current region and the limit current when the exhaust air-fuel ratio is 18 are respectively shown by $W_{18}$ and $I_{18}$. Therefore, the air-fuel ratio sensors 40, 41 can be said to be limit current type air-fuel ratio sensors.

FIG. 4 is a view showing the relationship between the exhaust air-fuel ratio and the output current I when making the applied voltage 0.45V or so. As will be understood from FIG. 4, in the air-fuel ratio sensors 40, 41, the output current changes linearly (proportionally) with respect to the exhaust air-fuel ratio so that the higher the exhaust air-fuel ratio (that is, the leaner), the greater the output current I of the air-fuel ratio sensors 40, 41 becomes. In addition, the air-fuel ratio sensors 40, 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or less, the ratio of the change of the output current with respect to the change of the exhaust air-fuel ratio becomes smaller.

Note that, in the above example, as the air-fuel ratio sensors 40, 41, limit current type air-fuel ratio sensors are used. However, so long as the output current linearly changes with respect to the exhaust air-fuel ratio, as the air-fuel ratio sensors 40, 41, it is also possible to use any other air-fuel ratio sensors such as air-fuel ratio sensors not the limit current type. Further, the air-fuel ratio sensors 40, 41 may also be air-fuel ratio sensors of structures different from each other.

<Basic Air Fuel Ratio Control>

Next, an outline of the basic air-fuel ratio control in a control device of an internal combustion engine of the present embodiment will be explained. The internal combustion engine of the present embodiment comprises an air-fuel ratio control means. The air-fuel ratio control means controls control the fuel injection amount supplied from the fuel injector 11 to the combustion chamber 5 by feedback based on the output air-fuel ratio of the upstream side air-fuel ratio sensor 40 so that the output air-fuel ratio of the upstream side air-fuel ratio sensor 40 becomes the target air-fuel ratio. Note that, the "output air-fuel ratio" means the air-fuel ratio which corresponds to the output value of the air-fuel ratio sensor.

On the other hand, in the air-fuel ratio control of the present embodiment, the output air-fuel ratio of the downstream side air-fuel ratio sensor 41 etc. is used as the basis to set the target air-fuel ratio as "control for setting the target air-fuel ratio". In control for setting the target air-fuel ratio, when the output air-fuel ratio of the downstream side air-fuel ratio sensor 41 becomes a rich judged air-fuel ratio slightly richer than the stoichiometric air-fuel ratio (for example, 14.55) or becomes less, it is judged that the output air-fuel ratio of the downstream side air-fuel ratio sensor 41 has become the rich air-fuel ratio. At this time, the target air-fuel ratio is set to the lean set air-fuel ratio. Here, the "lean set air-fuel ratio" is an air-fuel ratio of a predetermined constant value a certain extent leaner than the stoichiometric air-fuel ratio (air-fuel ratio becoming control center), for example, is made 14.65 to 20, preferably 14.65 to 18, more preferably 14.65 to 16 or so.

After that, when the output air-fuel ratio of the downstream side air-fuel ratio sensor 41 becomes a lean judged air-fuel ratio slightly leaner than the stoichiometric air-fuel ratio (for example, 14.65) or becomes more, it is judged that the air-fuel ratio of the output exhaust gas of the downstream side air-fuel ratio sensor 41 has become the lean air-fuel ratio. At this time, the target air-fuel ratio is set to the rich set air-fuel ratio. Here, the "rich set air-fuel ratio" is an air-fuel ratio of a predetermined constant value a certain extent richer than the stoichiometric air-fuel ratio (air-fuel ratio becoming control center), for example, is made 10 to 14.55, preferably 12 to 14.52, more preferably 13 to 14.5 or so.

As a result of this, in the present embodiment, if the output air-fuel ratio of the downstream side air-fuel ratio sensor 41 becomes the rich judged air-fuel ratio or less, the target air-fuel ratio is set to the lean set air-fuel ratio. On the other hand, if the output air-fuel ratio of the downstream side air-fuel ratio sensor 41 becomes the lean judged air-fuel ratio or more, the target air-fuel ratio is set to the rich set air-fuel ratio. After that, similar control is repeated.

Note that, the rich judged air-fuel ratio and the lean judged air-fuel ratio are made air-fuel ratios within 1% of the stoichiometric air-fuel ratio, preferably within 0.5%, more preferably within 0.35%. Therefore, the differences of the rich judged air-fuel ratio and lean judged air-fuel ratio from the stoichiometric air-fuel ratio are preferably, when the stoichiometric air-fuel ratio is 14.6, 0.15 or less, preferably 0.073 or less, more preferably 0.051 or less. Further, the difference of the target air-fuel ratio (for example, rich set air-fuel ratio or lean set air-fuel ratio) from the stoichiometric air-fuel ratio is set so as to become larger than the above differences.

<Explanation of Control Using Time Chart>

Figure 5:
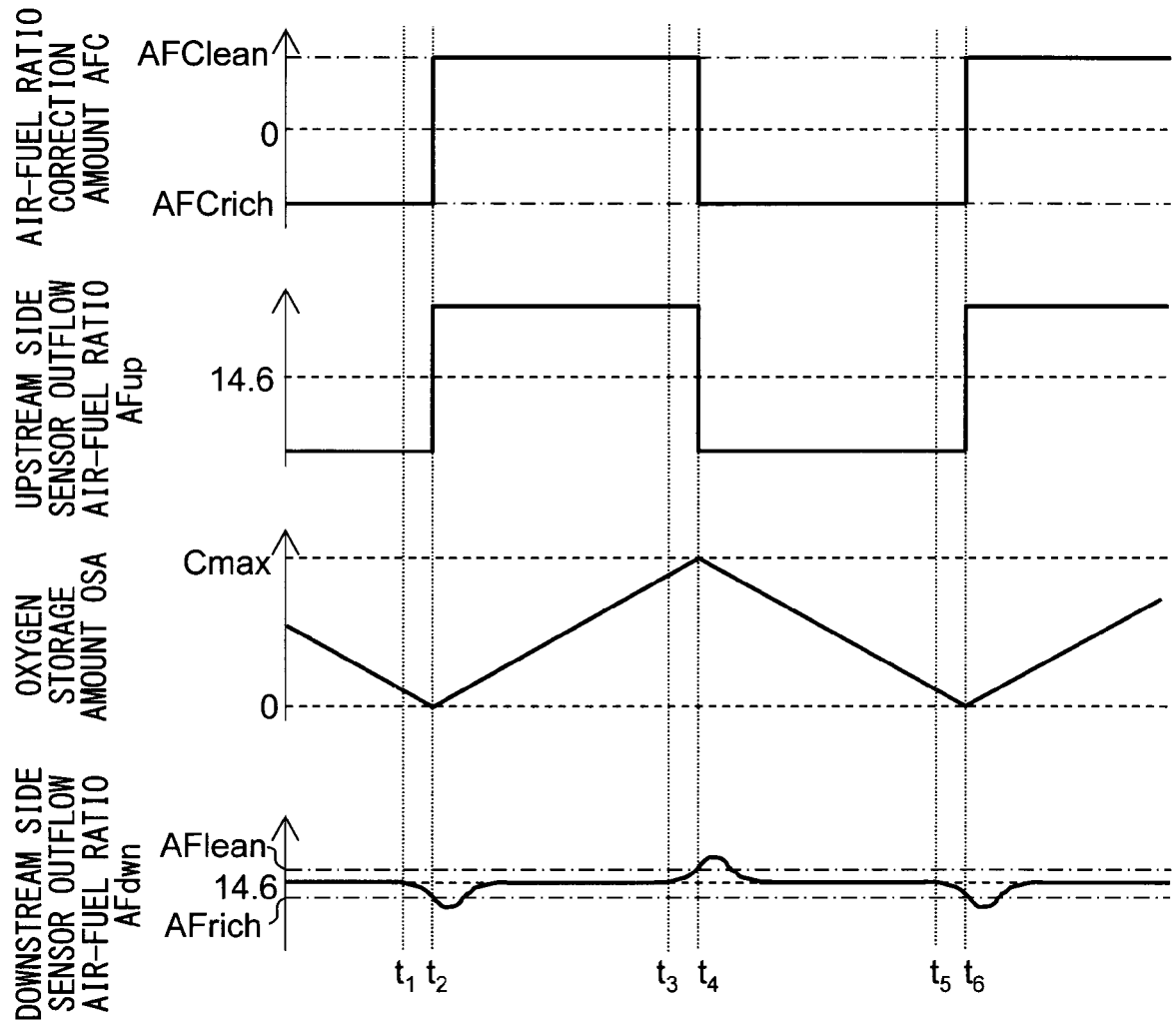
FIG. 5 is a time chart of an air-fuel ratio correction amount etc. when performing basic air-fuel ratio control by the control device of an internal combustion engine according to the present embodiment.

Referring to FIG. 5, the above-mentioned such operations will be explained concretely. FIG. 5 is a time chart of parameters in the case of performing basic air-fuel ratio control by the control device of an internal combustion engine according to the present embodiment such as the air-fuel ratio correction amount AFC, output air-fuel ratio AFup of the upstream side air-fuel ratio sensor 40, oxygen storage amount OSA of the upstream side exhaust purification catalyst 20, and output air-fuel ratio AFdwn of the downstream side air-fuel ratio sensor 41.

Note that, the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is made an air-fuel ratio equal to the air-fuel ratio becoming the control center (below, referred to as the "control center air-fuel ratio") (in the present embodiment, basically the stoichiometric air-fuel ratio), when the air-fuel ratio correction amount AFC is a positive value, the target air-fuel ratio becomes an air-fuel ratio leaner than the control center air-fuel ratio (in the present embodiment, lean air-fuel ratio), and when the air-fuel ratio correction amount AFC is a negative value, the target air-fuel ratio becomes an air-fuel ratio richer than the control center air-fuel ratio (in the present embodiment, rich air-fuel ratio). Further, the "control center air-fuel ratio" means the air-fuel ratio to which the air-fuel ratio correction amount AFC is added according to the engine operating state, that is, the air-fuel ratio becoming the reference level when making the target air-fuel ratio change according to air-fuel ratio correction amount AFC.

In the illustrated example, in the state before the time $t_1$, the air-fuel ratio correction amount AFC is set to the rich set correction amount AFCrich (corresponding to rich set air-fuel ratio). That is, the target air-fuel ratio is made the rich air-fuel ratio. Along with this, the output air-fuel ratio of the upstream side air-fuel ratio sensor 40 becomes the rich air-fuel ratio. The unburned gas contained in the exhaust gas flowing into the upstream side exhaust purification catalyst 20 is removed at the upstream side exhaust purification catalyst 20. Along with this, the oxygen storage amount OSA of the upstream side exhaust purification catalyst 20 is gradually decreased. On the other hand, due to the purification action at the upstream side exhaust purification catalyst 20, the exhaust gas flowing out from the upstream side exhaust purification catalyst 20 does not contain unburned gas, so the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually decreases, the oxygen storage amount OSA will approach zero at the time $t_1$ (for example, Clowlim of FIG. 2). Along with this, part of the unburned gas flowing into the upstream side exhaust purification catalyst 20 will start to flow out without being removed at the upstream side exhaust purification catalyst 20. Due to this, at the time $t_1$ on, the output air-fuel ratio AFdwn of the downstream side air-fuel ratio sensor 41 will gradually fall. As a result, in the illustrated example, at the time $t_2$, the oxygen storage amount OSA will become substantially zero and the output air-fuel ratio AFdwn of the downstream side air-fuel ratio sensor 41 will reach the rich judged air-fuel ratio AFrich.

In the present embodiment, if the output air-fuel ratio AFdwn of the downstream side air-fuel ratio sensor 41 becomes the rich judged air-fuel ratio AFrich or less, the oxygen storage amount OSA is made to increase by the air-fuel ratio correction amount AFC being switched to the lean set correction amount AFClean (corresponding to lean set air-fuel ratio). Therefore, the target air-fuel ratio is switched from the rich air-fuel ratio to the lean air-fuel ratio.

Note that, in the present embodiment, the air-fuel ratio correction amount AFC is switched not immediately when the output air-fuel ratio AFdwn of the downstream side air-fuel ratio sensor 41 changes from the stoichiometric air-fuel ratio to the rich air-fuel ratio, but after it reaches the rich judged air-fuel ratio AFrich. This is because even if the oxygen storage amount OSA of the upstream side exhaust purification catalyst 20 is sufficient, sometimes the air-fuel ratio of the exhaust gas flowing out from the upstream side exhaust purification catalyst 20 ends up slightly deviating from the stoichiometric air-fuel ratio. Conversely speaking, the rich judged air-fuel ratio is made an air-fuel ratio whereby when the oxygen storage amount of the upstream side exhaust purification catalyst 20 is sufficient, the air-fuel ratio of the exhaust gas flowing out from the upstream side exhaust purification catalyst 20 is never reached. Note that, the same can be said for the above-mentioned lean judged air-fuel ratio as well.

If, at the time $t_2$, switching the target air-fuel ratio to the lean air-fuel ratio, the air-fuel ratio of the exhaust gas flowing into the upstream side exhaust purification catalyst 20 changes from the rich air-fuel ratio to the lean air-fuel ratio. Further, along with this, the output air-fuel ratio AFup of the upstream side air-fuel ratio sensor 40 becomes the lean air-fuel ratio (in actuality, a delay arises from when switching the target air-fuel ratio to when the air-fuel ratio of the exhaust gas flowing into the upstream side exhaust purification catalyst 20 changes, but in the illustrated example, for convenience, it is assumed that they change simultaneously). If, at the time $t_2$, the air-fuel ratio of the exhaust gas flowing into the upstream side exhaust purification catalyst 20 changes to the lean air-fuel ratio, the oxygen in the exhaust gas is stored in the upstream side exhaust purification catalyst 20. For this reason, the oxygen storage amount OSA of the upstream side exhaust purification catalyst 20 increases and the air-fuel ratio of the exhaust gas flowing out from the upstream side exhaust purification catalyst 20 converges to the stoichiometric air-fuel ratio. As a result of this, the output air-fuel ratio AFdwn of the downstream side air-fuel ratio sensor 41 becomes substantially the stoichiometric air-fuel ratio.

At the time $t_2$ on, the oxygen storage amount OSA of the upstream side exhaust purification catalyst 20 gradually increases. If the oxygen storage amount OSA of the upstream side exhaust purification catalyst 20 gradually increases, the oxygen storage amount OSA eventually approaches the maximum storable oxygen amount Cmax (for example, Cuplim in FIG. 2). If, at the time $t_3$, the oxygen storage amount OSA approaches the maximum storable oxygen amount Cmax, part of the oxygen flowing into the upstream side exhaust purification catalyst 20 starts to flow out without being stored at the upstream side exhaust purification catalyst 20. Due to this, the output air-fuel ratio AFdwn of the downstream side air-fuel ratio sensor 41 gradually rises. As a result, in the illustrated example, at the time $t_4$, the oxygen storage amount OSA reaches the maximum storable oxygen amount Cmax and the output air-fuel ratio AFdwn of the downstream side air-fuel ratio sensor 41 reaches the lean judged air-fuel ratio AFlean.

In the present embodiment, if the output air-fuel ratio AFdwn of the downstream side air-fuel ratio sensor 41 becomes the lean judged air-fuel ratio AFlean or more, the oxygen storage amount OSA is made to decrease by the air-fuel ratio correction amount AFC being switched to the rich set correction amount AFCrich. Therefore, the target air-fuel ratio is switched from the lean air-fuel ratio to the rich air-fuel ratio.

If, at time $t_4$, switching the target air-fuel ratio to the rich air-fuel ratio, the air-fuel ratio of the exhaust gas flowing into the upstream side exhaust purification catalyst 20 changes from the lean air-fuel ratio to the rich air-fuel ratio. Further, along with this, the output air-fuel ratio AFup of the upstream side air-fuel ratio sensor 40 becomes the rich air-fuel ratio (in actuality, a delay arises from when switching the target air-fuel ratio to when the air-fuel ratio of the exhaust gas flowing into the upstream side exhaust purification catalyst 20 changes, but in the illustrated example, for convenience, it is assumed that they change simultaneously). If, at the time $t_4$, the air-fuel ratio of the exhaust gas flowing into the upstream side exhaust purification catalyst 20 changes to the rich air-fuel ratio, the unburned gas in the exhaust gas is removed by the oxygen stored in the upstream side exhaust purification catalyst 20. For this reason, the oxygen storage amount OSA of the upstream side exhaust purification catalyst 20 decreases and the air-fuel ratio in the exhaust gas flowing out from the upstream side exhaust purification catalyst 20 converges to the stoichiometric air-fuel ratio. As a result of this, the output air-fuel ratio AFdwn of the downstream side air-fuel ratio sensor 41 becomes substantially the stoichiometric air-fuel ratio.

At the time $t_4$ on, the oxygen storage amount OSA of the upstream side exhaust purification catalyst 20 gradually decreases. If the oxygen storage amount OSA of the upstream side exhaust purification catalyst 20 gradually decreases, the oxygen storage amount OSA eventually approaches zero at the time $t_5$ in the same way as the time $t_1$ and decreases to the Cdwnlim of FIG. 2. After that, at the time $t_6$, in the same way as the time $t_2$, the output air-fuel ratio AFdwn of the downstream side air-fuel ratio sensor 41 reaches the rich judged air-fuel ratio AFrich. After that, an operation similar to the operation of the times $t_1$ to $t_4$ is repeated.

In the present embodiment, as the sensor for detecting the air-fuel ratio of the exhaust gas at the downstream side, an air-fuel ratio sensor 41 is used. This air-fuel ratio sensor 41 differs from an oxygen sensor in that it does not have hysteresis. For this reason, according to the air-fuel ratio sensor 41, the response to the actual exhaust air-fuel ratio is high and it is possible to quickly detect outflow of unburned gas and oxygen (and $NO_x$) from the upstream side exhaust purification catalyst 20. Therefore, due to this, according to the present embodiment, it is possible to suppress outflow of unburned gas and $NO_x$ (and oxygen) from the upstream side exhaust purification catalyst 20.

Further, in the exhaust purification catalyst which can store oxygen, if maintaining this oxygen storage amount substantially constant, a drop in the oxygen storage ability is invited. Therefore, to maintain the oxygen storage ability as high as possible, at the time of use of the exhaust purification catalyst, the oxygen storage amount has to be made to change up and down. According to the air-fuel ratio control according to the present embodiment, the oxygen storage amount OSA of the upstream side exhaust purification catalyst 20 repeatedly changes up and down between near zero and near the maximum storable oxygen amount. For this reason, the oxygen storage amount OSA of the upstream side exhaust purification catalyst 20 can be maintained as high as possible.

<Other Example of Basic Control>

Note that, as the basic air-fuel ratio control, control different from the control shown in the above FIG. 5 may also be performed. As such control, for example, the control shown in FIG. 6 may be mentioned.

Figure 6:
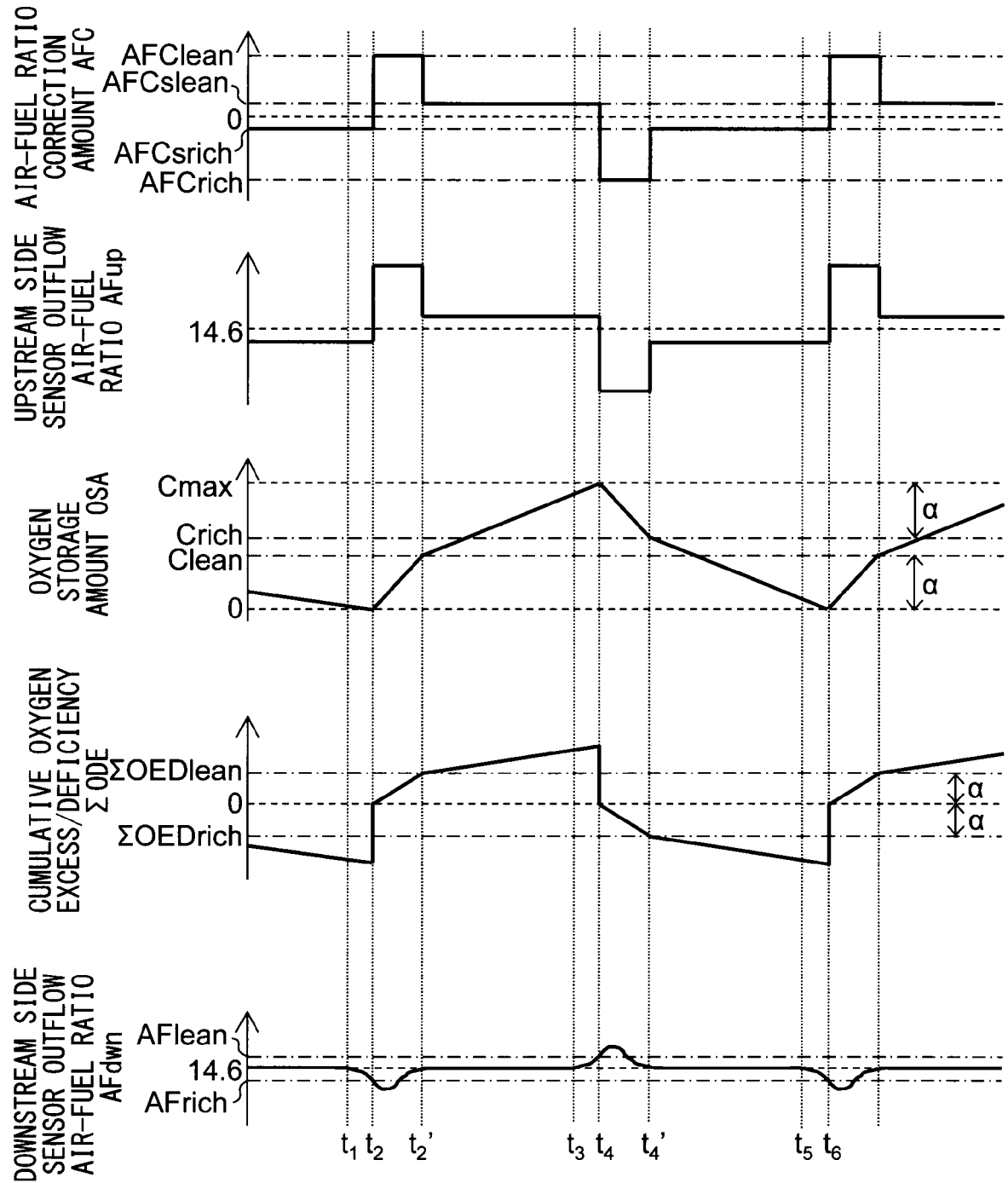
FIG. 6 is a time chart of an air-fuel ratio correction amount etc. when performing basic air-fuel ratio control by the control device of an internal combustion engine according to the present embodiment.

In the example shown in FIG. 6, up to the time $t_2$, control similar to the example shown in FIG. 5 is performed. At the time $t_2$, the air-fuel ratio correction amount AFC is switched to the lean set correction amount AFClean and the oxygen storage amount OSA of the upstream side exhaust purification catalyst 20 increases. In this way, if the oxygen storage amount OSA increases, the air-fuel ratio of the exhaust gas flowing out from the upstream side exhaust purification catalyst 20 changes toward the stoichiometric air-fuel ratio. In the example shown in FIG. 6, at the time $t_2'$, the output air-fuel ratio AFdwn of the downstream side air-fuel ratio sensor 41 becomes a value larger than the rich judged air-fuel ratio AFrich. That is, the output air-fuel ratio AFdwn of the downstream side air-fuel ratio sensor 41 becomes substantially the stoichiometric air-fuel ratio. This means that the oxygen storage amount OSA of the upstream side exhaust purification catalyst 20 is becoming greater by a certain extent.

Therefore, in the control shown in FIG. 6, when the output air-fuel ratio AFdwn of the downstream side air-fuel ratio sensor 41 changes to a value larger than the rich judged air-fuel ratio AFrich, the air-fuel ratio correction amount AFC is switched to the weak lean set correction amount AFCslean (corresponding to weak lean set air-fuel ratio). Here, the weak lean set air-fuel ratio is a lean air-fuel ratio with a smaller lean degree than the lean set air-fuel ratio (smaller difference from stoichiometric air-fuel ratio), for example, 14.62 to 15.7, preferably 14.63 to 15.2, more preferably 14.65 to 14.9 or so.

If, at the time $t_2'$, the air-fuel ratio correction amount AFC is switched to the weak lean set correction amount AFCslean, the lean degree of the exhaust gas flowing into the upstream side exhaust purification catalyst 20 also becomes smaller. Along with this, the output air-fuel ratio AFup of the upstream side air-fuel ratio sensor 40 becomes smaller and the speed of increase of the oxygen storage amount OSA of the upstream side exhaust purification catalyst 20 falls. After that, at the time $t_3$, the output air-fuel ratio AFdwn of the downstream side air-fuel ratio sensor 41 starts to rise. At the time $t_4$, it reaches the lean judged air-fuel ratio AFlean, and the air-fuel ratio correction amount AFC is switched to the rich set correction amount AFCrich.

Further, if, at the time $t_4$, the air-fuel ratio of the exhaust gas flowing into the upstream side exhaust purification catalyst 20 changes to the rich air-fuel ratio, the oxygen storage amount OSA of the upstream side exhaust purification catalyst 20 decreases. If, in this way, the oxygen storage amount OSA decreases, the air-fuel ratio of the exhaust gas flowing out from the upstream side exhaust purification catalyst 20 changes toward the stoichiometric air-fuel ratio. In the example shown in FIG. 6, at the time $t_4'$, the output air-fuel ratio AFdwn of the downstream side air-fuel ratio sensor 41 becomes a value smaller than the lean judged air-fuel ratio AFlean. That is, the output air-fuel ratio AFdwn of the downstream side air-fuel ratio sensor 41 becomes substantially the stoichiometric air-fuel ratio. This means that the oxygen storage amount OSA of the upstream side exhaust purification catalyst 20 becomes smaller by a certain extent.

Therefore, in the control shown in FIG. 6, when the output air-fuel ratio AFdwn of the downstream side air-fuel ratio sensor 41 changes to a value smaller than the lean judged air-fuel ratio AFlean, the air-fuel ratio correction amount AFC is switched from the rich set correction amount to the weak rich set correction amount AFCsrich (corresponding to weak rich set air-fuel ratio). Here, the weak rich set air-fuel ratio is a rich air-fuel ratio with a smaller rich degree than the rich set air-fuel ratio (smaller difference from stoichiometric air-fuel ratio), for example, 13.5 to 14.58, preferably 14 to 14.57, more preferably 14.3 to 14.55 or so.

If, at the time $t_4'$, switching the air-fuel ratio correction amount AFC to the weak rich set correction amount AFCsrich, the rich degree of the air-fuel ratio of the exhaust gas flowing into the upstream side exhaust purification catalyst 20 also becomes smaller. Along with this, the output air-fuel ratio AFup of the upstream side air-fuel ratio sensor 40 increases and the speed of decrease of the oxygen storage amount OSA of the upstream side exhaust purification catalyst 20 falls. After that, at the time $t_5$, the output air-fuel ratio AFdwn of the downstream side air-fuel ratio sensor 41 starts to fall. At the time $t_6$, it reaches the rich judged air-fuel ratio AFrich, and the air-fuel ratio correction amount AFC is switched to the lean set correction amount AFClean.

According to the air-fuel ratio control shown in FIG. 6, at the time $t_2$ right after the target air-fuel ratio is changed from the rich air-fuel ratio to the lean air-fuel ratio and at the time $t_5$ right after the target air-fuel ratio is changed from the lean air-fuel ratio to the rich air-fuel ratio, the difference from the stoichiometric air-fuel ratio is made a large one (that is, is made one with a large rich degree or lean degree). For this reason, it is possible to quickly decrease the unburned gas which flowed out from the upstream side exhaust purification catalyst 20 at the time $t_2$ and the $NO_x$ which flowed out from the upstream side exhaust purification catalyst 20 at the time $t_5$. Therefore, it is possible to suppress the outflow of unburned gas and $NO_x$ from the upstream side exhaust purification catalyst 20.

Further, according to the air-fuel ratio control shown in FIG. 6, at the time $t_2'$, the target air-fuel ratio is switched to weak lean set air-fuel ratio. By making the rich degree of the target air-fuel ratio (difference from stoichiometric air-fuel ratio) smaller in this way, for example, at the time $t_4$ etc., even if $NO_x$ flowed out from the upstream side exhaust purification catalyst 20, the amount of outflow per unit time can be decreased. In addition, according to the air-fuel ratio control shown in FIG. 6, at the time $t_4'$, the target air-fuel ratio is switched to the weak rich set air-fuel ratio. By making the rich degree of the target air-fuel ratio (difference from stoichiometric air-fuel ratio) smaller in this way, for example, at the time $t_6$ etc., even if unburned gas flowed out from the upstream side exhaust purification catalyst 20, the amount of outflow per unit time can be decreased.

Note that, in the example shown in FIG. 6, the time $t_2'$ and time $t_4'$ and other such timing for switching the air-fuel ratio correction amount AFC are not necessarily set based on the output air-fuel ratio AFdwn of the downstream side air-fuel ratio sensor 41 and may be determined based on other parameters.

For example, the timings for switching the air-fuel ratio correction amount AFC may be determined based on the oxygen storage amount OSA of the upstream side exhaust purification catalyst 20. For example, as shown in FIG. 6, the air-fuel ratio correction amount AFC may be switched to the weak lean set correction amount AFCslean when, at the time $t_2$, the oxygen storage amount OSA of the upstream side exhaust purification catalyst 20 reaches a predetermined amount a from when switching the target air-fuel ratio to the lean air-fuel ratio. Further, the air-fuel ratio correction amount AFC may be switched to the weak rich set correction amount AFCsrich when, at the time $t_4$, the oxygen storage amount OSA of the upstream side exhaust purification catalyst 20 decreases by exactly a predetermined amount a from when switching the target air-fuel ratio to the rich air-fuel ratio.

In this case, the oxygen storage amount OSA of the upstream side exhaust purification catalyst 20 is estimated based on the cumulative oxygen excess/deficiency of the exhaust gas flowing into the upstream side exhaust purification catalyst 20. The "oxygen excess/deficiency" means the oxygen becoming in excess or oxygen becoming deficient (amount of excess unburned gas etc.) when trying to make an air-fuel ratio of exhaust gas flowing into the upstream side exhaust purification catalyst 20 the stoichiometric air-fuel ratio. In particular, when the target air-fuel ratio becomes the lean set air-fuel ratio, the oxygen in the exhaust gas flowing into the upstream side exhaust purification catalyst 20 becomes in excess. This excess oxygen is stored in the upstream side exhaust purification catalyst 20. Therefore, the cumulative value of the oxygen excess/deficiency (below, referred to as the "cumulative oxygen excess/deficiency") can be said to express the oxygen storage amount OSA of the upstream side exhaust purification catalyst 20. As shown in FIG. 6, in the present embodiment, the cumulative oxygen excess/deficiency $\Sigma OED$ is reset to zero when the air-fuel ratio correction amount AFC changes beyond zero, that is, when the target air-fuel ratio changes beyond the stoichiometric air-fuel ratio.

Note that, the oxygen excess/deficiency is calculated based on the output air-fuel ratio AFup of the upstream side air-fuel ratio sensor 40 and the estimated value of the intake air amount to the combustion chamber 5 calculated based on the air flowmeter 39 etc. or amount of feed of fuel from the fuel injector 11 etc. Specifically, the oxygen excess/deficiency OED is, for example, calculated by the following formula (1).

$$OED = 0.23 \cdot Qi/(AFup - AFR) \quad (1)$$

where, 0.23 is the concentration of oxygen in the air, Qi is the fuel injection amount, AFup is the output air-fuel ratio of the upstream side air-fuel ratio sensor 40, and AFR is the later explained control center air-fuel ratio.

<Deviation at Upstream Side Air-Fuel Ratio Sensor>

In this regard, when the engine body 1 has a plurality of cylinders, sometimes deviation occurs between cylinders in the air-fuel ratios of exhaust gas discharged from the cylinders. On the other hand, the upstream side air-fuel ratio sensor 40 is arranged at the header of the exhaust manifold 19, but the extent by which the exhaust gas discharged from the individual cylinders contacts the upstream side air-fuel ratio sensor 40 differs between cylinders depending on the position of arrangement. As a result of this, the output air-fuel ratio of the upstream side air-fuel ratio sensor 40 is strongly affected by the air-fuel ratio of the exhaust gas which is discharged from a certain specific cylinder. For this reason, if the air-fuel ratio of exhaust gas discharged from this certain specific cylinder becomes an air-fuel ratio different from the average air-fuel ratio of the exhaust gas discharged from all cylinders, deviation occurs between the average air-fuel ratio and the output air-fuel ratio of the upstream side air-fuel ratio sensor 40. That is, the output air-fuel ratio of the upstream side air-fuel ratio sensor 40 deviates to the rich side or the lean side from the actual average air-fuel ratio of the exhaust gas.

Further, in the unburned gas, the hydrogen has a fast speed of passage through the diffusion regulating layer of the air-fuel ratio sensor. For this reason, if the concentration of hydrogen in the exhaust gas is high, the output air-fuel ratio of the upstream side air-fuel ratio sensor 40 ends up deviating to the side lower than the actual air-fuel ratio of the exhaust gas (that is, the rich side). If, in this way, deviation occurs in the output air-fuel ratio of the upstream side air-fuel ratio sensor 40, the above-mentioned such control can no longer be suitably performed.

<Learning Control>

Therefore, in the present embodiment, to compensate for the deviation in the output air-fuel ratio of the upstream side air-fuel ratio sensor 40, during normal operation (that is, when the above-mentioned such target air-fuel ratio is used as the basis for feedback control), learning control is performed. Below, this learning control will be explained.

Figure 7:
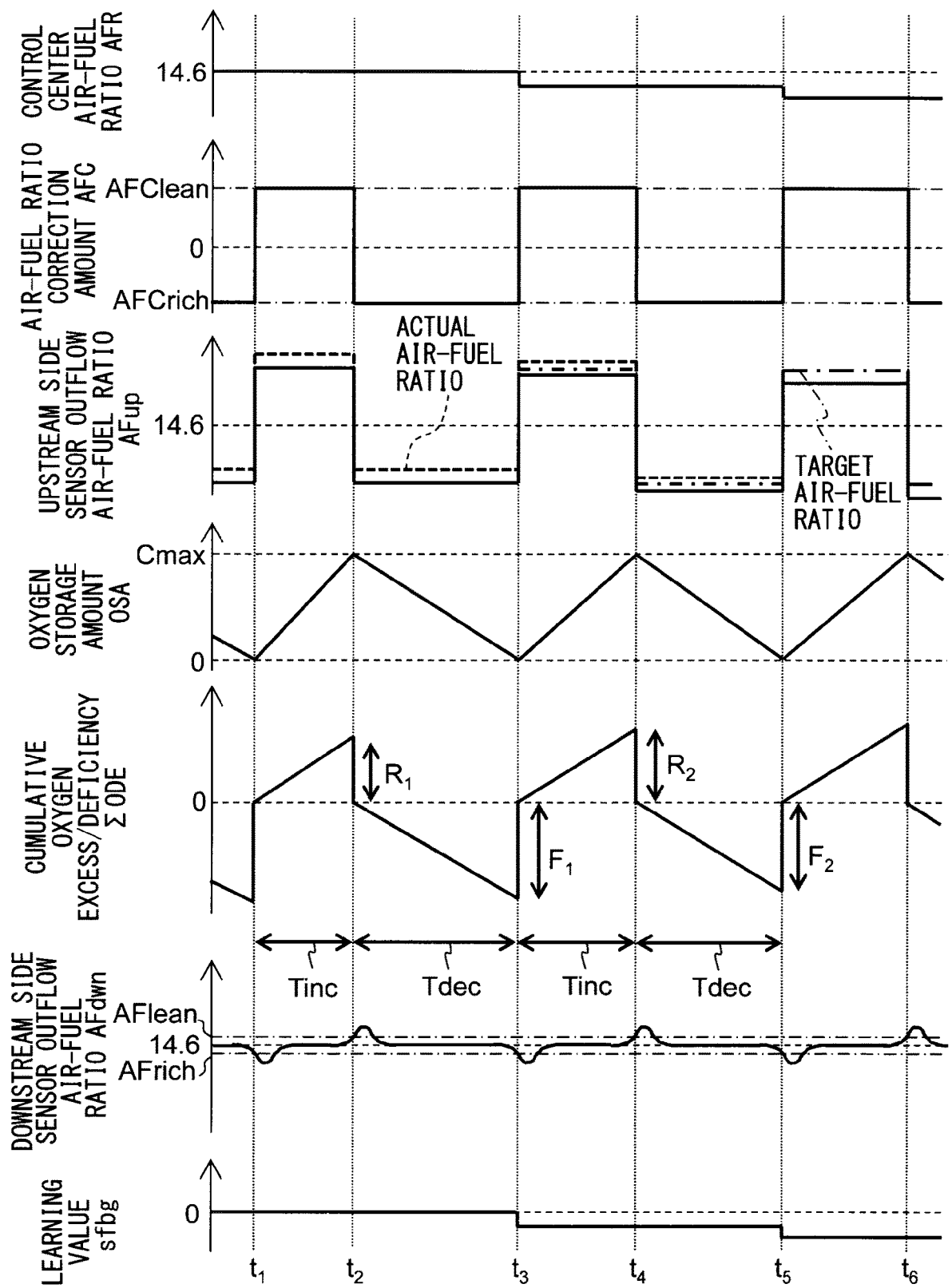
FIG. 7 is a time chart of an air-fuel ratio correction amount etc. when performing learning control.

Here, the time period from when switching the target air-fuel ratio to the lean air-fuel ratio to when the output air-fuel ratio of the downstream side air-fuel ratio sensor 41 becomes the lean judged air-fuel ratio or more will be referred to as the "oxygen increase time period". In the same way, the time period from when switching the target air-fuel ratio to the rich air-fuel ratio to when the output air-fuel ratio of the downstream side air-fuel ratio sensor 41 becomes the rich judged air-fuel ratio or less will be referred to as the "oxygen decrease time period". In the learning control of the present embodiment, as the absolute value of the cumulative oxygen excess/deficiency ΣOED at the oxygen increase time period, the lean oxygen cumulative value is calculated. In addition, as the absolute value of the cumulative oxygen excess/deficiency at the oxygen decrease time period, the rich oxygen cumulative value is calculated. Further, the difference between these lean oxygen cumulative value and rich oxygen cumulative value is made to become smaller by correcting the control center air-fuel ratio AFR. FIG. 7 shows this situation.

FIG. 7 is a time chart of the control center air-fuel ratio AFR, air-fuel ratio correction amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and learning value sfbg. FIG. 7 shows the case where the output air-fuel ratio AFup of the upstream side air-fuel ratio sensor 40 deviates to the low side (rich side). Note that, the learning value sfbg is a value set so as to change according to the deviation of the output air-fuel ratio (output current) of the upstream side air-fuel ratio sensor 40. In the present embodiment, it is used for correcting the control center air-fuel ratio AFR. Further, in the figure, the solid line at the output air-fuel ratio AFup of the upstream side air-fuel ratio sensor 40 indicates the output air-fuel ratio of the upstream side air-fuel ratio sensor 40, while the broken line indicates the actual air-fuel ratio of the exhaust gas flowing around the upstream side air-fuel ratio sensor 40. In addition, the one-dot chain line indicates the target air-fuel ratio, that is, the air-fuel ratio corresponding to the air-fuel ratio correction amount AFC.

In the illustrated example, in the same way as FIG. 5, in the state before the time $t_1$, the control center air-fuel ratio AFR is made the stoichiometric air-fuel ratio while the air-fuel ratio correction amount AFC is set to the rich set correction amount AFCrich. At this time, the output air-fuel ratio AFup of the upstream side air-fuel ratio sensor 40 becomes an air-fuel ratio corresponding to the rich set air-fuel ratio as shown by the solid line. However, the output air-fuel ratio AFup of the upstream side air-fuel ratio sensor 40 is deviated, so the actual air-fuel ratio of the exhaust gas becomes an air-fuel ratio leaner than the rich set air-fuel ratio (broken line in FIG. 7).

In the example shown in FIG. 7, at the time $t_1$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. At the time $t_1$ on, the output air-fuel ratio of the upstream side air-fuel ratio sensor 40 becomes an air-fuel ratio corresponding to the lean set air-fuel ratio. However, due to deviation of the output air-fuel ratio of the upstream side air-fuel ratio sensor 40, the actual air-fuel ratio of the exhaust gas becomes an air-fuel ratio leaner than the lean set air-fuel ratio, that is, becomes an air-fuel ratio with a large lean degree (see broken line in FIG. 7). For this reason, the oxygen storage amount OSA of the upstream side exhaust purification catalyst 20 rapidly increases.

After that, at the time $t_2$ when the oxygen storage amount OSA of the upstream side exhaust purification catalyst 20 becomes greater and the output air-fuel ratio AFdwn of the downstream side air-fuel ratio sensor 41 becomes the lean judged air-fuel ratio AFlean or more, the air-fuel ratio correction amount AFC is switched to the rich set correction amount AFCrich. However, due to the deviation in the output air-fuel ratio of the upstream side air-fuel ratio sensor 40, the actual air-fuel ratio of the exhaust gas becomes an air-fuel ratio leaner than the rich set air-fuel ratio, that is, an air-fuel ratio with a small rich degree (see broken line in FIG. 7). For this reason, the speed of decrease of the oxygen storage amount OSA of the upstream side exhaust purification catalyst 20 is slow.

In this regard, in the present embodiment, at the time $t_1$ to the time $t_2$, the cumulative oxygen excess/deficiency ΣOED is calculated. That is, the cumulative oxygen excess/deficiency ΣOED is calculated in the time period from when the target air-fuel ratio is switched to the lean air-fuel ratio (time $t_1$) to the time when the output air-fuel ratio AFdwn of the downstream side air-fuel ratio sensor 41 becomes the lean judged air-fuel ratio AFlean or more (time $t_2$), that is, the oxygen increase time period Tinc. In FIG. 7, the absolute value of the cumulative oxygen excess/deficiency ΣOED at the oxygen increase time period Tinc at the time $t_1$ to time $t_2$ is shown by $R_1$.

The absolute value $R_1$ of the cumulative oxygen excess/deficiency ΣOED of this oxygen increase time period Tinc corresponds to the oxygen storage amount OSA at the time $t_2$. However, as explained above, for estimation of the oxygen excess/deficiency, the output air-fuel ratio AFup of the upstream side air-fuel ratio sensor 40 is used. This output air-fuel ratio AFup has deviated. For this reason, in the example shown in FIG. 7, the cumulative oxygen excess/deficiency ΣOED of the oxygen increase time period Tinc at the time $t_1$ to time $t_2$ is smaller than the value corresponding to the actual oxygen storage amount OSA at the time $t_2$.

Further, in the present embodiment, at the time $t_2$ to the time $t_3$ as well, the cumulative oxygen excess/deficiency ΣOED is calculated. That is, the cumulative oxygen excess/deficiency ΣOED is calculated in the time period from when the target air-fuel ratio is switched to the rich air-fuel ratio (time $t_2$) to the time when the output air-fuel ratio AFdwn of the downstream side air-fuel ratio sensor 41 becomes the rich judged air-fuel ratio AFrich or more (time $t_3$), that is, the oxygen decrease time period Tdec. In FIG. 7, the absolute value of the cumulative oxygen excess/deficiency ΣOED at the oxygen decrease time period Tdec at the time $t_2$ to time $t_3$ is shown by $F_1$.

The absolute value $F_1$ of the cumulative oxygen excess/deficiency ΣOED of this oxygen decrease time period Tdec corresponds to the total amount of oxygen released from the upstream side exhaust purification catalyst 20 from the time $t_2$ to the time $t_3$. However, as explained above, the output air-fuel ratio AFup of the upstream side air-fuel ratio sensor 40 has deviated. For this reason, in the example shown in FIG. 7, the cumulative oxygen excess/deficiency ΣOED at the oxygen decrease time period Tdec at the time $t_2$ to time $t_3$ becomes greater than the value corresponding to the total amount of oxygen released from the upstream side exhaust purification catalyst 20 from the time $t_2$ to the time $t_3$.

Here, in the oxygen increase time period Tinc, the upstream side exhaust purification catalyst 20 stores oxygen, while in the oxygen decrease time period Tdec, all of the stored oxygen is released. Therefore, the absolute value $R_1$ of the cumulative oxygen excess/deficiency in the oxygen increase time period Tinc and the absolute value $F_1$ of the cumulative oxygen excess/deficiency in the oxygen decrease time period Tdec should basically become the same value. In this regard, as explained above, if the output air-fuel ratio AFup of the upstream side air-fuel ratio sensor 40 has deviated, the cumulative value of these also changes in response to this deviation. As explained above, when the output air-fuel ratio of the upstream side air-fuel ratio sensor 40 has deviated to the low side (rich side), the absolute value $F_1$ becomes greater than the absolute value $R_1$. Conversely, when the output air-fuel ratio of the upstream side air-fuel ratio sensor 40 has deviated to the high (lean side), the absolute value $F_1$ becomes smaller than the absolute value $R_1$. In addition, the difference $\Delta\Sigma OED$ of the absolute value $R_1$ of the cumulative oxygen excess/deficiency in the oxygen increase time period Tinc and the absolute value $F_1$ of the cumulative oxygen excess/deficiency in the oxygen decrease time period Tdec ($=R_1-F_1$. Below, referred to as the "excess/deficiency difference") expresses the extent of deviation in the output air-fuel ratio of the upstream side air-fuel ratio sensor 40. The greater the difference of these absolute values $R_1$ and $F_1$, the greater the output air-fuel ratio of the upstream side air-fuel ratio sensor 40 can be said to become.

Therefore, in the present embodiment, the excess/deficiency difference $\Delta\Sigma OED$ is used as the basis to correct the control center air-fuel ratio AFR. In particular, in the present embodiment, the control center air-fuel ratio AFR is corrected so that the difference $\Delta\Sigma OED$ between the absolute value $R_1$ of the cumulative oxygen excess/deficiency in the oxygen increase time period Tinc and the absolute value $F_1$ of the cumulative oxygen excess/deficiency in the oxygen decrease time period Tdec becomes smaller.

Specifically, in the present embodiment, the following formula (2) is used to calculate the learning value sfbg and the following formula (3) is used to correct the control center air-fuel ratio AFR.

$$sfbg(n)=sfbg(n-1)+k_1\cdot\Delta\Sigma OED \quad (2)$$

$$AFR=AFRbase+sfbg(n) \quad (3)$$

Note that, in the above formula (2), "n" expresses the number of times of calculation or the time period. Therefore, sfbg(n) is the learning value at the time of the current calculation or the current time. In addition, in the above formula (2), $k_1$ is the gain expressing the extent by which the excess/deficiency difference $\Delta\Sigma OED$ is reflected in the control center air-fuel ratio AFR. The larger the value of the gain $k_1$, the larger the correction amount of the control center air-fuel ratio AFR becomes. Furthermore, in the above formula (3), the basic control center air-fuel ratio AFRbase is the control center air-fuel ratio forming the basic level, in the present embodiment, the stoichiometric air-fuel ratio.

In FIG. 7 at the time $t_3$, as explained above, the absolute values $R_1$ and $F_1$ are used as the basis to calculate the learning value sfbg. In particular, in the example shown in FIG. 7, the absolute value $F_1$ of the cumulative oxygen excess/deficiency in the oxygen decrease time period Tdec is larger than the absolute value $R_1$ of the cumulative oxygen excess/deficiency in the oxygen increase time period Tinc, so at the time $t_3$, the learning value sfbg is made to decrease.

Here, the control center air-fuel ratio AFR is corrected using the above formula (3) based on the learning value sfbg. In the example shown in FIG. 7, the learning value sfbg is a negative value, so the control center air-fuel ratio AFR becomes a value smaller than the basic control center air-fuel ratio AFRbase, that is, a rich side value. Due to this, the air-fuel ratio of the exhaust gas flowing into the upstream side exhaust purification catalyst 20 is corrected to the rich side.

As a result of this, at the time $t_3$ on, the deviation from the actual air-fuel ratio of the target air-fuel ratio of the exhaust gas flowing into the upstream side exhaust purification catalyst 20 becomes smaller compared with before the time $t_3$. Therefore, at the time $t_3$ on, the difference between the broken line showing the actual air-fuel ratio and the one-dot chain line showing the target air-fuel ratio becomes smaller than the difference before the time $t_3$ (before the time $t_3$, the target air-fuel ratio matched the output air-fuel ratio of the downstream side air-fuel ratio sensor 41, so was superposed on the solid line).

Further, at the time $t_3$ on as well, an operation similar to the operation at the time $t_1$ to time $t_3$ is performed. Therefore, if, at the time $t_4$, the output air-fuel ratio AFdwn of the downstream side air-fuel ratio sensor 41 becomes the lean judged air-fuel ratio AFlean or more, the target air-fuel ratio is switched from the lean air-fuel ratio to the rich air-fuel ratio. After that, if, at the time $t_5$, the output air-fuel ratio AFdwn of the downstream side air-fuel ratio sensor 41 becomes the rich judged air-fuel ratio AFrich or less, the target air-fuel ratio is again switched to the lean air-fuel ratio.

The time $t_3$ to time $t_4$, as explained above, corresponds to the oxygen increase time period Tinc. Accordingly, the absolute value of the cumulative oxygen excess/deficiency $\Sigma OED$ during this interval can be expressed by $R_2$ of FIG. 7. Further, at the time $t_4$ to time $t_5$, as explained above, corresponds to the oxygen decrease time period Tdec. Accordingly, the absolute value of the cumulative oxygen excess/deficiency $\Sigma OED$ during this interval can be expressed by $F_2$ of FIG. 7. Further, the difference $\Delta\Sigma OED$ of these absolute values $R_2$ and $F_2$ ($=R_2-F_2$) is used as the basis to update the learning value sfbg using the above formula (2). In the present embodiment, at the time $t_5$ on as well, similar control is repeated. Due to this, the learning value sfbg is repeatedly updated.

If using learning control to update the learning value sfbg in this way, the output air-fuel ratio AFup of the upstream side air-fuel ratio sensor 40 gradually moves away from the target air-fuel ratio, but the actual air-fuel ratio of the exhaust gas flowing into the upstream side exhaust purification catalyst 20 gradually approaches the target air-fuel ratio. Due to this, deviation of the output air-fuel ratio of the upstream side air-fuel ratio sensor 40 can be compensated for.

Note that, in the above embodiment, learning control in the case where the output air-fuel ratio AFdwn of the downstream side air-fuel ratio sensor 41 alternately fluctuates between the rich judged air-fuel ratio AFrich or less and the lean judged air-fuel ratio AFlean or more is shown. However, if the deviation of the output air-fuel ratio AFup of the upstream side air-fuel ratio sensor 40 becomes greater, even if setting the air-fuel ratio correction amount AFC to the rich set correction amount AFCrich, sometimes the output air-fuel ratio AFdwn of the downstream side air-fuel ratio sensor 41 will continue to be maintained at the lean side from the rich judged air-fuel ratio. As a result of this, the oxygen increase time period Tinc will become extremely long. Further, the absolute value of the cumulative oxygen excess/deficiency $\Sigma OED$ during this will become extremely large. Therefore, in the present embodiment, if the oxygen increase time period Tinc becomes long by a certain extent or more, the learning value sfbg may be made to decrease.

If, in the same way, the deviation of the output air-fuel ratio AFup of the upstream side air-fuel ratio sensor 40 becomes greater, even if setting the air-fuel ratio correction amount AFC to the lean set correction amount AFClean, sometimes the output air-fuel ratio AFdwn of the downstream side air-fuel ratio sensor 41 will continue to be maintained at the rich side from the lean judged air-fuel ratio. As a result of this, the oxygen decrease time period Tdec will become extremely long. Further, the absolute value of the cumulative oxygen excess/deficiency ΣOED during this will become extremely small. Therefore, in the present embodiment, if the oxygen decrease time period Tdec becomes long by a certain extent or more, the learning value sfbg may be made to increase.

In addition, in the above embodiment, the cumulative oxygen excess/deficiency ΣOED at the oxygen increase time period Tinc and the cumulative oxygen excess/deficiency ΣOED at the oxygen decrease time period Tdec are used as the basis to update the learning value sfbg so that the difference of these becomes smaller. However, instead of the cumulative oxygen excess/deficiency ΣOED, a parameter relating to the cumulative oxygen excess/deficiency ΣOED (parameter which changes if the cumulative oxygen excess/deficiency ΣOED changes) may also be used as the basis to change the learning value sfbg. Therefore, for example, the oxygen increase time period Tinc and the oxygen decrease time period Tdec may be used as the basis to update the learning value sfbg so that the difference of these becomes smaller. Alternatively, the cumulative value of the intake air amount in the oxygen increase time period Tinc and the cumulative value of the intake air amount in the oxygen decrease time period Tdec may be used as the basis to update the learning value sfbg so that the difference of these becomes smaller.

Further, in the above embodiment, the learning value sfbg is used as the basis to correct the control center air-fuel ratio. However, what the learning value sfbg is used as the basis for to correct may also be another parameter relating to feedback control. As the other parameter, for example, the amount of feed of fuel to the inside of the combustion chamber 5, the output air-fuel ratio of the upstream side air-fuel ratio sensor 40, the air-fuel ratio correction amount, etc. may be mentioned.

Summarizing the above, in the present embodiment, if making the parameter relating to the cumulative oxygen excess/deficiency the excess/deficiency parameter (for example, the cumulative oxygen excess/deficiency, oxygen increase time period and oxygen decrease time period, or intake air amount), the control device (ECU) uses the value of the excess/deficiency parameter at the first time period from when switching the target air-fuel ratio to the lean air-fuel ratio to when the output air-fuel ratio AFdwn of the downstream side air-fuel ratio sensor 41 becomes the lean judged air-fuel ratio AFlean or more and the value of the excess/deficiency parameter at the second time period from when switching the target air-fuel ratio to the rich air-fuel ratio to when the output air-fuel ratio of the downstream side air-fuel ratio sensor 41 becomes the rich judged air-fuel ratio AFrich or more as the basis to correct the parameter relating to feedback control (for example, the control center air-fuel ratio, amount of feed of fuel, output air-fuel ratio of the upstream side air-fuel ratio sensor, or air-fuel ratio correction amount) for making the air-fuel ratio of the exhaust gas flowing into the upstream side exhaust purification catalyst 20 change so that the difference of these becomes small, that is, learning control can be said to be performed.

<Deviation at Downstream Side Air-Fuel Ratio Sensor>

In this regard, the above learning control is used to compensate for any deviation occurring in the output air-fuel ratio of the upstream side air-fuel ratio sensor 40 when it occurs. However, sometimes not only the output air-fuel ratio of the upstream side air-fuel ratio sensor 40, but also the downstream side air-fuel ratio sensor 41 has deviated. For example, if the drive circuit etc. of the downstream side air-fuel ratio sensor 41 becomes abnormal, the output current of the downstream side air-fuel ratio sensor 41 also suffers from center value deviation where it shifts as a whole to the large side or the small side. That is, if the downstream side air-fuel ratio sensor 41 becomes abnormal, sometimes output air-fuel ratio suffers from center value deviation.

Figure 8:
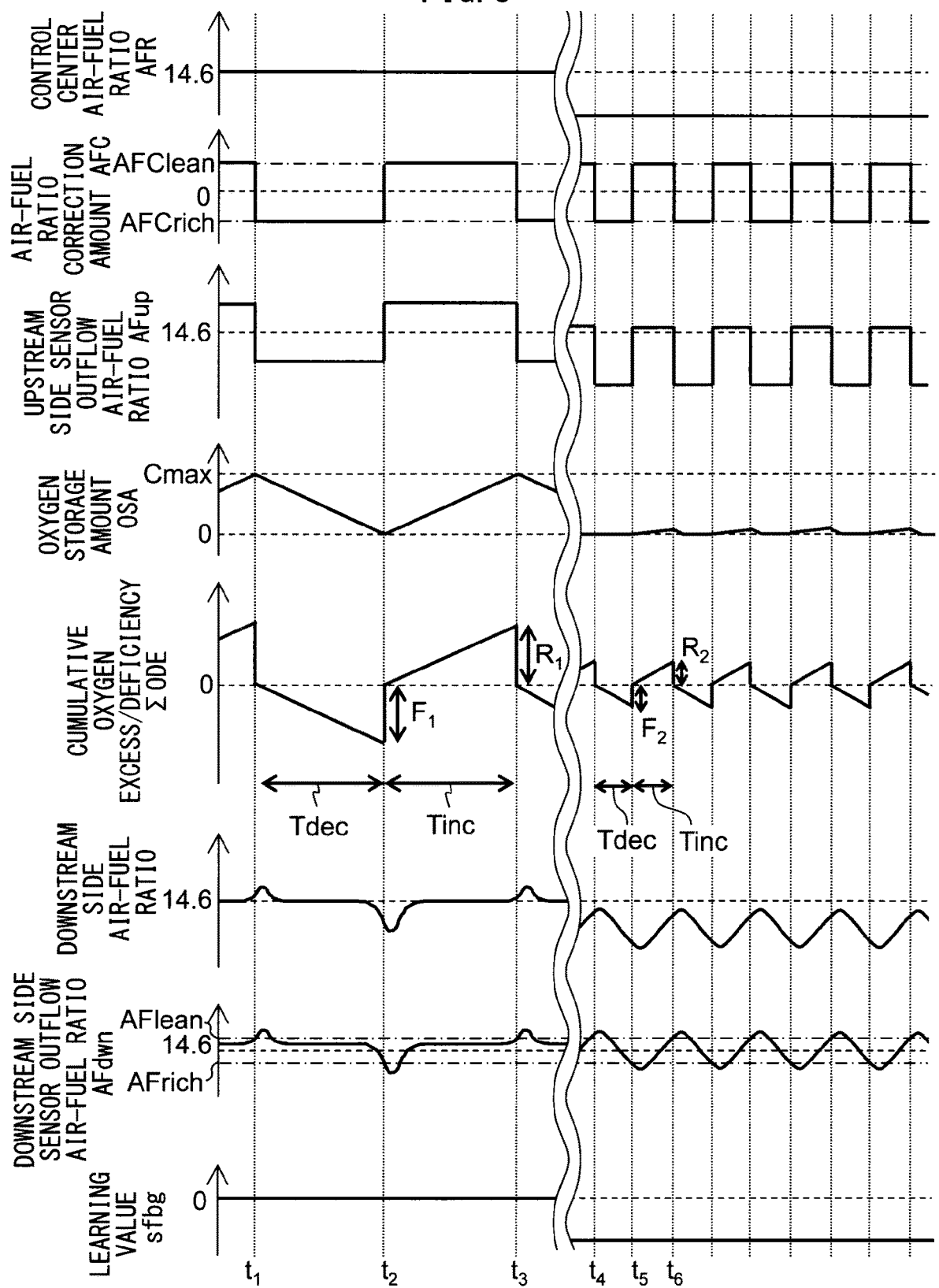
FIG. 8 is a time chart of an air-fuel ratio correction amount etc. when the output air-fuel ratio of the downstream side air-fuel ratio sensor has become deviated.

FIG. 8 is a time chart of the control center air-fuel ratio AFR etc. when the output air-fuel ratio of the downstream side air-fuel ratio sensor 41 as a whole shifts to the lean side. The left side in the figure shows the case where the amount of deviation is small, while the right side in the figure shows the case where the amount of deviation is large. Further, the downstream side air-fuel ratio in the figure shows the actual air-fuel ratio of the exhaust gas flowing around the downstream side air-fuel ratio sensor 41.

If the output air-fuel ratio of the downstream side air-fuel ratio sensor 41 only deviates a little, at the left side of FIG. 8, the output air-fuel ratio AFdwn of the downstream side air-fuel ratio sensor 41 becomes slightly leaner than the actual air-fuel ratio. For this reason, even when the actual exhaust air-fuel ratio is the stoichiometric air-fuel ratio, the output air-fuel ratio AFdwn of the downstream side air-fuel ratio sensor 41 becomes slightly the lean air-fuel ratio. However, if the deviation at the output air-fuel ratio AFdwn of the downstream side air-fuel ratio sensor 41 is small, that amount of deviation is also smaller than the difference between the rich judged air-fuel ratio AFrich and stoichiometric air-fuel ratio and the difference between the lean judged air-fuel ratio AFlean and stoichiometric air-fuel ratio.

For this reason, as will be understood from the times $t_1$ to $t_3$ of FIG. 8, when the actual exhaust air-fuel ratio is the stoichiometric air-fuel ratio, the output air-fuel ratio AFdwn of the downstream side air-fuel ratio sensor 41 is made the air-fuel ratio between the rich judged air-fuel ratio AFrich and the lean judged air-fuel ratio AFlean. Therefore, so long as the oxygen storage amount OSA of the upstream side exhaust purification catalyst 20 does not reach the maximum storable oxygen amount Cmax and oxygen does not flow out from the upstream side exhaust purification catalyst 20, the output air-fuel ratio AFdwn of the downstream side air-fuel ratio sensor 41 does not become the lean judged air-fuel ratio AFlean or more. In the same way, so long as the oxygen storage amount OSA of the upstream side exhaust purification catalyst 20 does not reach zero and unburned gas does not flow out from the upstream side exhaust purification catalyst 20, the output air-fuel ratio AFdwn of the downstream side air-fuel ratio sensor 41 does not become the rich judged air-fuel ratio AFrich or less. As a result of this, if the deviation which occurs at the output air-fuel ratio AFdwn of the downstream side air-fuel ratio sensor 41 is small, as shown at the times $t_1$ to $t_3$ in FIG. 8, control similar to FIG. 6 is performed and the above-mentioned air-fuel ratio control is not greatly obstructed. Therefore, the upstream side exhaust purification catalyst 20 suitably removes the unburned gas or $NO_x$ in the exhaust gas.

On the other hand, if the output air-fuel ratio of the downstream side air-fuel ratio sensor 41 greatly deviates, in particular if deviation greater than the difference of the rich judged air-fuel ratio AFrich or lean judged air-fuel ratio AFlean and the stoichiometric air-fuel ratio occurs, the output air-fuel ratio AFdwn of the downstream side air-fuel ratio sensor 41 is maintained at the rich judged air-fuel ratio AFrich or less or the lean judged air-fuel ratio AFlean or more. As a result of this, the above-mentioned oxygen increase time period Tinc and oxygen decrease period Tdec become greatly different values. Therefore, due to the above-mentioned learning control, the learning value is gradually made to increase or decrease.

At the right side in the example shown in FIG. 8, the output air-fuel ratio AFdwn of the downstream side air-fuel ratio sensor 41 deviates to the lean side. In this case, as a result of this, before the time $t_4$ of FIG. 8, the output air-fuel ratio AFdwn of the downstream side air-fuel ratio sensor 41 is maintained at the lean air-fuel ratio during the above-mentioned air-fuel ratio control. If, in this way, the output air-fuel ratio AFdwn is maintained at the lean air-fuel ratio, due to the above-mentioned learning control, the learning value sfbg is made to decrease. Along with this, the control center air-fuel ratio AFR is made to decrease. If, in this way, the control center air-fuel ratio AFR is made to decrease, the average air-fuel ratio of the exhaust gas flowing into the upstream side exhaust purification catalyst 20 is made to decrease. Along with this, the air-fuel ratio of the exhaust gas flowing around the downstream side air-fuel ratio sensor 41 shifts to the rich side and the output air-fuel ratio AFdwn of the downstream side air-fuel ratio sensor 41 approaches the stoichiometric air-fuel ratio.

If such control is repeated, finally, the control of the air-fuel ratio converges to the cycle such as shown at the time $t_4$ on in FIG. 8. Specifically, at the time $t_4$ on, it converges to the following such cycle. Before the time $t_4$, as explained above, the learning value sfbg is made to decrease, so the control center air-fuel ratio AFR also greatly deviates to the stoichiometric air-fuel ratio. For this reason, the air-fuel ratio of the exhaust gas flowing into the upstream side exhaust purification catalyst 20 also deviates to the rich side and the output air-fuel ratio AFup of the upstream side air-fuel ratio sensor 40 also deviates to the rich side. However, when calculating the cumulative oxygen excess/deficiency ΣOED, as shown in the above formula (1), the value of the output air-fuel ratio AFup of the upstream side air-fuel ratio sensor 40 minus the control center air-fuel ratio AFR is used. For this reason, deviation of the control center air-fuel ratio AFR has no effect on the calculation of ΣOED.

Further, in the example shown in FIG. 8, at the time $t_4$, the output air-fuel ratio AFdwn of the downstream side air-fuel ratio sensor 41 becomes the lean judged air-fuel ratio AFlean or more. At this time, the output air-fuel ratio AFdwn of the downstream side air-fuel ratio sensor 41 greatly deviates to the lean side, the actual air-fuel ratio of the exhaust gas flowing around the downstream side air-fuel ratio sensor 41 becomes the rich air-fuel ratio. If, at the time $t_4$, the output air-fuel ratio AFdwn of the downstream side air-fuel ratio sensor 41 becomes the lean judged air-fuel ratio AFlean or more, the air-fuel ratio correction amount AFC is switched to the rich set correction amount AFCrich. Due to this, the air-fuel ratio of the exhaust gas flowing into the upstream side exhaust purification catalyst 20 changes to the rich side and accordingly the output air-fuel ratio AFup of the upstream side air-fuel ratio sensor 40 also changes to the rich side.

Since the oxygen storage amount OSA of the upstream side exhaust purification catalyst 20 becomes substantially zero, if the air-fuel ratio of the exhaust gas flowing into the upstream side exhaust purification catalyst 20 changes to the rich side, the air-fuel ratio of the exhaust gas flowing out from the upstream side exhaust purification catalyst 20, that is, the actual air-fuel ratio of the exhaust gas flowing around the downstream side air-fuel ratio sensor 41, also changes to the rich side as is. Therefore, the output air-fuel ratio AFdwn of the downstream side air-fuel ratio sensor 41 also similarly changes to the rich side. At this time, the oxygen storage amount OSA of the upstream side exhaust purification catalyst 20 remains substantially zero, so the air-fuel ratio of the exhaust gas flowing out from the upstream side exhaust purification catalyst 20 is no longer held at a constant air-fuel ratio midway, but changes to the rich side along with the change of the air-fuel ratio of the exhaust gas flowing into the upstream side exhaust purification catalyst 20. As a result of this, the output air-fuel ratio AFdwn of the downstream side air-fuel ratio sensor 41 reaches the rich judged air-fuel ratio AFrich immediately after the air-fuel ratio correction amount AFC is switched to the rich set air-fuel ratio AFCrich at the time $t_5$.

If, at the time $t_5$, the output air-fuel ratio AFdwn of the downstream side air-fuel ratio sensor 41 becomes the rich judged air-fuel ratio AFrich or less, the air-fuel ratio correction amount AFC is switched from the rich set air-fuel ratio AFCrich to the lean set air-fuel ratio AFClean. Due to this, the air-fuel ratio of the exhaust gas flowing into the upstream side exhaust purification catalyst 20 changes to the lean side and accordingly the output air-fuel ratio AFup of the upstream side air-fuel ratio sensor 40 also changes to the lean side. At this time, as explained above, the control center air-fuel ratio AFR has deviated to the rich side, so the air-fuel ratio of the exhaust gas flowing into the upstream side exhaust purification catalyst 20 becomes a low lean degree lean air-fuel ratio or a rich air-fuel ratio. Therefore, the output air-fuel ratio AFup of the upstream side air-fuel ratio sensor 40 also becomes a low lean degree lean air-fuel ratio or rich air-fuel ratio (in the example shown in FIG. 8, becomes a low lean degree lean air-fuel ratio).

In this way, if, at the time $t_5$, the air-fuel ratio of the exhaust gas flowing into the upstream side exhaust purification catalyst 20 changes to the lean side, along with this, the air-fuel ratio of the exhaust gas flowing out from the upstream side exhaust purification catalyst 20 also gradually changes to the lean side. Therefore, if, at the time $t_5$, the air-fuel ratio correction amount AFC changes to the rich set air-fuel ratio AFCrich, the output air-fuel ratio AFdwn of the downstream side air-fuel ratio sensor 41 also gradually changes to the lean side along with somewhat of a delay.

Here, as explained above, the output air-fuel ratio AFdwn of the downstream side air-fuel ratio sensor 41 has greatly deviated to the lean side. For this reason, before the actual air-fuel ratio of the exhaust gas flowing out from the upstream side exhaust purification catalyst 20 reaches the stoichiometric air-fuel ratio, at the time $t_6$, the output air-fuel ratio AFdwn of the downstream side air-fuel ratio sensor 41 ends up reaching the lean judged air-fuel ratio AFlean. For this reason, the air-fuel ratio correction amount AFC switches the lean set correction amount AFClean to the rich set correction amount AFCrich at the time $t_6$.

If, in this way, the output air-fuel ratio AFdwn of the downstream side air-fuel ratio sensor 41 greatly deviates to the lean side, as will be understood from FIG. 8, the air-fuel ratio of the exhaust gas flowing out from the upstream side exhaust purification catalyst 20 constantly becomes the rich air-fuel ratio. Therefore, in this case, exhaust gas containing unburned fuel ends up flowing out from the upstream side exhaust purification catalyst 20 over a long time. Conversely, if the output air-fuel ratio AFdwn of the downstream side air-fuel ratio sensor 41 has greatly deviated to the rich side, conversely from the case shown in FIG. 8, the air-fuel ratio of the exhaust gas flowing out from the upstream side exhaust purification catalyst 20 constantly becomes the lean air-fuel ratio. Therefore, in this case, exhaust gas containing $NO_x$ ends up flowing out from the upstream side exhaust purification catalyst 20 over a long time.

<Diagnosis of Downstream Side Air-Fuel Ratio Sensor for Abnormality>

For this reason, it becomes necessary to diagnose if the output air-fuel ratio AFdwn of the downstream side air-fuel ratio sensor 41 has greatly deviated, that is, if the downstream side air-fuel ratio sensor 41 has become abnormal (or if it is normal). Here, as shown in FIG. 8, if the output air-fuel ratio AFdwn of the downstream side air-fuel ratio sensor 41 has greatly deviated, while the output air-fuel ratio AFdwn changes from the rich judged air-fuel ratio AFrich to the lean judged air-fuel ratio AFlean or while it changes in reverse, the upstream side exhaust purification catalyst 20 does not store or release oxygen. For this reason, the output air-fuel ratio AFdwn of the downstream side air-fuel ratio sensor 41 repeatedly alternates between the rich judged air-fuel ratio AFrich or less and lean judged air-fuel ratio or more by a short cycle.

Therefore, in the present embodiment, when the absolute value of the cumulative oxygen excess/deficiency ΣOED at the oxygen increase time period Tinc or the oxygen decrease time period Tdec becomes a predetermined limit value or less, it is judged that the downstream side air-fuel ratio sensor 41 has become abnormal. Conversely, when the absolute value of this cumulative oxygen excess/deficiency ΣOED is larger than the above limit value, the downstream side air-fuel ratio sensor 41 has not become abnormal with center value deviation and is judged normal as "control for normal judgment". Here, the predetermined limit value is an amount smaller than the maximum storable oxygen amount when the upstream side exhaust purification catalyst 20 is new.

In the example shown in FIG. 8, when the deviation which occurs at the output air-fuel ratio AFdwn of the downstream side air-fuel ratio sensor 41 is small, that is, at the times $t_1$ to $t_3$, the absolute value $F_1$ of the cumulative oxygen excess/deficiency ΣOED at the oxygen decrease time period Tdec and the absolute value $R_1$ of the cumulative oxygen excess/deficiency ΣOED at the oxygen increase time period Tinc are relatively large. For this reason, the average of these absolute values $F_1$ and $R_1$ becomes a value larger than the above-mentioned limit value. Therefore, it is judged that the output air-fuel ratio AFdwn of the downstream side air-fuel ratio sensor 41 has not become abnormal.

On the other hand, when the deviation which occurs in the output air-fuel ratio AFdwn of the downstream side air-fuel ratio sensor 41 is large, that is, in FIG. 8, at the time $t_4$ on, the absolute value $F_2$ of the cumulative oxygen excess/deficiency ΣOED at the oxygen decrease time period Tdec and the absolute value $R_2$ of the cumulative oxygen excess/deficiency ΣOED at the oxygen increase time period Tinc are small. For this reason, the average of these absolute values $F_2$ and $R_2$ becomes a value of the above-mentioned limit value or less. Therefore, it is judged that the output air-fuel ratio AFdwn of the downstream side air-fuel ratio sensor 41 has become abnormal.

Note that, in the above embodiment, the absolute value F of the cumulative oxygen excess/deficiency ΣOED at the oxygen decrease time period Tdec and the absolute value R of the cumulative oxygen excess/deficiency ΣOED in the oxygen increase time period Tinc are used as the basis for control for judgment of normality of the downstream side air-fuel ratio sensor 41. However, just one of the absolute values F and R may also be used as the basis for control for judgment of normality of the downstream side air-fuel ratio sensor 41. Further, in the above embodiment, the absolute values F and R are respectively calculated one time each and the average value of these absolute values F and R is used as the basis for control for judgment of normality of the downstream side air-fuel ratio sensor 41. However, the absolute value F and the absolute value R may also be respectively calculated multiple times each and the average value of these absolute values may be used as the basis for control for judgment of normality of the downstream side air-fuel ratio sensor 41.

In addition, the control for judgment of normality of the downstream side air-fuel ratio sensor 41 may be performed based on other parameters relating to the cumulative oxygen excess/deficiency ΣOED. For example, in the example shown in FIG. 8, the air-fuel ratio correction amount AFC is maintained constant at the rich set correction amount AFCrich during the rich time period, while is maintained constant at the lean set correction amount AFClean during the lean time period. For this reason, the absolute value of the cumulative oxygen excess/deficiency ΣOED is proportional to the length of the oxygen decrease time period Tdec or the oxygen increase time period Tinc. For this reason, in the present embodiment, instead of the cumulative oxygen excess/deficiency ΣOED, the length (that is, time) of the oxygen decrease time period Tdec or the oxygen increase time period Tinc may be used as the basis for control for judgment of normality of the downstream side air-fuel ratio sensor 41. In this case, when the lengths of the oxygen increase time period Tinc and oxygen decrease time period Tdec become a predetermined limit value or less, it is judged that the downstream side air-fuel ratio sensor 41 has become abnormal. Conversely, when the lengths of the oxygen increase time period Tinc and oxygen decrease time period Tdec are longer than a predetermined limit value, it is judged that the downstream side air-fuel ratio sensor 41 has not become abnormal. In the example shown in FIG. 8, at the times $t_1$ to $t_3$, the oxygen increase time period Tinc and oxygen decrease time period Tdec are longer than the limit value, so it is judged that the downstream side air-fuel ratio sensor 41 has not become abnormal. On the other hand, at the time $t_4$ on, the oxygen increase time period Tinc and oxygen decrease time period Tdec are the limit value or less, so it is judged that the downstream side air-fuel ratio sensor 41 has become abnormal.

In the same way, during the rich time period and the lean time period, the air-fuel ratio correction amount AFC is maintained constant, so the absolute value of the cumulative oxygen excess/deficiency ΣOED is proportional to the cumulative value of the intake air amount into the combustion chamber 6. For this reason, in the present embodiment, instead of the cumulative oxygen excess/deficiency ΣOED, the cumulative intake air amount may be used as the basis to diagnose the downstream side air-fuel ratio sensor 41 for abnormality. The cumulative intake air amount is calculated based on the output of the air flowmeter 39. In this case, when the cumulative intake air amount during the oxygen increase time period Tinc and the cumulative intake air amount during the oxygen decrease time period Tdec become the predetermined limit value or less, it is judged that the downstream side air-fuel ratio sensor 41 has become abnormal. Conversely, when the cumulative intake air amount during the oxygen increase time period Tinc and the cumulative intake air amount during the oxygen decrease time period Tdec are larger than the predetermined limit value, it is judged that the downstream side air-fuel ratio sensor 41 has not become abnormal.

Summarizing the above, it can be said that if making the parameter relating to the cumulative oxygen excess/deficiency an excess/deficiency parameter (for example, cumulative oxygen excess/deficiency, oxygen increase time period, oxygen decrease time period, or intake air amount), the control device (ECU) judges that the downstream side air-fuel ratio sensor 41 has not become abnormal when the value of the excess/deficiency parameter from when switching the target air-fuel ratio to the lean air-fuel ratio to when the output air-fuel ratio AFdwn of the downstream side air-fuel ratio sensor 41 becomes the lean judged air-fuel ratio AFlean or more or the value of the excess/deficiency parameter from which switching the target air-fuel ratio to the rich air-fuel ratio to when the output air-fuel ratio AFdwn of the downstream side air-fuel ratio sensor 41 becomes rich judged air-fuel ratio AFrich or less is larger than the predetermined limit value as "control for judgment of normality". Further, the limit value is made a value smaller than the value of the excess/deficiency parameter required for the oxygen stored in the upstream side exhaust purification catalyst 20 to change from zero to the maximum storable oxygen amount or from the maximum storable oxygen amount to zero.

<Problem Points in Diagnosis of Abnormality of Downstream Side Air-Fuel Ratio Sensor>

In this regard, the maximum storable oxygen amount Cmax of the upstream side exhaust purification catalyst 20 is not always constant. It is known that it gradually decreases due to deterioration with the elapse of time etc. For this reason, if the degree of deterioration of the upstream side exhaust purification catalyst 20 becomes larger, along with this, the maximum storable oxygen amount Cmax greatly decreases from the value at the time when new. If, in this way, the maximum storable oxygen amount Cmax greatly decreases, along with this, the cycle by which the output air-fuel ratio AFdwn of the downstream side air-fuel ratio sensor 41 alternately changes between a rich air-fuel ratio and lean air-fuel ratio becomes shorter. This situation is shown in FIG. 9.

Figure 9:
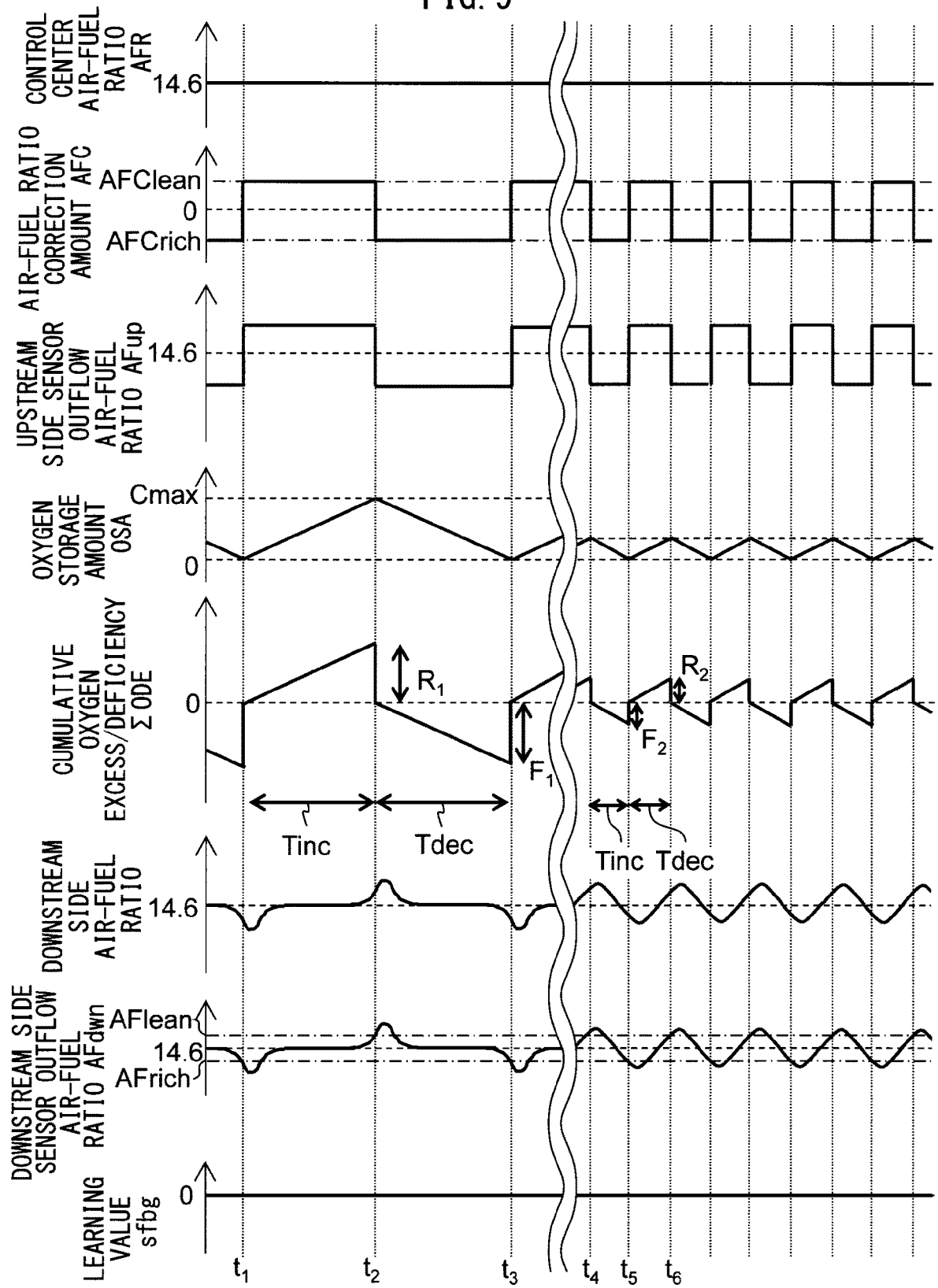
FIG. 9 is a time chart of an air-fuel ratio correction amount etc. when the upstream side exhaust purification catalyst has deteriorated.

FIG. 9 is a time chart of the control center air-fuel ratio AFR etc. when the degree of deterioration of the upstream side exhaust purification catalyst 20 changes. In the figure, the left side shows the trend when the degree of deterioration of the upstream side exhaust purification catalyst 20 is low, that is, when the maximum storable oxygen amount Cmax is large. On the other hand, in the figure, the right side shows the trend when the degree of deterioration of the upstream side exhaust purification catalyst 20 is high, that is, when the maximum storable oxygen amount Cmax is small. Note that, in the example shown in FIG. 9, neither of the upstream side air-fuel ratio sensor 40 and downstream side air-fuel ratio sensor 41 is deviated in its output air-fuel ratio.

When the maximum storable oxygen amount Cmax of the upstream side exhaust purification catalyst 20 is large, as will be understood from times $t_1$ to $t_3$ of FIG. 9, the air-fuel ratio correction amount AFC or the output air-fuel ratio AFdwn of the downstream side air-fuel ratio sensor 41 etc. trend in the same way as the case shown in FIG. 5. Therefore, the absolute value $R_1$ of the cumulative oxygen excess/deficiency ΣOED at the oxygen increase time period Tinc is relatively large. In the same way, the absolute value $F_1$ of the cumulative oxygen excess/deficiency ΣOED at the oxygen decrease time period Tdec is also relatively large.

On the other hand, the case where the degree of deterioration of the upstream side exhaust purification catalyst 20 becomes greater and the maximum storable oxygen amount Cmax becomes smaller is shown at the right side in the figure. In the example shown at the right side of FIG. 9, at the time $t_4$, the output air-fuel ratio AFdwn of the downstream side air-fuel ratio sensor 41 becomes the lean judged air-fuel ratio AFlean or more. For this reason, the air-fuel ratio correction amount AFC is switched from the lean set correction amount AFClean to the rich set correction amount AFCrich. Along with this, the air-fuel ratio of the exhaust gas flowing into the upstream side exhaust purification catalyst 20 changes from the lean air-fuel ratio to the rich air-fuel ratio. Accordingly, the oxygen storage amount OSA of the upstream side exhaust purification catalyst 20 decreases. For this reason, the air-fuel ratio of the exhaust gas flowing out from the upstream side exhaust purification catalyst 20 becomes substantially the stoichiometric air-fuel ratio and the output air-fuel ratio AFdwn of the downstream side air-fuel ratio sensor 41 converges to the stoichiometric air-fuel ratio.

In this regard, the maximum storable oxygen amount Cmax of the upstream side exhaust purification catalyst 20 is decreased due to deterioration, so when the output air-fuel ratio AFdwn of the downstream side air-fuel ratio sensor 41 reaches the stoichiometric air-fuel ratio, the oxygen storage amount OSA of the upstream side exhaust purification catalyst 20 becomes substantially zero. For this reason, unburned gas starts to flow out from the upstream side exhaust purification catalyst 20 and accordingly the output air-fuel ratio AFdwn of the downstream side air-fuel ratio sensor 41 also is not maintained much at the stoichiometric air-fuel ratio but changes to the rich air-fuel ratio. Further, at the time $t_5$, the output air-fuel ratio AFdwn of the downstream side air-fuel ratio sensor 41 reaches the rich judged air-fuel ratio AFrich.

If, in this way, the degree of deterioration of the upstream side exhaust purification catalyst 20 becomes larger, the time period during which the output air-fuel ratio AFdwn of the downstream side air-fuel ratio sensor 41 is maintained substantially the stoichiometric air-fuel ratio becomes extremely short, so the oxygen increase time period Tinc becomes extremely short. In addition, the absolute value $F_2$ of the cumulative oxygen excess/deficiency ΣOED in the oxygen increase time period Tinc becomes smaller.

At the time $t_5$, if the output air-fuel ratio AFdwn of the downstream side air-fuel ratio sensor 41 becomes the rich judged air-fuel ratio AFrich or less, the air-fuel ratio correction amount AFC is switched to the lean set correction amount AFClean. Along with this, the air-fuel ratio of the exhaust gas flowing into the upstream side exhaust purification catalyst 20 changes to the lean air-fuel ratio and accordingly the oxygen storage amount OSA of the exhaust purification catalyst 20 increases. For this reason, the air-fuel ratio of the exhaust gas flowing out from the upstream side exhaust purification catalyst 20 becomes substantially the stoichiometric air-fuel ratio, while the output air-fuel ratio AFdwn of the downstream side air-fuel ratio sensor 41 converges to the stoichiometric air-fuel ratio.

In this regard, the maximum storable oxygen amount Cmax of the upstream side exhaust purification catalyst 20 decreases due to the deterioration, so when the output air-fuel ratio AFdwn of the downstream side air-fuel ratio sensor 41 reaches the stoichiometric air-fuel ratio, the oxygen storage amount OSA of the upstream side exhaust purification catalyst 20 becomes substantially the maximum storable oxygen amount Cmax. For this reason, oxygen starts to flow out from the upstream side exhaust purification catalyst 20 and accordingly the output air-fuel ratio AFdwn of the downstream side air-fuel ratio sensor 41 also changes to the lean air-fuel ratio without being maintained at the stoichiometric air-fuel ratio much at all. Further, at the time $t_6$, the output air-fuel ratio AFdwn of the downstream side air-fuel ratio sensor 41 reaches the lean judged air-fuel ratio AFlean.

If, in this way, the degree of deterioration of the upstream side exhaust purification catalyst 20 becomes greater, the time period during which the output air-fuel ratio AFdwn of the downstream side air-fuel ratio sensor 41 is maintained at substantially the stoichiometric air-fuel ratio becomes extremely short, so the oxygen decrease time period Tdec becomes extremely short. In addition, the absolute value $R_2$ of the cumulative oxygen excess/deficiency ΣOED at the oxygen decrease time period Tdec also becomes smaller.

If, in this way, the degree of deterioration of the upstream side exhaust purification catalyst 20 becomes greater, the absolute values of the cumulative oxygen excess/deficiency ΣOED at the oxygen increase time period Tinc and the oxygen decrease time period Tdec become extremely small and become the predetermined limit value or less. Therefore, if the degree of deterioration of the upstream side exhaust purification catalyst 20 becomes greater, even if the output air-fuel ratio AFdwn of the downstream side air-fuel ratio sensor 41 does not greatly deviate, it will end up being judged that the output air-fuel ratio AFdwn has greatly deviated.

Note that, if the degree of deterioration of the upstream side exhaust purification catalyst 20 becomes larger, the lengths of the oxygen increase time period Tinc and oxygen decrease time period Tdec become the limit value or less. Therefore, even if using the lengths of the oxygen increase time period Tinc and oxygen decrease time period Tdec as the basis to diagnose abnormality of the downstream side air-fuel ratio sensor 41, if the degree of deterioration of the upstream side exhaust purification catalyst 20 becomes larger, it will end up being judged that the output air-fuel ratio AFdwn has greatly deviated. Further, the same can be said for the case of using the cumulative values of the intake air amounts in the oxygen increase time period Tinc and oxygen decrease time period Tdec as the basis to diagnose abnormality of the downstream side air-fuel ratio sensor 41.

<Judgment of Abnormality of Downstream Side Air-Fuel Ratio Sensor Considering Deterioration of Catalyst>

Therefore, in the present embodiment, when the absolute values of the cumulative oxygen excess/deficiency ΣOED at the oxygen increase time period Tinc and the oxygen decrease time period Tdec become the limit value or less, as explained above, it is provisionally judged that the downstream side air-fuel ratio sensor 41 has become abnormal. When it is provisionally judged that the downstream side air-fuel ratio sensor 41 has become abnormal, the main judgment control using a method different from the control for the above-mentioned provisional judgment to diagnose the downstream side air-fuel ratio sensor 41 for abnormality is performed. In particular, in the present embodiment, as the main judgment control, control is performed so make the air-fuel ratio of the exhaust gas flowing into the upstream side exhaust purification catalyst 20 as a whole shift to the rich side or the lean side. Specifically, in the main judgment control, the learning value sfbg is made to temporarily increase or decrease. Below, an example of the main judgment control will be explained.

Figure 10:
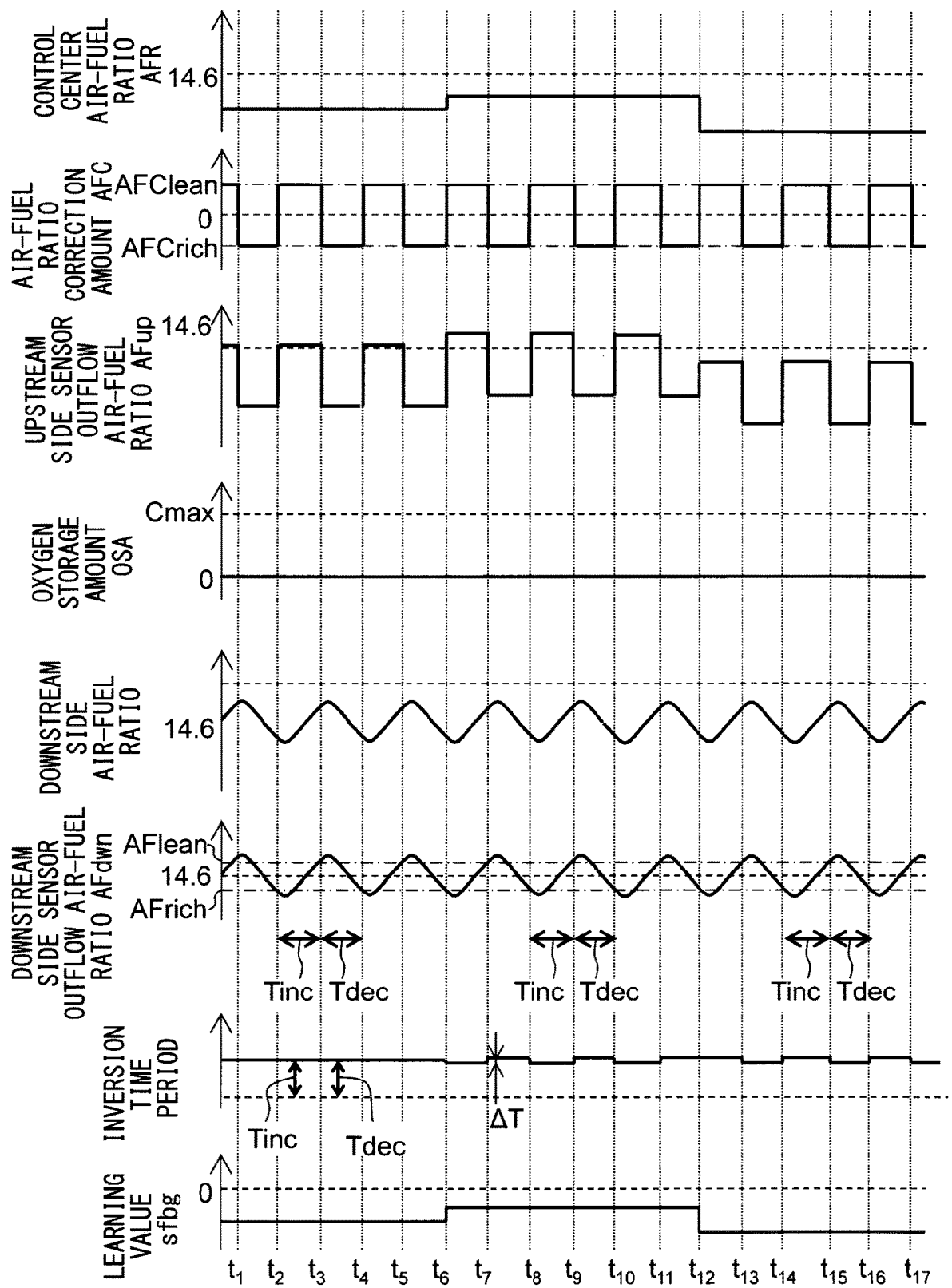
FIG. 10 is a time chart of an air-fuel ratio correction amount etc. when the output air-fuel ratio of the downstream side air-fuel ratio sensor has become deviated.

FIG. 10 is time chart similar to FIG. 8 of the control center air-fuel ratio AFR etc. in the case where the output air-fuel ratio of the downstream side air-fuel ratio sensor 41 as a whole greatly deviates to the lean side. In the figure, the inversion time period shows the time period in which the output air-fuel ratio AFdwn of the downstream side air-fuel ratio sensor 41 reaches the rich judged air-fuel ratio AFrich or less, then becomes the lean judged air-fuel ratio AFlean or more and in which it reaches the lean judged air-fuel ratio AFrich or more, then becomes the rich judged air-fuel ratio AFrich or less. In the example shown in FIG. 10, at the times $t_1$ to $t_6$, the absolute value $R_1$ of the cumulative oxygen excess/deficiency ΣOED and the absolute value $F_1$ of the cumulative oxygen excess/deficiency ΣOED at the oxygen decrease time period Tdec at the oxygen increase time period Tinc become predetermined limit values or less. For this reason, at the time $t_6$, it is provisionally judged that the downstream side air-fuel ratio sensor 41 has become abnormal.

If, in this way, it is provisionally judged that the downstream side air-fuel ratio sensor 41 has become abnormal, in the example shown in FIG. 10, the learning value sfbg is made to increase by exactly a predetermined amount set in advance. If, in this way, the learning value sfbg is made to increase, along with this, the control center air-fuel ratio AFR shifts to the lean side. Therefore, the output air-fuel ratio AFup of the upstream side air-fuel ratio sensor 40 (that is, the actual air-fuel ratio of the exhaust gas flowing into the upstream side exhaust purification catalyst 20) as a whole shifts to the lean side. That is, the output air-fuel ratio AFup when the air-fuel ratio correction amount AFC is set to the rich set correction amount AFCrich becomes more of a lean side air-fuel ratio at the time $t_6$ on compared with before the time $t_6$. In the same way, the output air-fuel ratio AFup when the air-fuel ratio correction amount AFC is set to the lean set correction amount AFClean also becomes more of a lean side air-fuel ratio at the time $t_6$ on compared with before the time $t_6$. Therefore, in the illustrated example, if, at the time $t_6$, it is provisionally judged that the downstream side air-fuel ratio sensor 41 has become abnormal, the learning value sfbg is made to increase. As a result, the air-fuel ratio of the exhaust gas flowing into the upstream side exhaust purification catalyst 20 is as a whole made to shift to the lean side.

If, at the time $t_6$, the learning value sfbg is made to increase, the output air-fuel ratio AFup when the air-fuel ratio correction amount AFC is set to the lean set correction amount AFClean also becomes more of a lean side air-fuel ratio compared with before the time $t_6$. As a result of this, at the time $t_6$ on, the speed of rise of the output air-fuel ratio AFdwn of the downstream side air-fuel ratio sensor 41 when the air-fuel ratio correction amount AFC is set to the lean set correction amount AFClean becomes slightly faster. After that, at the time $t_7$, the output air-fuel ratio AFdwn of the downstream side air-fuel ratio sensor 41 becomes the lean judged air-fuel ratio AFlean or more. At this time, the output air-fuel ratio AFdwn of the downstream side air-fuel ratio sensor 41 deviates to the lean side, so the actual air-fuel ratio of the exhaust gas flowing out from the upstream side exhaust purification catalyst 20 remains the rich air-fuel ratio.

If, at the time $t_7$, the output air-fuel ratio AFdwn of the downstream side air-fuel ratio sensor 41 becomes the lean judged air-fuel ratio AFlean or more, the air-fuel ratio correction amount AFC is switched from the lean set correction amount AFClean to the rich set correction amount AFCrich. As explained above, at the time $t_6$ on, the learning value sfbg is made to increase, so the output air-fuel ratio AFdwn of the downstream side air-fuel ratio sensor 41 when the air-fuel ratio correction amount AFC is set to the rich set correction amount AFrich also becomes an air-fuel ratio at the rich side compared with before the time $t_6$. As a result of this, at the time $t_6$ on, the speed of fall of the output air-fuel ratio AFdwn of the downstream side air-fuel ratio sensor 41 when the air-fuel ratio correction amount AFC is set to the rich set correction amount AFCrich becomes slightly slower. After that, at the time $t_8$, the output air-fuel ratio AFdwn of the downstream side air-fuel ratio sensor 41 becomes the rich judged air-fuel ratio AFrich or less and the air-fuel ratio correction amount AFC is switched to the lean set air-fuel ratio AFClean.

In this way, when the output air-fuel ratio AFdwn of the downstream side air-fuel ratio sensor 41 deviates to the lean side, the speed of rise of the output air-fuel ratio AFdwn becomes slightly faster and the speed of fall of the output air-fuel ratio AFdwn becomes slightly slower. As a result of this, in the example shown in FIG. 10, compared with the oxygen increase time period Tinc of the time $t_2$ to $t_3$, the oxygen increase time period Tinc of the times $t_8$ to $t_9$ is slightly shorter. On the other hand, compared with the oxygen decrease time period Tdec of the time $t_3$ to $t_4$, the oxygen decrease time period Tdec of the times $t_9$ to $t_{10}$ is slightly longer. However, the difference in the oxygen increase time period and the difference in the oxygen decrease time period before and after such a time $t_6$ are small. Therefore, even if the control center air-fuel ratio AFR is made to shift to the lean side, the difference ΔT between the oxygen increase time period Tinc and the oxygen decrease time period Tdec remains small.

Further, in the example shown in FIG. 10, at the time $t_{12}$, the learning value sfbg is made to decrease by exactly a preset predetermined amount. In particular, the learning value sfbg at the time $t_{12}$ is made to decrease by the learning valve sfbg before the time $t_6$. If in this way the learning value sfbg is made to decrease, along with this, the control center air-fuel ratio AFR shifts to the rich side. Therefore, the output air-fuel ratio AFup of the upstream side air-fuel ratio sensor 40 as a whole shifts to the rich side.

If at the time $t_{12}$ the learning value sfbg is made to decrease, at the time $t_{12}$ on, the speed of rise of the output air-fuel ratio AFdwn of the downstream side air-fuel ratio sensor 41 when the air-fuel ratio correction amount AFC is set to the rich set correction amount AFCrich (times $t_{12}$ to $t_{13}$ etc.) becomes slightly slower. In the same way, at the time $t_{12}$ on, the speed of fall of the output air-fuel ratio AFdwn of the downstream side air-fuel ratio sensor 41 when the air-fuel ratio correction amount AFC is set to the lean set correction amount AFClean (times $t_{13}$ to $t_{14}$ etc.) becomes faster. As a result of this, in the example shown in FIG. 10, compared with the oxygen increase time period Tinc of the time $t_2$ to $t_3$, the oxygen increase time period Tinc of the time $t_{14}$ to $t_{15}$ is slightly longer. Further, compared with the oxygen decrease time period Tdec of the time $t_3$ to t 4, the oxygen decrease time period Tdec of the time $t_{15}$ to $t_{16}$ is slightly shorter. However, the difference of the oxygen increase time period and the difference of the oxygen decrease time period between before the time $t_6$ and after the time $t_{12}$ are small. Therefore, even if the learning value sfbg is made to decrease, the difference ΔT between the oxygen increase time period Tinc and the oxygen decrease time period Tdec remains small.

Note that, FIG. 10 shows the case where the output air-fuel ratio AFdwn of the downstream side air-fuel ratio sensor 41 greatly deviates to the lean side, but a similar trend is exhibited even in the case where the output air-fuel ratio AFdwn greatly deviates to the rich side. Therefore, even if the output air-fuel ratio AFdwn of the downstream side air-fuel ratio sensor 41 greatly deviates to the rich side, when making the learning value sfbg increase or decrease, the difference ΔT between the oxygen increase time period Tinc and the oxygen decrease time period Tdec remains small.

Figure 11:
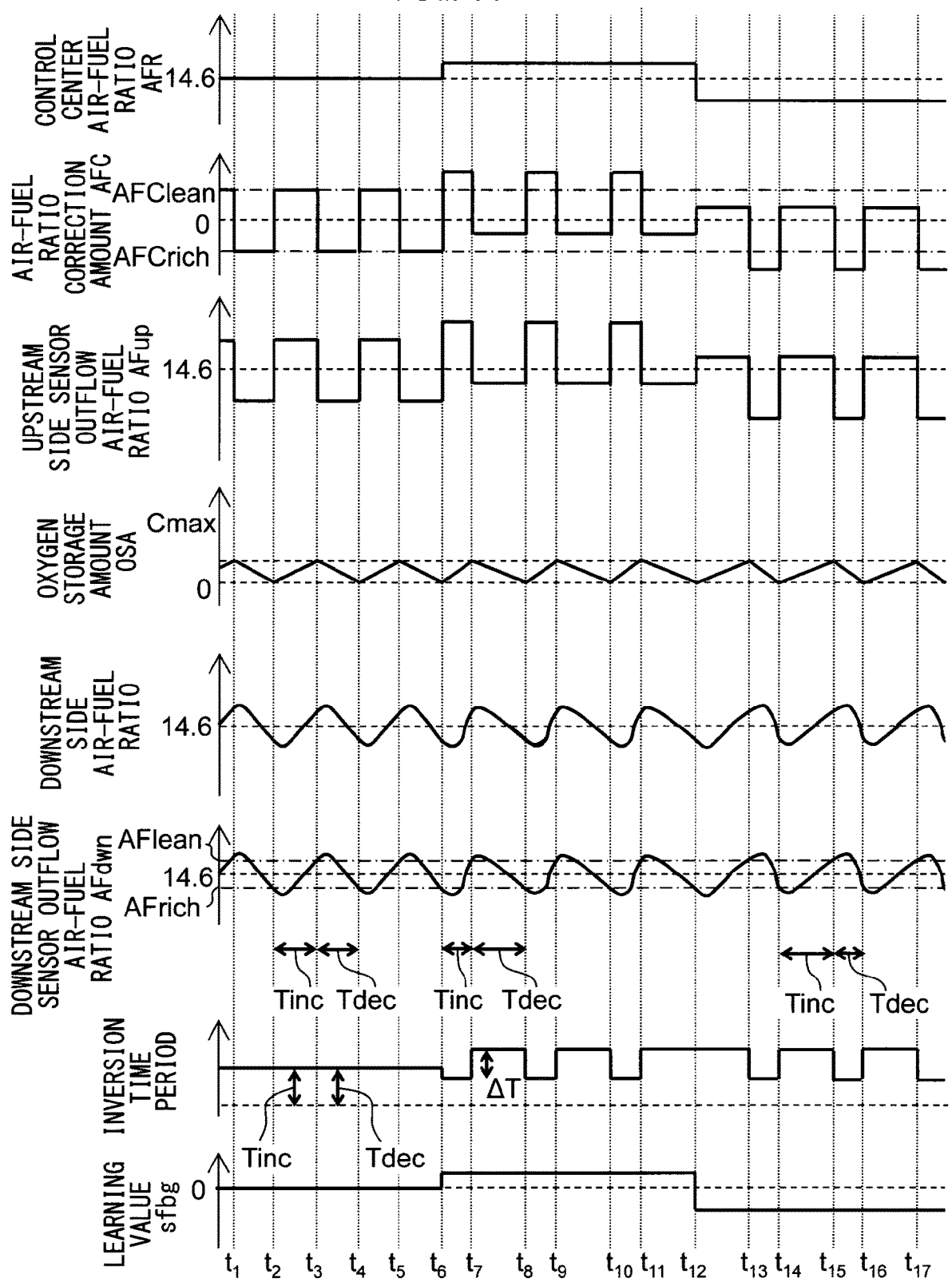
FIG. 11 is a time chart of an air-fuel ratio correction amount etc. when the upstream side exhaust purification catalyst has deteriorated.

FIG. 11 is a time chart of the control center air-fuel ratio AFR etc. when the downstream side air-fuel ratio sensor 41 is normal and the degree of deterioration of the upstream side exhaust purification catalyst 20 is large. In the example shown in FIG. 11 as well, at the times $t_1$ to $t_6$, the absolute value $R_1$ of the cumulative oxygen excess/deficiency ΣOED at the oxygen increase time period Tinc and the absolute value $F_1$ of the cumulative oxygen excess/deficiency ΣOED at the oxygen decrease time period Tdec are lower than the predetermined limit value. For this reason, at the time $t_6$, it is provisionally judged that the downstream side air-fuel ratio sensor 41 has become abnormal.

In the same way as the example shown in FIG. 10, if it is provisionally judged that the downstream side air-fuel ratio sensor 41 has become abnormal, the learning value sfbg is made to increase by exactly a predetermined amount. Further, along with this, the control center air-fuel ratio AFR shifts to the lean side. Therefore, the output air-fuel ratio AFup of the upstream side air-fuel ratio sensor 40 (that is, the actual air-fuel ratio of the exhaust gas flowing into the upstream side exhaust purification catalyst 20) as a whole shifts to the lean side. For this reason, the speed of increase of the oxygen storage amount OSA when the air-fuel ratio correction amount AFC is set to the lean set correction amount AFClean (times $t_6$ to $t_7$ etc.) increases. As a result of this, the oxygen increase time period Tinc from the time $t_6$ to the time $t_7$ becomes shorter. On the other hand, if the control center air-fuel ratio AFR is shifted to the lean side, the speed of decrease of the oxygen storage amount OSA when the air-fuel ratio correction amount AFC is set to the rich set correction amount AFCrich (times $t_7$ to $t_8$ etc.) becomes slower. As a result of this, the oxygen increase time period Tinc from the time $t_7$ to time $t_8$ becomes longer. Therefore, when the degree of deterioration of the upstream side exhaust purification catalyst 20 is large, if the learning value sfbg is made to increase, the difference ΔT between the oxygen increase time period Tinc and the oxygen decrease time period Tdec become larger.

Further, in the example shown in FIG. 11, in the same way as in the example shown in FIG. 10, at the time $t_{12}$, the learning value sfbg is made to decrease by exactly a predetermined amount. Along with this, the control center air-fuel ratio AFR shifts to the rich side and accordingly the output air-fuel ratio AFdwn of the upstream side air-fuel ratio sensor 40 as a whole shifts to the rich side. For this reason, in the illustrated example, at the time $t_{12}$ on, compared with before the time $t_6$, the air-fuel ratio of the exhaust gas flowing into the upstream side exhaust purification catalyst 20 as a whole is made to shift to the rich side.

If, at the time $t_{12}$, the learning value sfbg is made to decrease, the speed of increase of the oxygen storage amount OSA when the air-fuel ratio correction amount AFC is set to the lean set correction amount AFClean (times $t_{12}$ to $t_{13}$ etc.) becomes slower. As a result of this, the oxygen increase time period Tinc becomes longer. On the other hand, if the control center air-fuel ratio AFR is made to shift to the rich side, the speed of decrease of the oxygen storage amount OSA when the air-fuel ratio correction amount AFC is set to the rich set correction amount AFCrich (times $t_{13}$ to $t_{14}$ etc.) becomes faster. As a result of this, the oxygen decrease time period Tdec becomes shorter. Therefore, when the degree of deterioration of the upstream side exhaust purification catalyst 20 is large, if the learning value sfbg is made to decrease, the difference ΔT between the oxygen increase time period Tinc and the oxygen decrease time period Tdec becomes large.

From the above, if comparing FIG. 10 and FIG. 11, it will be understood that when the downstream side air-fuel ratio sensor 41 becomes abnormal, that is, when the output air-fuel ratio AFdwn greatly deviates, even if the learning value sfbg is made to increase or decrease, the difference ΔT between the oxygen increase time period Tinc and the oxygen decrease time period Tdec remains small without change. On the other hand, if the degree of deterioration of the upstream side exhaust purification catalyst 20 is large, if making the learning value sfbg increase or decrease, the difference ΔT between the oxygen increase time period Tinc and the oxygen decrease time period Tdec becomes larger.

Therefore, in the present embodiment, when it is provisionally judged that the downstream side air-fuel ratio sensor 41 has become abnormal, as the main judgment control, as explained above, the learning value sfbg is made to increase or decrease. Further, when, as a result of this, the amount of change of the difference ΔT between the oxygen increase time period Tinc and the oxygen decrease time period Tdec, specifically the average value of the differences between the times $t_6$ to $t_8$, times $t_8$ to $t_{10}$, times $t_{10}$ to $t_{12}$, times $t_{12}$ to $t_{14}$, and times $t_{14}$ to $t_{16}$ of FIG. 10 and FIG. 11, from the difference of these before the time $t_6$, is a predetermined judgment value or less, it is judged by main judgment that the downstream side air-fuel ratio sensor 41 has become abnormal. Note that, the judgment value is made a predetermined value of at least the maximum value which the difference ΔT between the oxygen increase time period Tinc and the oxygen decrease time period Tdec can take when making the learning value sfbg increase or decrease when the output air-fuel ratio AFdwn of the downstream side air-fuel ratio sensor 41 has deviated by a certain constant or more.

On the other hand, in the present embodiment, when as a result of making the learning value sfbg increase or decrease, the amount of change of the difference ΔT between the oxygen increase time period Tinc and the oxygen decrease time period Tdec is larger than the predetermined judgment value, it is judged by main judgment that the downstream side air-fuel ratio sensor 41 has not become abnormal. In addition, in this case, it is judged that the upstream side exhaust purification catalyst 20 is deteriorating.

Due to this, when the absolute value of the cumulative oxygen excess/deficiency ΣOED at the oxygen increase time period Tinc or oxygen decrease time period Tdec becomes the limit value or less and it is provisionally judged that the downstream side air-fuel ratio sensor 41 has become abnormal, the reason why the absolute value of the cumulative oxygen excess/deficiency ΣOED has become the limit value or less can be identified. Therefore, it is possible to suitably diagnose the downstream side air-fuel ratio sensor 41 for abnormality.

Note that, in the example shown in FIG. 10 and FIG. 11, the difference ΔT between the oxygen increase time period Tinc and the oxygen decrease time period Tdec is calculated just one time while maintaining the learning value sfbg constant and this value is used as the basis for the main judgment of abnormality of the downstream side air-fuel ratio sensor 41. However, it is also possible to calculate the oxygen increase time period Tinc or oxygen decrease time period Tdec a plurality of times while maintaining the learning value sfbg constant and to use the average value of these for main judgment of abnormality of the downstream side air-fuel ratio sensor 41. Further, in the example shown in FIG. 10 and FIG. 11, in the main judgment control, the learning value sfbg is made to increase at the time $t_6$ to $t_{12}$ while the learning value sfbg is made to decrease at the times $t_{12}$ to $t_{17}$. However, in the main judgment control, it is also possible to just increase or just decrease the learning value sfbg.

Further, in the above embodiment, in the main judgment control, the learning value sfbg is made to increase or decrease to thereby make the air-fuel ratio of the exhaust gas flowing into the upstream side exhaust purification catalyst 20 as a whole shift to the rich side or the lean side. However, another method may also be used to make the air-fuel ratio of the exhaust gas flowing into the upstream side exhaust purification catalyst 20 as a whole shift to the rich side or the lean side. As such a technique, for example, it may be considered to directly increase or decrease the control center air-fuel ratio AFR rather than the learning value sfbg to thereby correct the output air-fuel ratio AFdwn of the upstream side air-fuel ratio sensor 40 to the rich side or the lean side and thereby make the fuel injection amount from the fuel injector 11 increase or decrease etc.

<Explanation of Specific Control>

Figure 12:
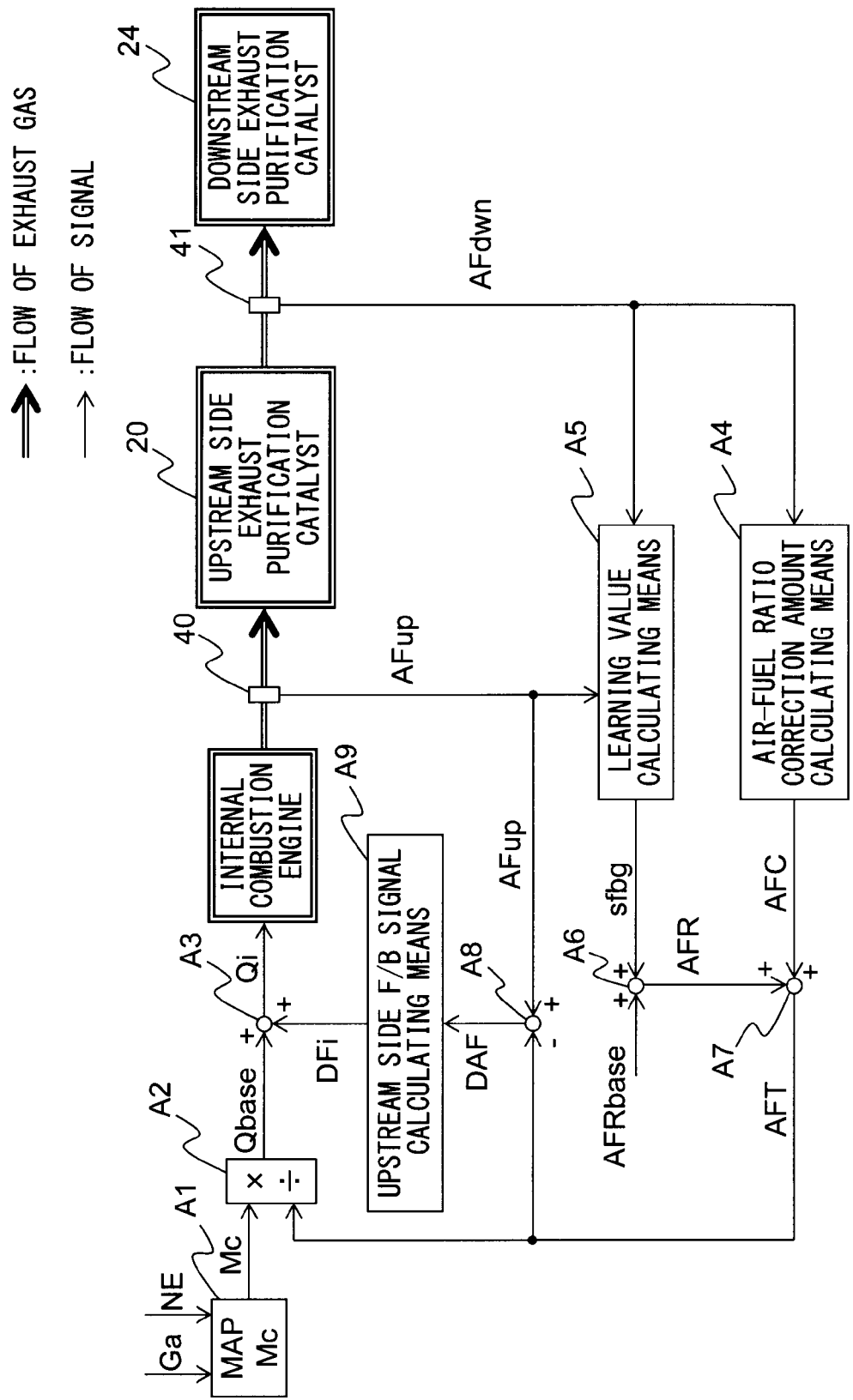
FIG. 12 is a functional block diagram of a control device.

Next, referring to FIG. 12 to FIG. 16, the control device in the above embodiment will be specifically explained. The control device in the present embodiment, as shown in the functional block diagram of FIG. 12, is comprised of the functional blocks A1 to A9. Below, FIG. 12 will be referred to while explaining the functional blocks. The operations of these functional blocks A1 to A9 are basically performed at the ECU 31.

<Calculation of Fuel Injection Amount>

First, the calculation of the fuel injection amount will be explained. In calculation of the fuel injection amount, the cylinder intake air calculating means A1, basic fuel injection calculating means A2, and fuel injection calculating means A3 are used.

The cylinder intake air calculating means A1 uses the intake air flow rate Ga, engine speed NE, and map or calculation formula stored in the ROM 34 of the ECU 31 as the basis to calculate the intake air amount Mc for each cylinder. The intake air flow rate Ga is measured by the air flowmeter 39, while the engine speed NE is calculated based on the output of the crank angle sensor 44.

The basic fuel injection calculating means A2 divides the cylinder intake air amount Mc calculated by the cylinder intake air calculating means A1 by the target air-fuel ratio AFT to thereby calculate the basic fuel injection amount Qbase (Qbase=Mc/AFT). The target air-fuel ratio AFT is calculated by the later explained target air-fuel ratio setting means A7.

The fuel injection calculating means A3 adds to the basic fuel injection amount Qbase calculated by the basic fuel injection calculating means A2 the later explained F/B correction amount DFi to thereby calculate the fuel injection amount Qi (Qi=Qbase+DFi). Fuel of the thus calculated fuel injection amount Qi is injected from the fuel injector 11 by an injection instruction given to the fuel injector 11.

<Calculation of Target Air-Fuel Ratio>

Next, calculation of the target air-fuel ratio will be explained. In calculation of the target air-fuel ratio, the air-fuel ratio correction calculating means A4, learning value calculating means A5, control center air-fuel ratio calculating means A6, and target air-fuel ratio setting means A7 are used.

Figure 13:
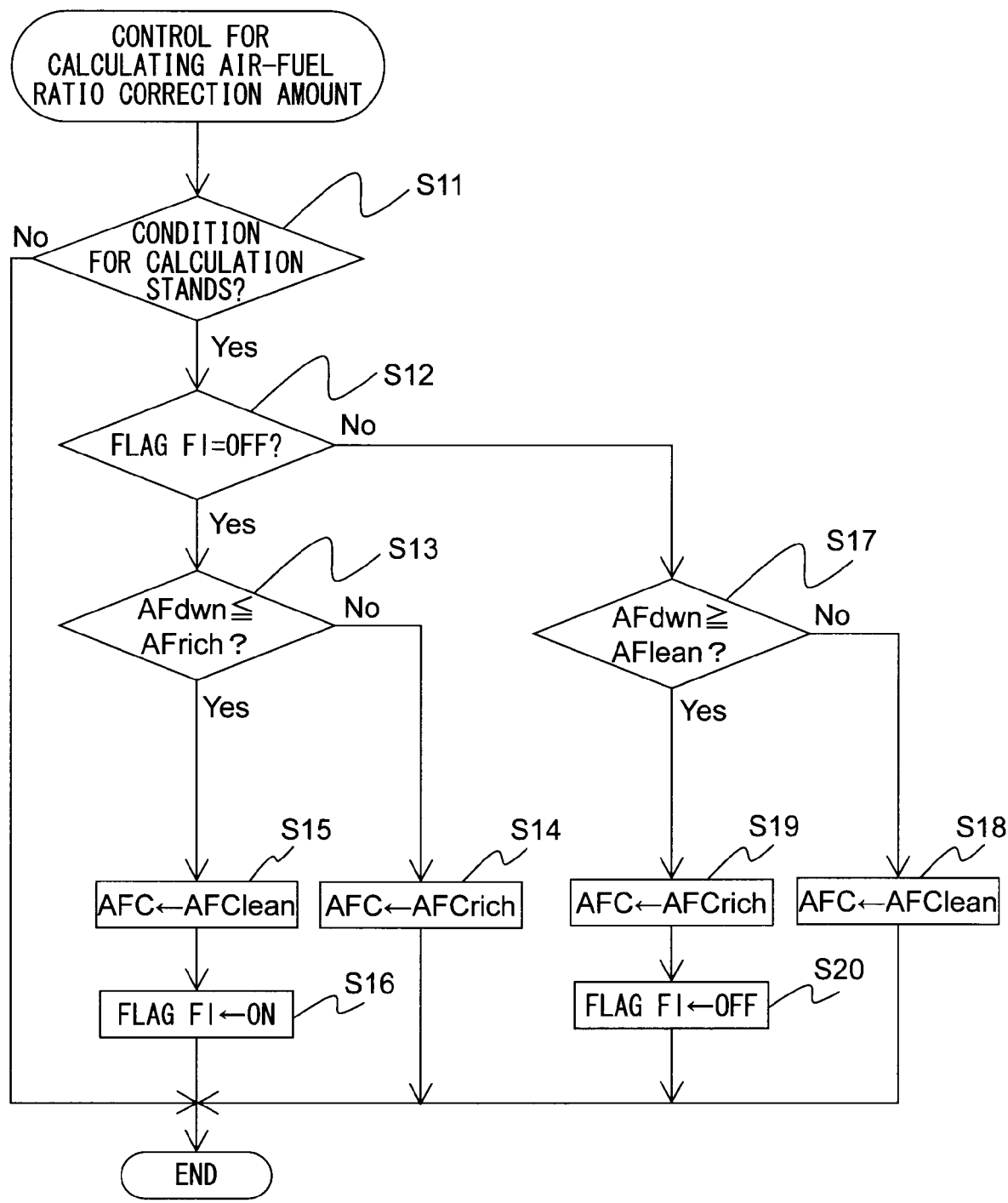
FIG. 13 is a flow chart showing a control routine of control for calculation of an air-fuel ratio correction amount.

The air-fuel ratio correction calculating means A4 uses the output air-fuel ratio AFdwn of the downstream side air-fuel ratio sensor 41 as the basis to calculate the air-fuel ratio correction amount AFC of the target air-fuel ratio. Specifically, the flow chart shown in FIG. 13 is used as the basis to calculate the air-fuel ratio correction amount AFC.

Figure 14:
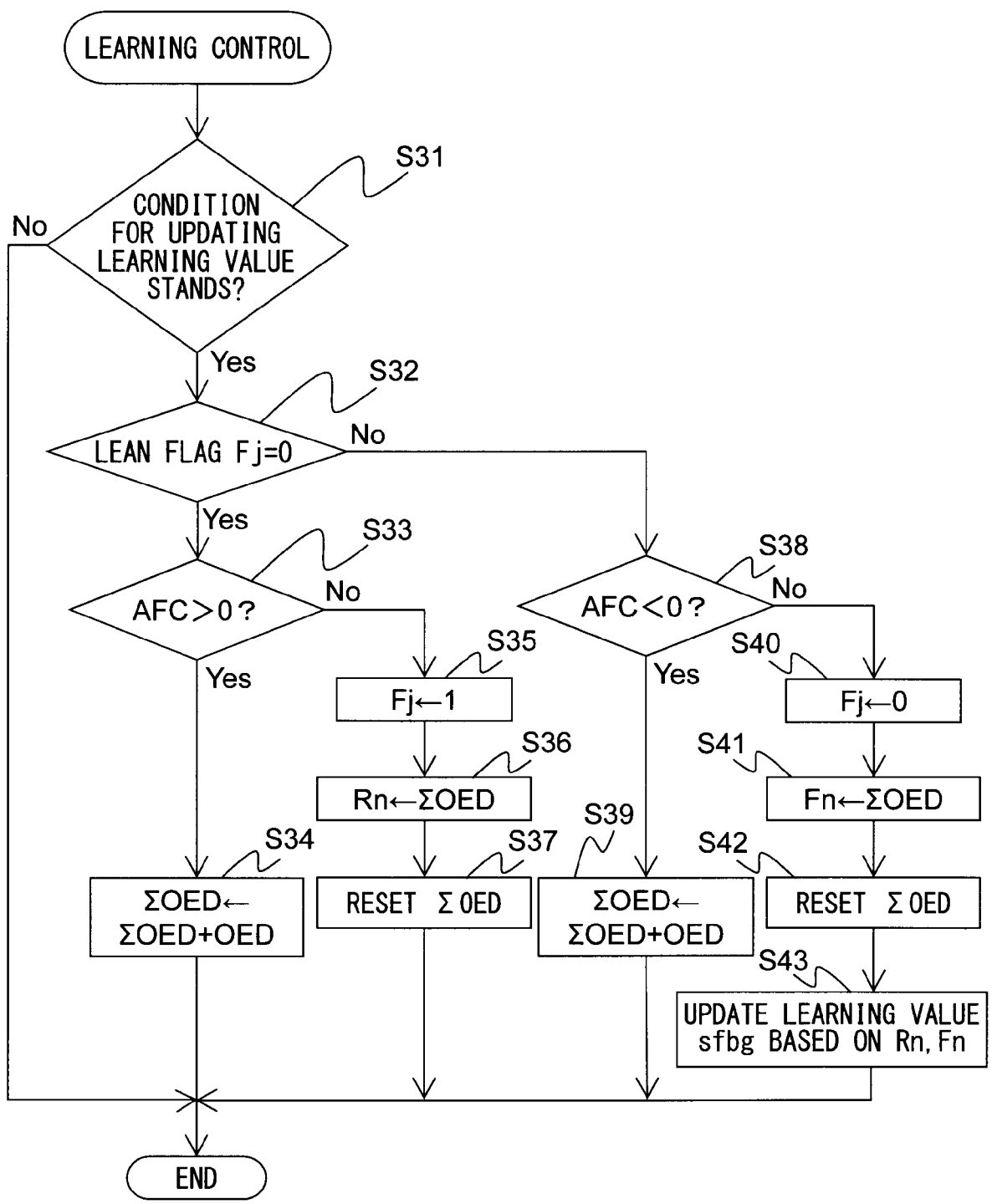
FIG. 14 is a flow chart showing a control routine of normal learning control.

The learning value calculating means A5 uses the output air-fuel ratio AFup of the upstream side air-fuel ratio sensor 40, the output air-fuel ratio AFdwn of the downstream side air-fuel ratio sensor 41, the intake air flow rate Ga (calculation of exhaust gas flow rate Ge), etc. as the basis to calculate the learning value sfbg. Specifically, the flow chart shown in FIG. 14 is used as the basis to calculate the learning value sfbg.

The control center air-fuel ratio calculating means A6 uses the basic control center air-fuel ratio AFRbase and the learning value calculated at the learning value calculating means A5 as the basis to calculate the control center air-fuel ratio AFR by the above-mentioned formula (3).

The target air-fuel ratio setting means A7 adds to the control center air-fuel ratio AFR the air-fuel ratio correction amount AFC calculated at the air-fuel ratio correction calculating means A4 to calculate the target air-fuel ratio AFT. The target air-fuel ratio AFT calculated in this way is input to the basic fuel injection calculating means A2 and the later explained air-fuel ratio difference calculating means A8.

<Calculation of F/B Correction Amount>

Next, the calculation of the F/B correction amount based on the output air-fuel ratio AFup of the upstream side air-fuel ratio sensor 40 will be explained. In calculation of the F/B correction amount, the air-fuel ratio difference calculating means A8 and the F/B correction calculating means A9 are used.

The air-fuel ratio difference calculating means A8 subtracts from the output air-fuel ratio AFup of the upstream side air-fuel ratio sensor 40 the target air-fuel ratio AFT calculated by the target air-fuel ratio setting means A7 to thereby calculate the air-fuel ratio difference DAF (DAF=AFup−AFT). This air-fuel ratio difference DAF is a value expressing the excess/deficiency of the amount of fuel fed with respect to the target air-fuel ratio AFT.

The F/B correction calculating means A9 processes the air-fuel ratio difference DAF calculated by the air-fuel ratio difference calculating means A8 by proportional-integral-differential (PID) processing to calculate the F/B correction amount DFi for compensating for the excess/deficiency of the amount of feed of fuel based on the following formula (4). The thus calculated F/B correction amount DFi is input to the fuel injection calculating means A3.

$$DFi = Kp \cdot DAF + Ki \cdot SDAF + Kd \cdot DDAF \quad (4)$$

Note that, in the above formula (4), Kp is a preset proportional gain (proportional constant), Ki is a preset integral gain (integral constant), and Kd is a preset differential gain (differential constant). Further, DDAF is the time differential of the air-fuel ratio difference DAF and is calculated by dividing the difference between the currently updated air-fuel ratio difference DAF and the previously updated air-fuel ratio difference DAF by the time corresponding to the updating interval. Further, SDAF is the time differential of the air-fuel ratio difference DAF. This time differential SDAF is calculated by adding the previously updated time differential DDAF and the currently updated air-fuel ratio difference DAF (SDAF=DDAF+DAF).

<Flow Chart of Control for Calculating Air-Fuel Ratio Correction Amount>

FIG. 13 is a flow chart showing the control routine in control for calculating the air-fuel ratio correction amount. The illustrated control routine is performed at the ECU 31 by interruption at constant time intervals.

As shown in FIG. 13, first, at step S11, it is judged if the condition for calculating the air-fuel ratio correction amount AFC stands. As the case where the condition for calculating the air-fuel ratio correction amount AFC stands, normal control being underway, for example, not fuel cut control being underway, etc. may be mentioned. If at step S11 it is judged that the condition for calculating the air-fuel ratio correction amount AFC stands, the routine proceeds to step S12.

At step S12, it is judged if the lean set flag F1 is set OFF. The lean set flag F1 is a flag which is set ON when the target air-fuel ratio is set to the lean air-fuel ratio, that is, when the air-fuel ratio correction amount AFC is set to 0 or more, while is set OFF at other times. If at step S12 it is judged that the lean set flag F1 is set OFF, the routine proceeds to step S13. At step S13, it is judged if the output air-fuel ratio AFdwn of the downstream side air-fuel ratio sensor 41 is the rich judged air-fuel ratio AFrich or less.

If, at step S13, it is judged that the output air-fuel ratio AFdwn of the downstream side air-fuel ratio sensor 41 is larger than the rich judged air-fuel ratio AFrich, the routine proceeds to step S14. At step S14, the air-fuel ratio correction amount AFC is set to the rich set correction amount AFCrich and the control routine is made to end.

After that, if the oxygen storage amount OSA of the upstream side exhaust purification catalyst 20 becomes substantially zero and the output air-fuel ratio AFdwn of the downstream side air-fuel ratio sensor 41 becomes the rich judged air-fuel ratio AFrich or less, at the next control routine, the routine proceeds from step S13 to step S15. At step S15, the air-fuel ratio correction amount AFC is set to the lean set correction amount AFClean. Next, at step S16, the lean set flag F1 is set ON and the control routine is made to end.

If the lean set flag F1 is set ON, at the next control routine, the routine proceeds from step S12 to step S17. At step S17, it is judged if the output air-fuel ratio AFdwn of the downstream side air-fuel ratio sensor 41 is the lean judged air-fuel ratio AFlean or more.

If, at step S17, it is judged the output air-fuel ratio AFdwn of the downstream side air-fuel ratio sensor 41 is smaller than the lean judged air-fuel ratio AFlean, the routine proceeds to step S18. At step S18, the air-fuel ratio correction amount AFC is next set to the lean set correction amount AFClean and the control routine is made to end.

After that, if oxygen storage amount OSA of the upstream side exhaust purification catalyst 20 becomes substantially the maximum storable oxygen amount Cmax and the output air-fuel ratio AFdwn of the downstream side air-fuel ratio sensor 41 becomes the lean judged air-fuel ratio AFlean or more, at the next control routine, the routine proceeds from step S17 to step S19. At step S19, the air-fuel ratio correction amount AFC is set to the rich set correction amount AFCrich. Next, at step S20, the lean set flag F1 is reset OFF and the control routine is made to end.

<Flow Chart of Learning Control>

FIG. 14 is a flow chart showing the control routine of learning control. The illustrated control routine is performed at the ECU 31 by interruption at constant time intervals.

As shown in FIG. 13, first, at step S31, it is judged if the condition for updating the learning value sfbg stands. As the case where the updating condition stands, for example, normal control being underway etc. may be mentioned. If, at step S31, it is judged that the condition for updating the learning value sfbg stands, the routine proceeds to step S32. At step S32, it is judged if the lean judgment flag Fj is set to "0". If, at step S32, it is judged that the lean judgment flag Fj is set to "0", the routine proceeds to step S33.

At step S33, it is judged if air-fuel ratio correction amount AFC is larger than "0", that is, if the target air-fuel ratio is the lean air-fuel ratio. If, at step S33, it is judged that the air-fuel ratio correction amount AFC is larger than 0, the routine proceeds to step S34. At step S34, the cumulative oxygen excess/deficiency ΣOED is increased by the current oxygen excess/deficiency OED.

After that, if the target air-fuel ratio is switched to the rich air-fuel ratio, at the next control routine, at step S33, it is judged that the air-fuel ratio correction amount AFC is "0" or less and the routine proceeds to step S35. At step S35, the lean judgment flag Fj is set to "1". Next, at step S36, Rn is made the absolute value of the current cumulative oxygen excess/deficiency ΣOED. Next, at step S37, the cumulative oxygen excess/deficiency ΣOED is reset to "0" and the control routine is made to end.

On the other hand, if the lean judgment flag Fj is set to "1", at the next control routine, the routine proceeds from step S32 to step S38. At step S38, it is judged if the air-fuel ratio correction amount AFC is smaller than 0, that is, if the target air-fuel ratio is the rich air-fuel ratio. If, at step S38, it is judged that the air-fuel ratio correction amount AFC is smaller than 0, the routine proceeds to step S39. At step S39, the cumulative oxygen excess/deficiency ΣOED is increased by the current oxygen excess/deficiency OED.

After that, if the target air-fuel ratio is switched to the lean air-fuel ratio, at the next control routine, at step S38, it is judged that the air-fuel ratio correction amount AFC is 0 or more and the routine proceeds to step S40. At step S40, the lean set flag F1 is set to "0", next, at step S41, Fn is made the absolute value of the current cumulative oxygen excess/deficiency ΣOED. Next, at step S42, the cumulative oxygen excess/deficiency ΣOED is reset to "0". Next, at step S43, the RN calculated at step S36 and the Fn calculated at step S41 are used as the basis to update the learning value sfbg and the control routine is made to end.

<Flow Chart of Provisional Judgment Control>

Figure 15:
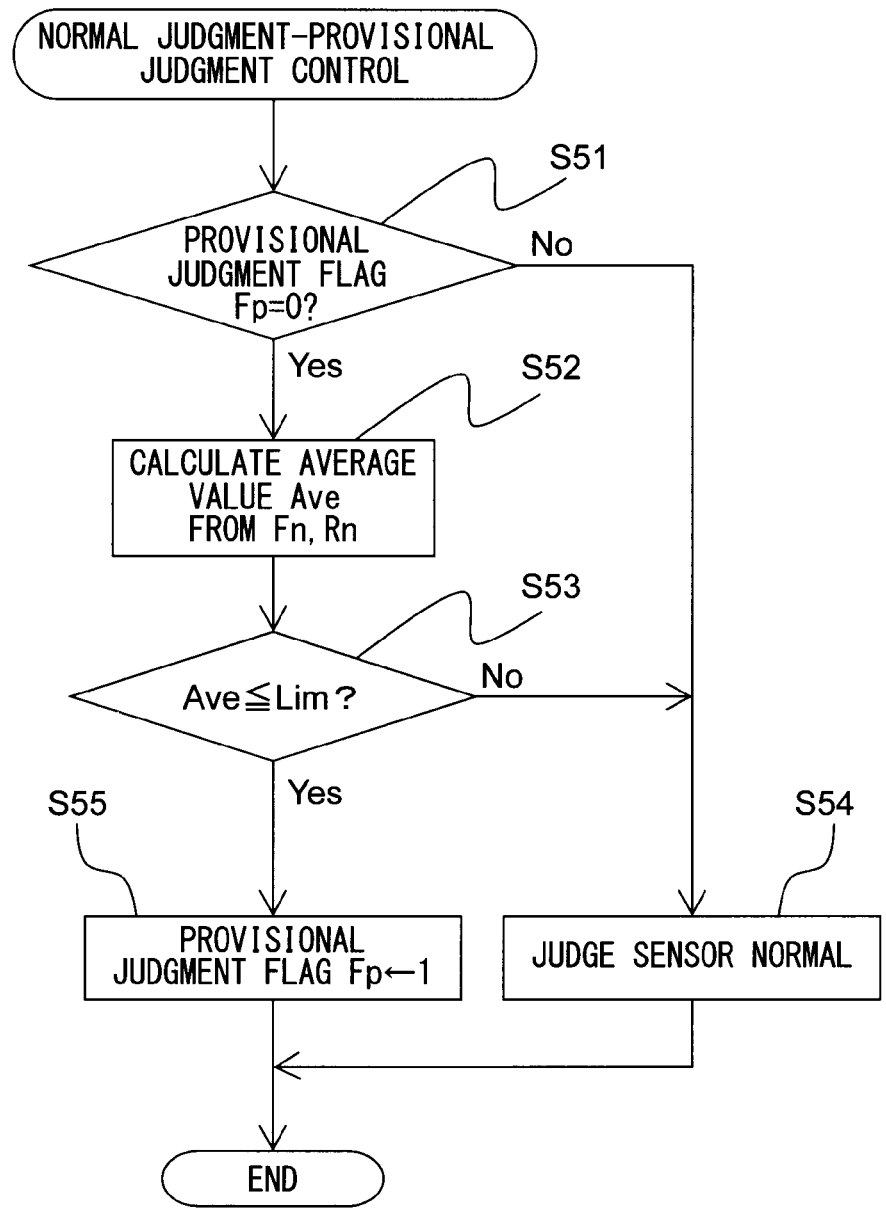
FIG. 15 is a flow chart showing a control routine of provisional judgment control.

FIG. 15 is a flow chart showing the control routine of normal judgment and provisional judgment control. The illustrated control routine is performed at the ECU 31 by interruption at constant time intervals.

As shown in FIG. 15, at step S51, it is judged if the provisional judgment flag Fp is 0. The provisional judgment flag Fp is a flag set to "1" when provisional judgment control results in it being judged that the downstream side air-fuel ratio sensor 41 has become abnormal while is made "0" at other times. If at step S51 it is judged that the provisional judgment flag Fp is "0", the routine proceeds to step S52. At step S52, the absolute value Rn calculated at step S36 of FIG. 14 and the absolute value Fn calculated at step S41 are used as the basis to calculate the average value Ave of these.

Next, at step S53, it is judged if the average value Ave calculated at step S52 is a predetermined limit value Lim or less. If at step S53 it is judged that the average value Ave is larger than the limit value Lim, the routine proceeds to step S54. At step S54, it is judged that the downstream side air-fuel ratio sensor 41 has not become abnormal with center value deviation and the control routine is made to end. On the other hand, if at step S53 it is judged that the average value Ave is the limit value Lim or less, the routine proceeds to step S55. At step S55, the provisional judgment flag Fp is set to "1" and the control routine is made to end.

<Flow Chart of Main Judgment Control>

Figure 16:
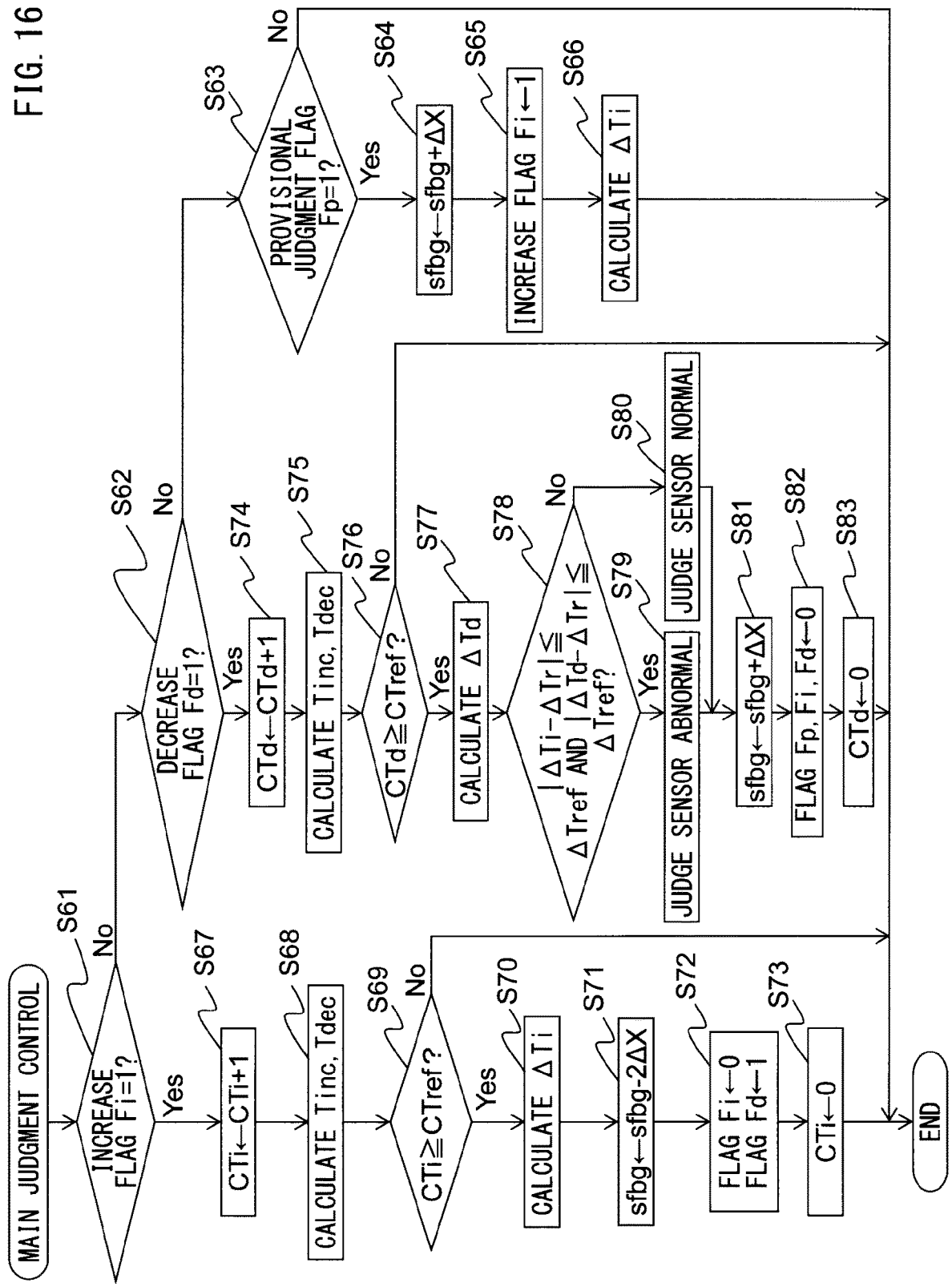
FIG. 16 is a flow chart showing a control routine of main judgment control.

FIG. 16 is a flow chart showing a control routine of the main judgment control. The illustrated control routine is performed at the ECU 31 by interruption at constant time intervals.

First, at steps S61 and S62, it is judged if the increase flag Fi and the decrease flag Fd are "1". The increase flag Fi is a flag which is made "1" when the main judgment control results in the learning value sfbg being temporarily made to increase while is made "0" at other times. Further, the decrease flag Fd is a flag which is made "1" when the main judgment control results in the learning value sfbg being temporarily made to decrease while is made "0" at other times. When the main judgment control is not started, these flags Fi and Fd are both set to "0", so at steps S61 and S62, it is judged that the increase flag Fi and the decrease flag Fd are both not set to "1" and the routine proceeds to step S63.

At step S63, it is judged if the provisional judgment flag Fp is "1". When at step S63 it is judged that the provisional judgment flag Fp is not set to "1", the control routine is made to end. On the other hand, when at FIG. 15, step S54, the provisional judgment flag Fp is set to "1", the routine proceeds from step S63 to step S64 where the main judgment control is started. At step S64, the current learning value sfbg plus a predetermined value ΔX is made the new learning value sfbg. Next, at step S65, the increase flag Fi is set to "1". Next, at step S66, the oxygen increase time period Tinc and oxygen decrease time period Tdec before the provisional judgment flag Fp is set to "1" are used as the basis to calculate the difference ΔTr of these before the provisional judgment flag Fp is set to "1".

If at step S65 the increase flag Fi is set to "1", at the next control routine, the routine proceeds from step S61 to step S67. At step S67, the time counter CTi is incremented by "1", next, at step S68, the oxygen increase time period Tinc and oxygen decrease time period Tdec are calculated. Next, at step S69, it is judged if the time counter CTi is a predetermined reference time period CTref or more. If at step S69 it is judged that the time counter CTi is shorter than the reference time period CTref, the control routine is made to end. On the other hand, if at step S69 it is judged that the time counter CTi is the reference time period CTref or more, the routine proceeds to step S70.

At step S70, the oxygen increase time period Tinc and oxygen decrease time period Tdec calculated at step S68 are used as the basis to calculate the difference ΔTi of these. Therefore, the "difference ΔTi" means the difference between the oxygen increase time period Tinc and the oxygen decrease time period Tdec when the main judgment control causes the learning value sfbg to be increased. Next, at step S71, the current learning value sfbg minus double the predetermined value ΔX is made the new learning value sfbg. At step S72, the increase flag Fi is reset to "0" and the decrease flag Fd is set to "1", while at step S73, the time counter CTi is reset to "0".

If at step S72 the decrease flag Fd is set to "1", at the next control routine, the routine proceeds from step S62 to S74. At step S74, the time counter CTd is incremented by "1", next, at step S75, oxygen increase time period Tinc and oxygen decrease time period Tdec are calculated. Next, at step S76, it is judged if the time counter CTd is a predetermined reference time period CTref or more. If at step S76 it is judged that the time counter CTi is shorter than the reference time period CTref, the control routine is made to end. On the other hand, if at step S76 it is judged that the time counter CTd is the reference time period CTref or more, the routine proceeds to step S77.

At step S77, the oxygen increase time period Tinc and oxygen decrease time period Tdec calculated at step S75 are used as the basis to calculate the difference ΔTd of these. Therefore, the difference ΔTd means the difference between the oxygen increase time period Tinc and oxygen decrease time period Tdec when the main judgment control causes the learning value sfbg to be decreased. Next, at step S78, it is judged if the difference between the difference ΔTr calculated at step S66 and the difference ΔTi calculated at step S70 is the judgment value ΔTref or less and the difference between the difference ΔTr calculated at step S66 and the difference ΔTd calculated at step S77 is the judgment value ΔTref or less. If at step S78 it is judged that either of these differences is the judgment value ΔTref or less, the routine proceeds to step S79, while if it is judged that the downstream side air-fuel ratio sensor 41 has become abnormal, the routine proceeds to step S79. On the other hand, when it is judged at step S78 that at least one of the above differences is larger than the judgment value ΔTref, the routine proceeds to step S80. At step S80, it is judged the downstream side air-fuel ratio sensor 41 has not become abnormal, then the routine proceeds to step S81. At step S81, the current learning value sfbg plus a predetermined value ΔX is made the new learning value sfbg. Therefore, the learning value sfbg is returned to the value before the start of the main judgment control. Next, at step S82, the provisional judgment flag Fp, the increase flag Fi, and the decrease flag Fd are reset to "0". Next, at step S83, the time counter CTd is reset to "0" and the main judgment control is made to end.

Second Embodiment

Next, referring to FIG. 17 and FIG. 18, an exhaust purification system of a second embodiment of the present invention will be explained. The configuration and control of the exhaust purification system of the second embodiment are similar to the configuration and control of the exhaust purification system of the first embodiment except for the main judgment control. In the present embodiment, as the main judgment control, control is performed to make at least one of the lean judged air-fuel ratio and rich judged air-fuel ratio continuously change so that at least one of the difference between the lean judged air-fuel ratio AFlean and stoichiometric air-fuel ratio and the difference between the rich judged air-fuel ratio AFrich and stoichiometric air-fuel ratio becomes larger.

Figure 17:
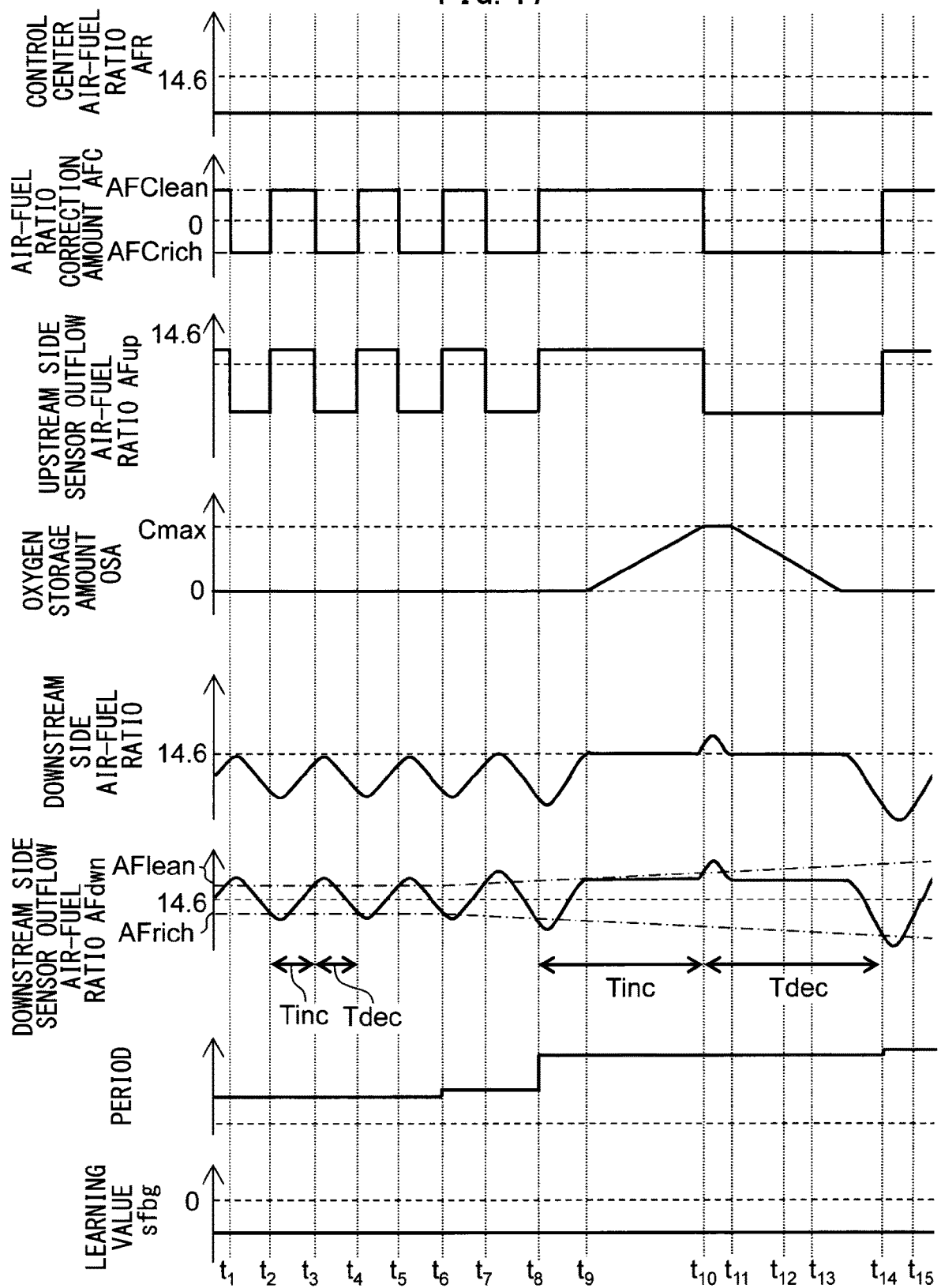
FIG. 17 is a time chart of an air-fuel ratio correction amount etc. when the output air-fuel ratio of the downstream side air-fuel ratio sensor has become deviated.

FIG. 17 is a time chart similar to FIG. 10 of the control center air-fuel ratio AFR etc. when the output air-fuel ratio of the downstream side air-fuel ratio sensor 41 as a whole greatly deviates to the lean side. Tie illustrated period shows the period from when the output air-fuel ratio AFdwn of the downstream side air-fuel ratio sensor 41 becomes the rich judged air-fuel ratio AFrich or less then, in the next cycle, the output air-fuel ratio AFdwn again becomes the rich judged air-fuel ratio AFrich or less. In the example shown in FIG. 17 as well, at the time $t_6$, it is provisionally judged that the downstream side air-fuel ratio sensor 41 has become abnormal.

If, at the time $t_6$, it is provisionally judged that the downstream side air-fuel ratio sensor 41 has become abnormal, at the time $t_6$ on, the rich judged air-fuel ratio AFrich is made to gradually decrease along with the elapse of time (is made to change to the rich side). In the same way, at the time $t_6$ on, the lean judged air-fuel ratio AFlean is made to gradually increase along with the elapse of time (is made to change to the lean side). If, in this way, the differences between the rich judged air-fuel ratio AFrich and lean judged air-fuel ratio AFlean and stoichiometric air-fuel ratio gradually become larger, along with this, the extent of fluctuation of the output air-fuel ratio AFdwn of the downstream side air-fuel ratio sensor 41 gradually becomes larger. Therefore, the extent of fluctuation of the actual air-fuel ratio of the exhaust gas flowing around the downstream side air-fuel ratio sensor 41 gradually becomes larger in the same way.

In the example shown in FIG. 17, as explained above, the output air-fuel ratio AFdwn of the downstream side air-fuel ratio sensor 41 as a whole greatly deviates to the lean side. For this reason, as will be understood from before the time $t_6$ of FIG. 17, even if the output air-fuel ratio AFdwn of the downstream side air-fuel ratio sensor 41 fluctuates up and down about the stoichiometric air-fuel ratio, the actual air-fuel ratio of the exhaust gas around the downstream side air-fuel ratio sensor 41 constantly becomes the rich air-fuel ratio.

In this regard, as explained above, at the time $t_6$ on, the differences between the rich judged air-fuel ratio AFrich and lean judged air-fuel ratio AFlean and stoichiometric air-fuel ratio are gradually made larger whereby the interval during which the air-fuel ratio correction amount AFC is switched between the rich set correction amount AFCrich and the lean set correction amount AFClean gradually becomes longer. As a result of this, the extent of fluctuation of the air-fuel ratio of the exhaust gas flowing into the upstream side exhaust purification catalyst 20 becomes larger and accordingly the extent of fluctuation of the actual air-fuel ratio of the exhaust gas flowing around the downstream side air-fuel ratio sensor 41 gradually becomes larger. Due to this, as shown in FIG. 17, the output air-fuel ratio AFdwn of the downstream side air-fuel ratio sensor 41 also gradually becomes larger.

If, in this way, the extent of fluctuation of the air-fuel ratio of the exhaust gas flowing into the upstream side exhaust purification catalyst 20 becomes larger, the air-fuel ratio of the exhaust gas flowing into the upstream side exhaust purification catalyst 20 will reach the stoichiometric air-fuel ratio while fluctuating up and down. In the example shown in FIG. 17, the air-fuel ratio of the exhaust gas flowing into the upstream side exhaust purification catalyst 20 is changed to the lean air-fuel ratio at the time $t_8$, then reaches the stoichiometric air-fuel ratio at the time $t_9$ and, from then on, the air-fuel ratio of the exhaust gas flowing into the upstream side exhaust purification catalyst 20 becomes the lean air-fuel ratio. However, at the time $t_9$, the oxygen storage amount OSA of the upstream side exhaust purification catalyst 20 becomes substantially zero, so at the time $t_9$ on, even if the air-fuel ratio of the exhaust gas flowing into the upstream side exhaust purification catalyst 20 becomes the lean air-fuel ratio, the oxygen in the exhaust gas is stored in the upstream side exhaust purification catalyst 20. For this reason, at the time $t_9$ on, the air-fuel ratio of the exhaust gas flowing out from the upstream side exhaust purification catalyst 20 is maintained at substantially the stoichiometric air-fuel ratio and, accordingly, the air-fuel ratio of the exhaust gas around the downstream side air-fuel ratio sensor 41 is also maintained at substantially the stoichiometric air-fuel ratio. Due to this, at the time $t_9$ on, the output air-fuel ratio AFdwn of the downstream side air-fuel ratio sensor 41 is maintained at a constant value over a certain extent of time period.

After that, if oxygen storage amount OSA of the upstream side exhaust purification catalyst 20 reaches the maximum storable oxygen amount Cmax, the exhaust gas flowing out from the upstream side exhaust purification catalyst 20 comes to contain oxygen. As a result of this, at the time $t_{10}$, the output air-fuel ratio AFdwn of the downstream side air-fuel ratio sensor 41 becomes the lean judged air-fuel ratio AFlean or more, and the air-fuel ratio correction amount AFC is switched from the lean set correction amount AFClean to the rich set correction amount AFCrich. As explained above, in the interval from the time $t_8$ to the time $t_{10}$, oxygen is stored in the upstream side exhaust purification catalyst 20, so the time period from the time $t_8$ to the time $t_{10}$, that is, the oxygen increase time period Tinc, becomes relatively longer.

At the time $t_{10}$ on as well, the extent of fluctuation of the air-fuel ratio of the exhaust gas flowing into the upstream side exhaust purification catalyst 20 is large, so the air-fuel ratio of the exhaust gas flowing into the upstream side exhaust purification catalyst 20 reaches the stoichiometric air-fuel ratio while the ratio is fluctuating up and down. For this reason, while the output air-fuel ratio AFdwn of the downstream side air-fuel ratio sensor 41 is changing between the rich judged air-fuel ratio AFrich and the lean judged air-fuel ratio AFlean, oxygen is stored in the upstream side exhaust purification catalyst 20 or oxygen is released from it. For this reason, even at the time $t_{10}$ on, the oxygen increase time period Tinc and oxygen decrease time period Tdec become longer compared with before the time $t_8$.

Therefore, when the output air-fuel ratio AFdwn of the downstream side air-fuel ratio sensor 41 greatly deviates to the lean side, if the differences between the rich judged air-fuel ratio AFrich and lean judged air-fuel ratio AFlean and stoichiometric air-fuel ratio are gradually made larger, at a certain point of time, the oxygen increase time period Tinc and oxygen decrease time period Tdec will rapidly become longer. Further, even when the output air-fuel ratio AFdwn of the downstream side air-fuel ratio sensor 41 greatly deviates to the rich side, in the same way, at a certain point of time, the oxygen increase time period Tinc and oxygen decrease time period Tdec will rapidly become longer.

Figure 18:
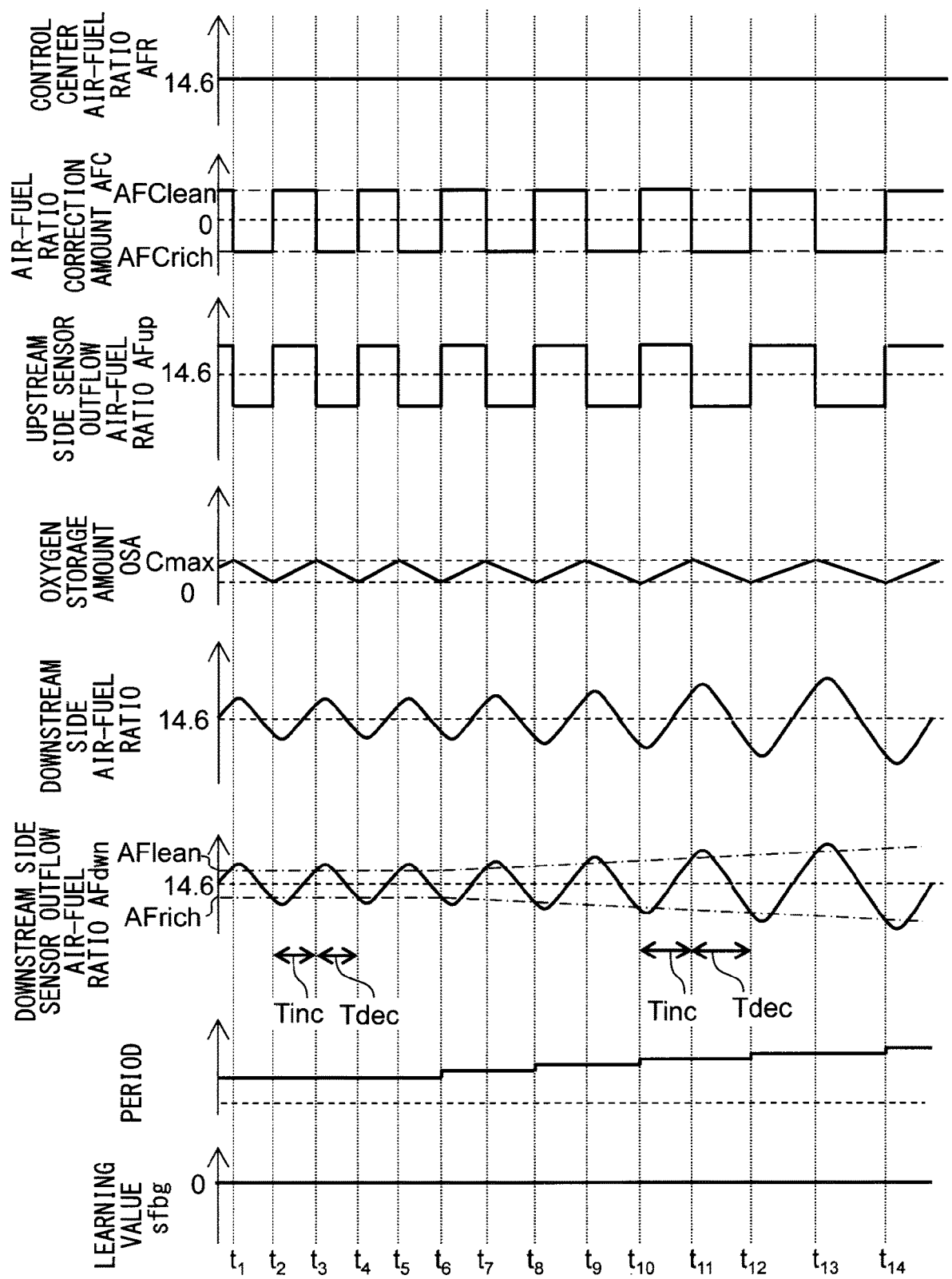
FIG. 18 is a time chart of an air-fuel ratio correction amount etc. when the upstream side exhaust purification catalyst has deteriorated.

FIG. 18 is a time chart of the control center air-fuel ratio AFR etc. when the downstream side air-fuel ratio sensor 41 is normal and the degree of deterioration of the upstream side exhaust purification catalyst 20 is large. In the example shown in FIG. 18 as well, at the times $t_1$ to $t_6$, the absolute value $R_1$ of the cumulative oxygen excess/deficiency ΣOED at the oxygen increase time period Tinc and the absolute value $F_1$ of the cumulative oxygen excess/deficiency ΣOED at the oxygen decrease time period Tdec are lower than predetermined limit value. For this reason, at the time $t_6$, it is provisionally judged that the downstream side air-fuel ratio sensor 41 has become abnormal.

In the example shown in FIG. 18 as well, in the same way as in the example shown in FIG. 17, if it is provisionally judged that the downstream side air-fuel ratio sensor 41 has become abnormal, at the time $t_6$ on, the rich judged air-fuel ratio AFrich and lean judged air-fuel ratio AFlean are made to change so that the differences between the rich judged air-fuel ratio AFrich and lean judged air-fuel ratio AFlean and stoichiometric air-fuel ratio gradually become larger. If, in this way, the differences between the rich judged air-fuel ratio AFrich and lean judged air-fuel ratio AFlean and stoichiometric air-fuel ratio gradually are made larger, along with this, the extent of fluctuation of the output air-fuel ratio AFdwn of the downstream side air-fuel ratio sensor 41 gradually becomes larger. As a result of this, the oxygen increase time period Tinc and oxygen decrease time period Tdec also gradually become longer.

However, in the example shown in FIG. 18, when the output air-fuel ratio AFdwn of the downstream side air-fuel ratio sensor 41 fluctuates between the rich judged air-fuel ratio AFrich and the lean judged air-fuel ratio AFlean, the actual air-fuel ratio of the exhaust gas flowing around the downstream side air-fuel ratio sensor 41 constantly changes over the stoichiometric air-fuel ratio. Therefore, the air-fuel ratio of the exhaust gas flowing into the upstream side exhaust purification catalyst 20 also constantly changes between the rich air-fuel ratio and the lean air-fuel ratio. Therefore, as in the example shown in FIG. 17, the upstream side exhaust purification catalyst 20 does not start to store or release oxygen at a certain point of time. Accordingly, along with this, the oxygen increase time period Tinc and oxygen decrease time period Tdec never suddenly become longer.

Therefore, in the present embodiment, when it is provisionally judged that the downstream side air-fuel ratio sensor 41 has become abnormal, as the main judgment control, as explained above, the rich judged air-fuel ratio AFrich and lean judged air-fuel ratio AFlean are made to change so that the differences between the rich judged air-fuel ratio AFrich and lean judged air-fuel ratio AFlean and stoichiometric air-fuel ratio gradually continuously become greater. Further, during the main judgment control, the period comprised of the oxygen increase time period Tinc and oxygen decrease time period Tdec is calculated. Specifically, this period means the period from when the output air-fuel ratio AFdwn of the downstream side air-fuel ratio sensor 41 becomes the rich judged air-fuel ratio or less to when, at the next cycle, the output air-fuel ratio AFdwn of the downstream side air-fuel ratio sensor 41 again becomes the rich judged air-fuel ratio AFrich or less or the period from when the output air-fuel ratio AFdwn of the downstream side air-fuel ratio sensor 41 becomes the lean judged air-fuel ratio AFlean or more to when, at the next cycle, the output air-fuel ratio AFdwn of the downstream side air-fuel ratio sensor 41 again becomes the lean judged air-fuel ratio AFlean or more. Further, in the present embodiment, when the amount of change per unit time of the period calculated in this way becomes a predetermined judgment value or more, it is judged by main judgment that the downstream side air-fuel ratio sensor 41 has become abnormal. Note that, the judgment value is made a predetermined value of the minimum value which the amount of change of the period per unit time can take, or more, when the degree of deterioration of the upstream side exhaust purification catalyst 20 is high by a certain constant or more and the downstream side air-fuel ratio sensor 41 has not become abnormal.

For example, in the example shown in FIG. 17, compared with the period from the times $t_6$ to $t_8$, the period from the times $t_8$ to $t_{10}$ suddenly becomes longer. Therefore, the amount of change of the period at the times $t_6$ to $t_{10}$ becomes greater and becomes the above-mentioned judgment value or more. As a result of this, it is judged that the downstream side air-fuel ratio sensor 41 has become abnormal.

On the other hand, the rich judged air-fuel ratio AFrich and lean judged air-fuel ratio AFlean are gradually continuously made to change until the differences between rich judged air-fuel ratio AFrich and lean judged air-fuel ratio AFlean and the stoichiometric air-fuel ratio become predetermined differences. When becoming the predetermined differences, the original values are returned to. Further, if, while making the rich judged air-fuel ratio AFrich and lean judged air-fuel ratio AFlean continuously change, the amount of change per unit time of the period is maintained at less than the judgment value, it is judged by main judgment that downstream side air-fuel ratio sensor 41 has not become abnormal. In addition, in this case, it is judged that the upstream side exhaust purification catalyst 20 has not deteriorated. For example, in the example shown in FIG. 18, in the interval from the times $t_6$ to $t_{14}$, the period gradually increases, but during this time period, the amount of change of the period per unit time is maintained smaller than the judgment value. As a result of this, it is judged by main judgment that the downstream side air-fuel ratio sensor 41 has not become abnormal.

Due to this, by the present embodiment as well, when the absolute values of the cumulative oxygen excess/deficiencies ΣOED at the oxygen increase time period Tinc and at the oxygen decrease time period Tdec become the limit value or less and it is provisionally judged that the downstream side air-fuel ratio sensor 41 has become abnormal, it is possible to identify the cause why the absolute value of the cumulative oxygen excess/deficiency ΣOED became the limit value or less. Therefore, the abnormality of the downstream side air-fuel ratio sensor 41 can be suitably diagnosed.

Note that, in the above embodiment, in the main judgment control, these judged air-fuel ratios are made to change so that both of the difference between the rich judged air-fuel ratio AFrich and stoichiometric air-fuel ratio and the difference between the lean judged air-fuel ratio AFrich and stoichiometric air-fuel ratio gradually become larger. However, these judged air-fuel ratios may also be made to change so that only one of the difference between the rich judged air-fuel ratio AFrich and stoichiometric air-fuel ratio and the difference between the lean judged air-fuel ratio AFrich and stoichiometric air-fuel ratio gradually becomes larger. In this case, only the judged air-fuel ratio at the opposite side to the direction in which the output air-fuel ratio deviates from the target air-fuel ratio (in the example shown in FIG. 17, the rich direction) (in the example shown in FIG. 17, lean judged air-fuel ratio) is made to change to gradually move away from the stoichiometric air-fuel ratio.

Therefore, in the present embodiment, in the main judgment control, the control device makes at least one of the difference between the lean judged air-fuel ratio AFlean and stoichiometric air-fuel ratio and the difference between the rich judged air-fuel ratio AFrich and stoichiometric air-fuel ratio become larger by making at least one of the lean judged air-fuel ratio AFlean and rich judged air-fuel ratio AFrich continuously change. Further, if, while making at least one of the lean judged air-fuel ratio AFlean and rich judged air-fuel ratio AFrich continuously change, the amount of change per unit time of the period is the predetermined judgment value or more, it can be said to be judged by main judgment that the downstream side air-fuel ratio sensor 41 has become abnormal. Further, in the main judgment control, the control device makes at least one of the lean judged air-fuel ratio AFlean and rich judged air-fuel ratio AFrich continuously change until at least one of the difference between the lean set air-fuel ratio AFlean and stoichiometric air-fuel ratio and the difference between the rich set air-fuel ratio AFrich and stoichiometric air-fuel ratio becomes a predetermined difference. If, while making at least one of the lean judged air-fuel ratio AFlean and rich judged air-fuel ratio AFrich continuously change, the amount of change per unit time of the period is maintained at less than the predetermined judgment value over a predetermined time period or more, it can be said to be judged by main judgment that the downstream side air-fuel ratio sensor 41 has not become abnormal.

<Flow Chart of Main Judgment Control>

Figure 19:
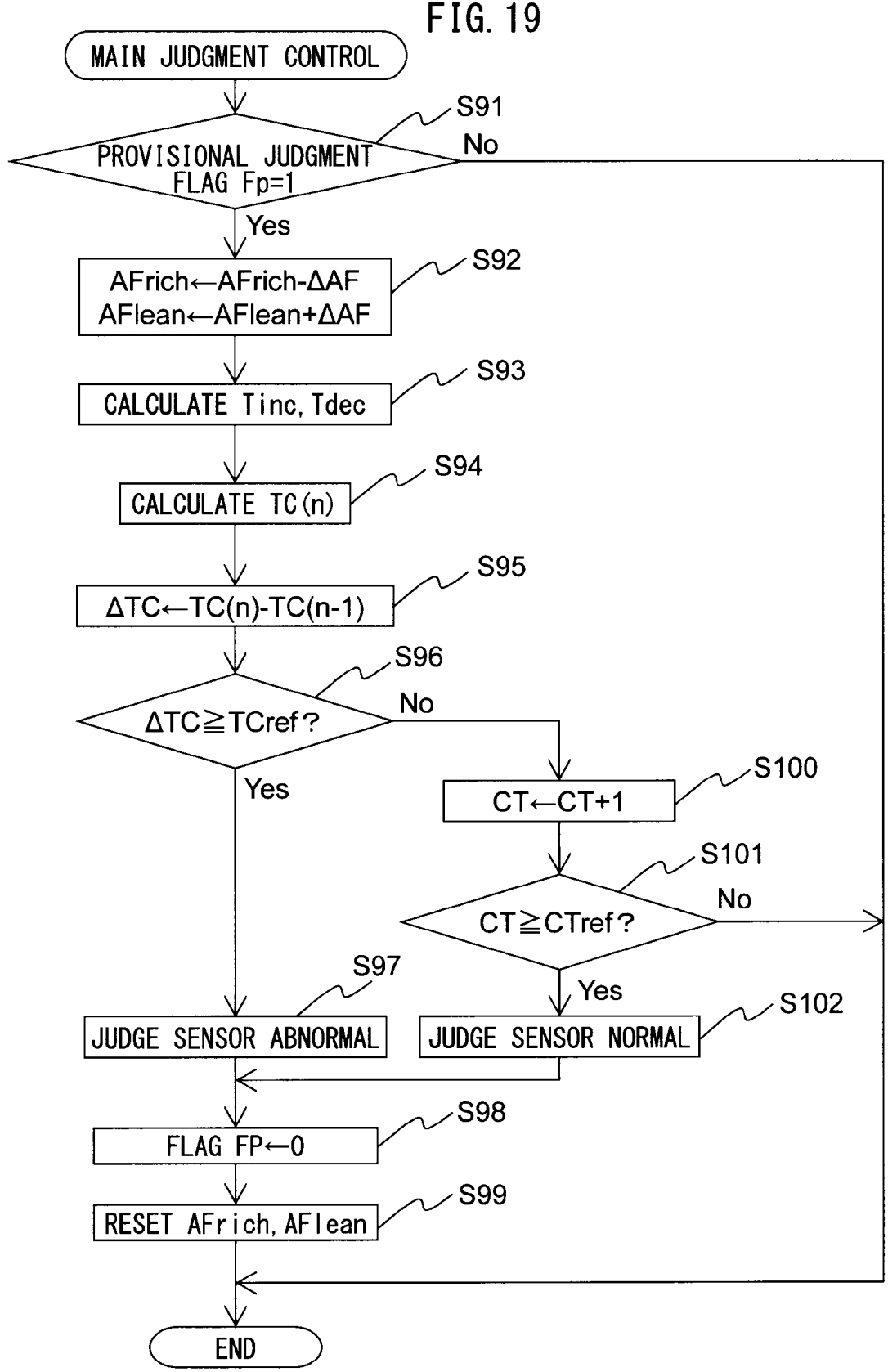
FIG. 19 is a flow chart showing a control routine of the main judgment control.

FIG. 19 is a flow chart showing a control routine of the main judgment control. The illustrated control routine is performed at the ECU 31 by interruption at constant time intervals.

First, at step S91, it is judged if the provisional judgment flag Fp is "1". If, at step S91, it is judged that the provisional judgment flag Fp is not set to "1", the control routine is made to end. On the other hand, if, at step S54 of FIG. 15, the provisional judgment flag Fp is set to "1", the routine proceeds from step S91 to step S92 where the main judgment control is started. At step S92, the current rich judged air-fuel ratio AFrich minus a predetermined value ΔAF is made the new rich judged air-fuel ratio AFrich. Further, the current lean judged air-fuel ratio AFlean plus the predetermined value ΔAF is made the new lean judged air-fuel ratio AFlean. Therefore, by the present control routine being repeatedly performed and step S92 being repeatedly performed, the difference between the rich judged air-fuel ratio AFrich and stoichiometric air-fuel ratio and the difference between the lean judged air-fuel ratio AFlean and stoichiometric air-fuel ratio gradually become larger.

Next, at step S93, the oxygen increase time period Tinc and oxygen decrease time period Tdec are calculated. At step S94, the oxygen increase time period Tinc and the oxygen decrease time period Tdec calculated at step S93 are added whereby the current period TC(n) is calculated. Next, at step S95, the current period TC(n) minus the previous calculated period TC(n−1) is calculated as the period difference ΔTC. The period difference ΔTC expresses the amount of change of the period per unit time.

Next, at step S96, it is judged if at the period difference ΔTC calculated at step S95 is a predetermined judgment value TCref or more. If, at step S96, it is judged that the period difference ΔTC is the judgment value TCref or more, the routine proceeds to step S97. At step S97, it is judged that the downstream side air-fuel ratio sensor 41 has become abnormal. Next, at step S98, the provisional judgment flag Fp is reset to "0" and, at step S99, the rich judged air-fuel ratio AFrich and lean judged air-fuel ratio AFlean are returned to the values before the main judgment control was performed.

On the other hand, if it is judged at step S96 that the period difference ΔTC is less than the judgment value TCref, the routine proceeds to step S100. At step S100, the time counter CT is incremented by "1", then, at the next step S101, it is judged if the time counter CT has reached the reference time CTref or more. When at step S101 it is judged that the time counter CT is less than the reference time CTref, the control routine is made to end. On the other hand, when at step S101 it is judged that the time counter CT has reached the reference time CTref or more, it means that the amount of change per unit time of the period has been maintained at less than the judgment value over a predetermined time period or more, so at step S102, it is judged that the downstream side air-fuel ratio sensor 41 has not become abnormal. After that, the routine proceeds to step S98.

REFERENCE SIGNS LIST 1. engine body
5. combustion chamber
7. intake port
9. exhaust port
19. exhaust manifold
20. upstream side exhaust purification catalyst
24. downstream side exhaust purification catalyst
31. ECU
40. upstream side air-fuel ratio sensor
41. downstream side air-fuel ratio sensor

The invention claimed is:
1. An exhaust purification system of an internal combustion engine comprising:
an exhaust purification catalyst arranged in an engine exhaust passage and configured to store oxygen;

a downstream side air-fuel ratio sensor arranged at a downstream side of the exhaust purification catalyst in a direction of flow of exhaust; and an electronic control unit configured to control an air-fuel ratio of exhaust gas flowing into the exhaust purification catalyst and diagnose the downstream side air-fuel ratio sensor for abnormality, wherein the electronic control unit is configured to:

perform a feedback control so that the air-fuel ratio of the exhaust gas flowing into the exhaust purification catalyst becomes a target air-fuel ratio; and perform a target air-fuel ratio setting control to set the target air-fuel ratio so as to switch the target air-fuel ratio to a lean air-fuel ratio leaner than the stoichiometric air-fuel ratio when an output air-fuel ratio of the downstream side air-fuel ratio sensor becomes less than or equal to a rich judged air-fuel ratio richer than the stoichiometric air-fuel ratio and so as to switch the target air-fuel ratio to a rich air-fuel ratio richer than the stoichiometric air-fuel ratio when an output air-fuel ratio of the downstream side air-fuel ratio sensor becomes greater than or equal to a lean judged air-fuel ratio leaner than the stoichiometric air-fuel ratio, if defining a parameter relating to a cumulative value of an amount of oxygen in exhaust gas flowing into the exhaust purification catalyst becoming in excess or oxygen becoming deficient, constituting an oxygen excess/deficiency, when trying to make an air-fuel ratio of exhaust gas flowing into the exhaust purification catalyst the stoichiometric air-fuel ratio, as an "excess/deficiency parameter", the electronic control unit is further configured to:

perform a learning control to correct a parameter relating to the feedback control so as to make the air-fuel ratio of exhaust gas flowing into the exhaust purification catalyst change so that a difference between a value of the excess/deficiency parameter from when switching the target air-fuel ratio to a lean air-fuel ratio to when the output air-fuel ratio of the downstream side air-fuel ratio sensor becomes greater than or equal to the lean judged air-fuel ratio and a value of the excess/deficiency parameter from when switching the target air-fuel ratio to a rich air-fuel ratio to when the output air-fuel ratio of the downstream side air-fuel ratio sensor becomes less than or equal to the rich judged air-fuel ratio becomes smaller; and perform a normal judgment control where it judges that the downstream side air-fuel ratio sensor has not become abnormal when the value of the excess/deficiency parameter from when switching the target air-fuel ratio to a lean air-fuel ratio to when the output air-fuel ratio of the downstream side air-fuel ratio sensor becomes greater than or equal to the lean judged air-fuel ratio or the value of the excess/deficiency parameter from when switching the target air-fuel ratio to a rich air-fuel ratio to when the output air-fuel ratio of the downstream side air-fuel ratio sensor becomes less than or equal to the rich judged air-fuel ratio is larger than a predetermined limit value, wherein the predetermined limit value is smaller than a value of the excess/deficiency parameter required for oxygen stored in the exhaust purification catalyst to change from zero to a maximum storable oxygen amount or from the maximum storable oxygen amount to zero.

2. The exhaust purification system of an internal combustion engine according to claim 1 wherein the excess/deficiency parameter is a cumulative value of an amount of flow of exhaust gas flowing into the exhaust purification catalyst.

3. The exhaust purification system of an internal combustion engine according to claim 1 wherein the excess/deficiency parameter is a time period.

4. The exhaust purification system of an internal combustion engine according to claim 1 wherein the electronic control unit is further configured to:

perform a provisional judgment control where it provisionally judges that the downstream side air-fuel ratio sensor has become abnormal when the value of the excess/deficiency parameter from when switching the target air-fuel ratio to a lean air-fuel ratio to when the output air-fuel ratio of the downstream side air-fuel ratio sensor becomes greater than or equal to the lean judged air-fuel ratio or the value of the excess/deficiency parameter from when switching the target air-fuel ratio to a rich air-fuel ratio to when the output air-fuel ratio of the downstream side air-fuel ratio sensor becomes less than or equal to the rich judged air-fuel ratio becomes a predetermined limit value smaller than the value of the excess/deficiency parameter required for oxygen stored in the exhaust purification catalyst to change from zero to the maximum storable oxygen amount or from the maximum storable oxygen amount to zero or becomes less; and perform a main judgment control where it uses a method different from the provisional judgment to diagnose the downstream side air-fuel ratio sensor for abnormality when it is provisionally judged in the provisional judgment control that the downstream side air-fuel ratio sensor has become abnormal.

5. The exhaust purification system of an internal combustion engine according to claim 4 wherein the electronic control unit is further configured to:

set the target air-fuel ratio so as to switch the target air-fuel ratio to a constant value of a lean set air-fuel ratio when the output air-fuel ratio of the downstream side air-fuel ratio sensor becomes equal to or less than the rich judged air-fuel ratio and so as to switch the target air-fuel ratio to a constant value of a rich set air-fuel ratio when the output air-fuel ratio of the downstream side air-fuel ratio sensor becomes greater than or equal to the lean judged air-fuel ratio; and make the air-fuel ratio of exhaust gas flowing into the exhaust purification catalyst shift as a whole to the rich side or the lean side in the main judgment control; and judge that the downstream side air-fuel ratio sensor has become abnormal when, by making the air-fuel ratio of exhaust gas flowing into the exhaust purification catalyst shift as a whole to the rich side or the lean side, an amount of change of a time period from when switching the target air-fuel ratio to the lean set air-fuel ratio to when the output air-fuel ratio of the downstream side air-fuel ratio sensor becomes greater than or equal to the lean judged air-fuel ratio or a time period from when switching the target air-fuel ratio to the rich set air-fuel ratio to when the output air-fuel ratio of the downstream side air-fuel ratio sensor becomes less than or equal to the rich judged air-fuel ratio becomes equal to or less than a predetermined judgment value.

6. The exhaust purification system of an internal combustion engine according to claim 4 wherein the electronic control unit is further configured to:

set the target air-fuel ratio so as to switch the target air-fuel ratio to a constant value of a lean set air-fuel ratio when the output air-fuel ratio of the downstream side air-fuel ratio sensor becomes less than or equal to the rich judged air-fuel ratio and so as to switch the target air-fuel ratio to a constant value of a rich set air-fuel ratio when the output air-fuel ratio of the downstream side air-fuel ratio sensor becomes greater than or equal to the lean judged air-fuel ratio; and make at least one of the lean judged air-fuel ratio and the rich judged air-fuel ratio continuously change so that at least one of a difference between the lean judged air-fuel ratio and the stoichiometric air-fuel ratio and a difference between the rich judged air-fuel ratio and the stoichiometric air-fuel ratio becomes larger in the main judgment control; and judge that the downstream side air-fuel ratio sensor has become abnormal when, while making at least one of the lean judged air-fuel ratio and the rich judged air-fuel ratio continuously change, an amount of change per unit time of a period from when the output air-fuel ratio of the downstream side air-fuel ratio sensor becomes less than or equal to the rich judged air-fuel ratio to when, at the next cycle, the output air-fuel ratio of the downstream side air-fuel ratio sensor again becomes less than or equal to the rich judged air-fuel ratio or an amount of change per unit time of a period from when the output air-fuel ratio of the downstream side air-fuel ratio sensor becomes greater than or equal to the lean judged air-fuel ratio to when, at the next cycle, the output air-fuel ratio of the downstream side air-fuel ratio sensor again becomes greater than or equal to the lean judged air-fuel ratio is a predetermined judgment value or more.

7. The exhaust purification system of an internal combustion engine according to claim 6 wherein the electronic control unit is further configured to:

make at least one of the lean judged air-fuel ratio and the rich judged air-fuel ratio continuously change until at least one of a difference between the lean set air-fuel ratio and the stoichiometric air-fuel ratio and a difference between the rich set air-fuel ratio and the stoichiometric air-fuel ratio becomes a predetermined difference in the main judgment control; and judge by the main judgment control that the downstream side air-fuel ratio sensor has not become abnormal when, while making at least one of the lean judged air-fuel ratio and the rich judged air-fuel ratio continuously change, the amount of change per unit time of the period is maintained at less than a predetermined judgment value over a predetermined time period or more.

* * * * *